US011639982B2

(12) United States Patent
Day et al.

(10) Patent No.: US 11,639,982 B2
(45) Date of Patent: May 2, 2023

(54) DETECTING ANGLES OF OBJECTS

(71) Applicant: Innoviz Technologies Ltd., Rosh Ha'Ayin (IL)

(72) Inventors: Amir Day, Beer Yakov (IL); Guy Zohar, Netanya (IL); Julian Vlaiko, Kfar Saba (IL); Nir Osiroff, Givataim (IL); Ronen Eshel, Givataim (IL)

(73) Assignee: Innoviz Technologies Ltd., Rosh Ha'Ayin (IL)

( * ) Notice: Subject to any disclaimer, the term of this patent is extended or adjusted under 35 U.S.C. 154(b) by 978 days.

(21) Appl. No.: 16/456,132

(22) Filed: Jun. 28, 2019

(65) Prior Publication Data

US 2019/0324147 A1 Oct. 24, 2019

Related U.S. Application Data

(63) Continuation of application No. PCT/IB2018/000063, filed on Jan. 3, 2018.
(Continued)

(51) Int. Cl.
*G01S 7/02* (2006.01)
*G06T 7/70* (2017.01)
(Continued)

(52) U.S. Cl.
CPC .............. *G01S 7/026* (2013.01); *A01C 5/04* (2013.01); *G01S 7/4808* (2013.01); *G01S 7/4817* (2013.01); *G01S 17/04* (2020.01); *G01S 17/58* (2013.01); *G01S 17/89* (2013.01); *G01S 17/894* (2020.01); *G01S 17/931* (2020.01); *G06K 9/6267* (2013.01); *G06K 9/6293* (2013.01);
(Continued)

(58) Field of Classification Search
CPC ........ G01S 7/026; G01S 17/931; G01S 17/04; G06T 7/70
USPC .............................................. 356/4
See application file for complete search history.

(56) References Cited

U.S. PATENT DOCUMENTS 5,652,652 A 7/1997 Jones et al.
5,784,023 A 7/1998 Bluege
(Continued)

FOREIGN PATENT DOCUMENTS

WO WO 2016/067280 5/2016

OTHER PUBLICATIONS

International Search Report and Written Opinion issued in PCT International Application No. PCT/IB2018/000063, dated Jun. 26, 2018, 16 pages.

*Primary Examiner* — On S Mung
(74) *Attorney, Agent, or Firm* — Finnegan, Henderson, Farabow, Garrett & Dunner, LLP

(57) ABSTRACT

A LIDAR system for use in a vehicle is provided. The LIDAR system may include at least one processor configured to control at least one light source for illuminating a field of view and scan a field of view by controlling movement of at least one deflector at which the at least one light source is directed. The at least one processor may also be configured to receive, from at least one sensor, reflections signals indicative of light reflected from an object in the field of view. The at least one processor may further be configured to detect at least one temporal distortion in the reflections signals, and determine from the at least one temporal distortion an angular orientation of at least a portion of the object.

30 Claims, 42 Drawing Sheets

Related U.S. Application Data

(60) Provisional application No. 62/596,261, filed on Dec. 8, 2017, provisional application No. 62/591,409, filed on Nov. 28, 2017, provisional application No. 62/589,686, filed on Nov. 22, 2017, provisional application No. 62/567,692, filed on Oct. 3, 2017, provisional application No. 62/563,367, filed on Sep. 26, 2017, provisional application No. 62/560,985, filed on Sep. 20, 2017, provisional application No. 62/521,450, filed on Jun. 18, 2017, provisional application No. 62/516,694, filed on Jun. 8, 2017, provisional application No. 62/461,802, filed on Feb. 22, 2017, provisional application No. 62/456,691, filed on Feb. 9, 2017, provisional application No. 62/455,627, filed on Feb. 7, 2017, provisional application No. 62/441,610, filed on Jan. 3, 2017, provisional application No. 62/441,611, filed on Jan. 3, 2017, provisional application No. 62/441,581, filed on Jan. 3, 2017, provisional application No. 62/441,583, filed on Jan. 3, 2017, provisional application No. 62/441,578, filed on Jan. 3, 2017, provisional application No. 62/441,574, filed on Jan. 3, 2017, provisional application No. 62/441,606, filed on Jan. 3, 2017.

(51) Int. Cl.
*G01S 17/931* (2020.01)
*G01S 17/04* (2020.01)
*G01S 7/48* (2006.01)
*G01S 7/481* (2006.01)
*G01S 17/58* (2006.01)
*G06K 9/62* (2022.01)
*G01S 17/894* (2020.01)
*G01S 17/89* (2020.01)
*A01C 5/04* (2006.01)
*G06V 10/141* (2022.01)
*G06V 10/75* (2022.01)
*G06V 20/56* (2022.01)
*G06V 20/58* (2022.01)

(52) U.S. Cl.
CPC .............. *G06T 7/70* (2017.01); *G06V 10/141* (2022.01); *G06V 10/751* (2022.01); *G06V 20/56* (2022.01); *G06V 20/58* (2022.01); *G06V 20/588* (2022.01); *B60W 2420/42* (2013.01); *G06T 2207/30256* (2013.01)

(56) References Cited

U.S. PATENT DOCUMENTS

| | | | |
|---|---|---|---|
| 8,849,518 B2* | 9/2014 | Nefcy | B62D 15/027 |
| | | | 701/41 |
| 2018/0081037 A1 | 3/2018 | Medina et al. | |
| 2018/0081038 A1 | 3/2018 | Medina et al. | |
| 2018/0100928 A1 | 4/2018 | Keilaf et al. | |
| 2018/0113216 A1 | 4/2018 | Kremer et al. | |
| 2018/0136314 A1* | 5/2018 | Taylor | G01S 17/931 |

* cited by examiner

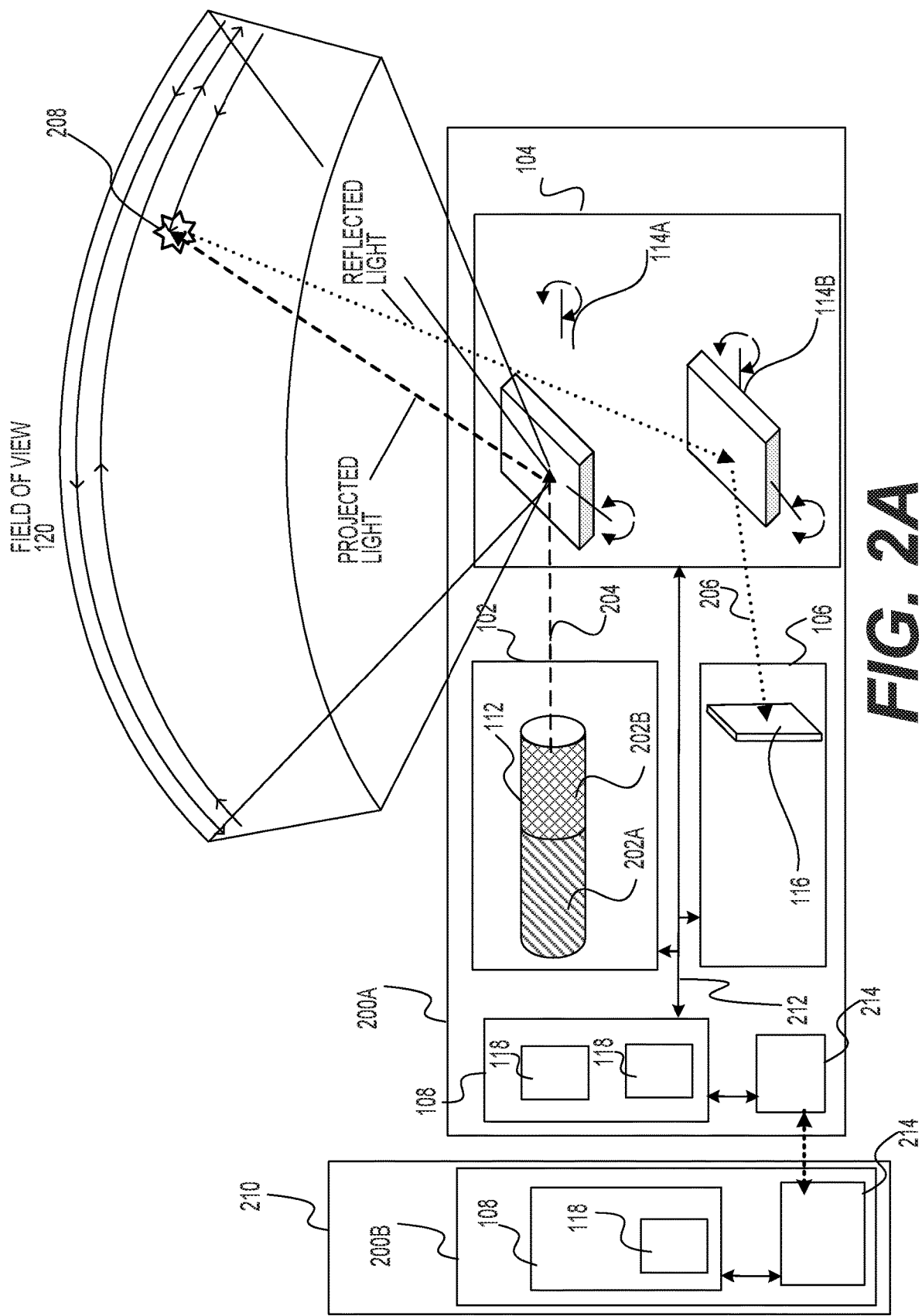

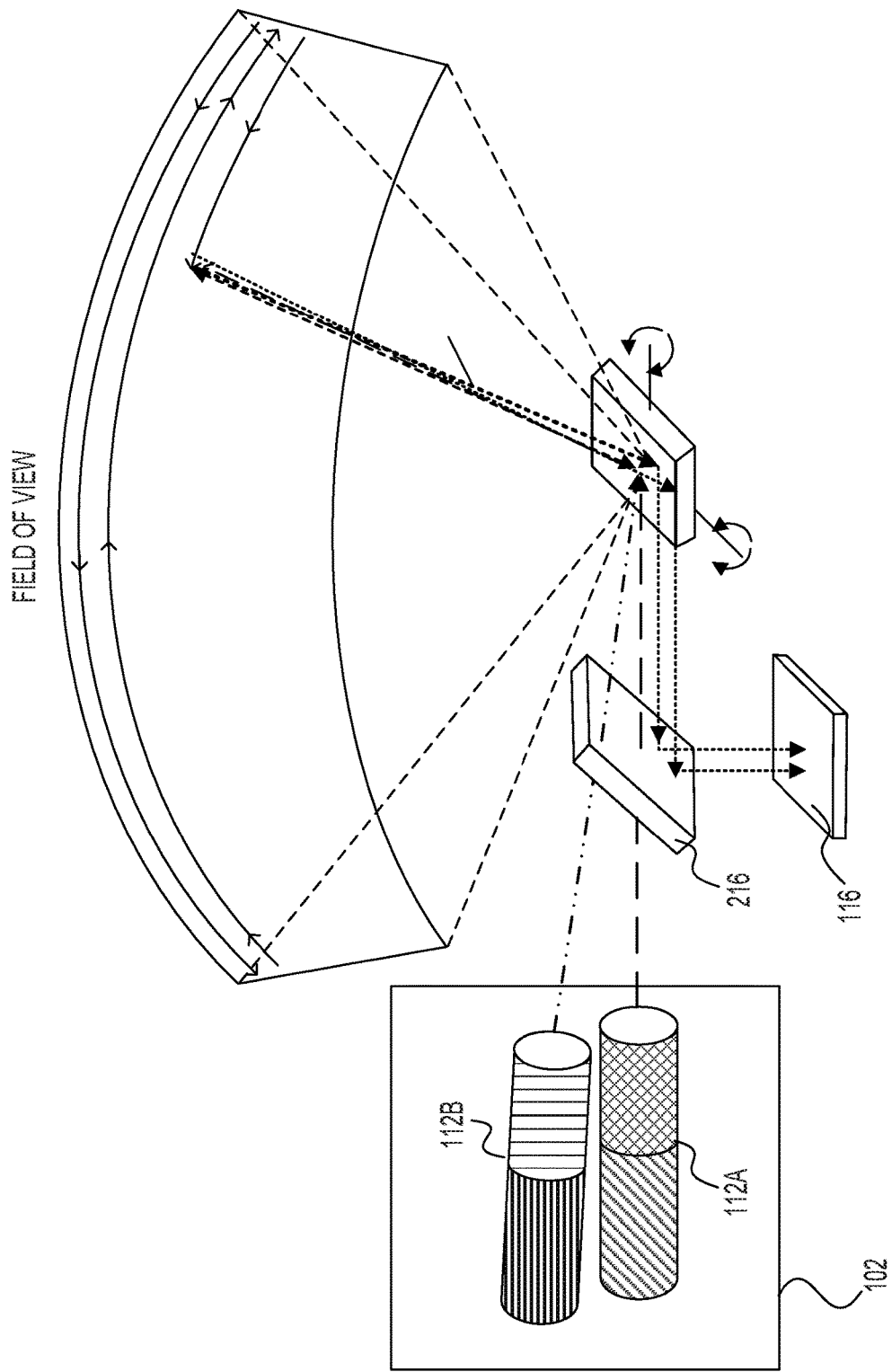

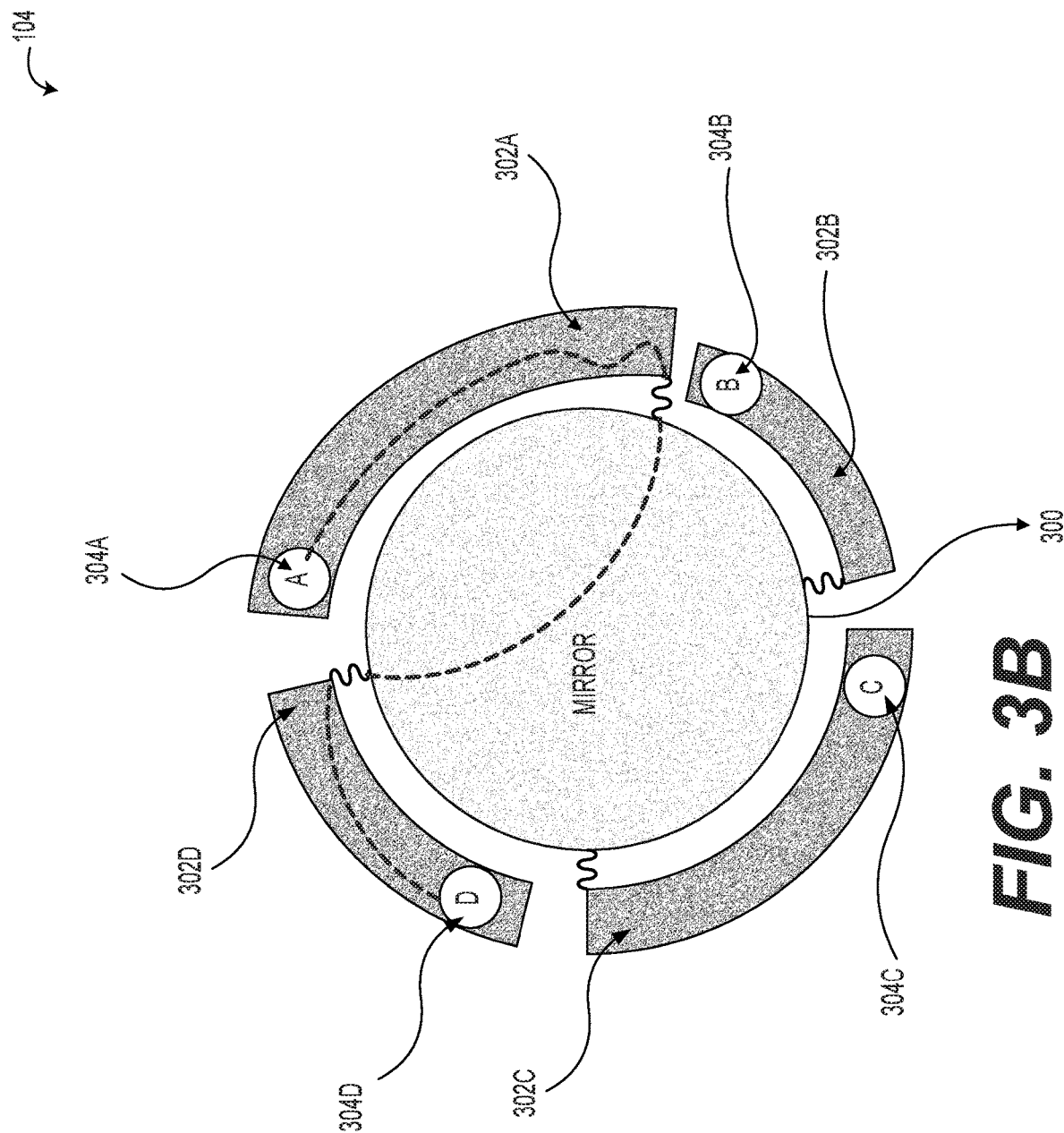

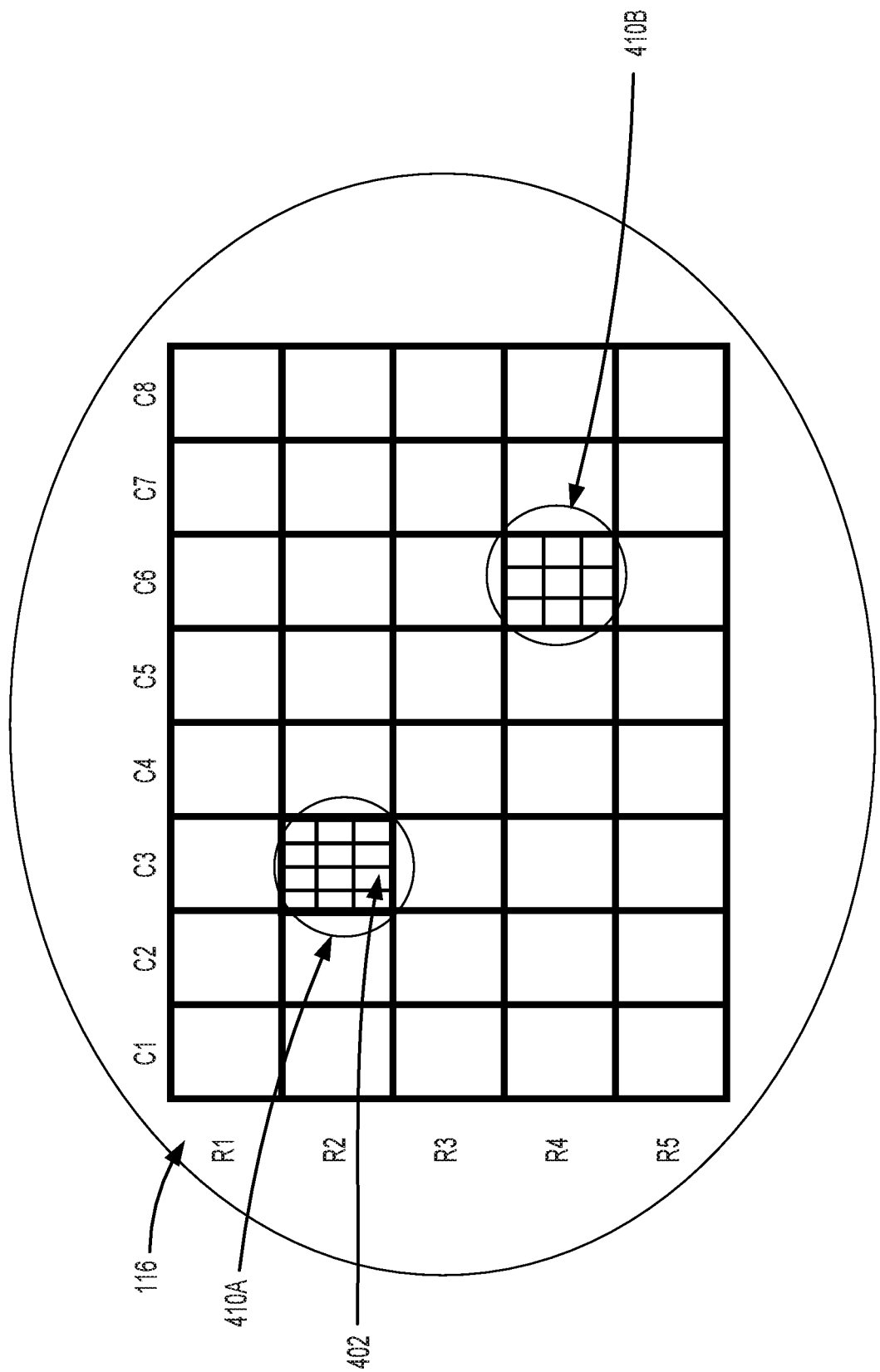

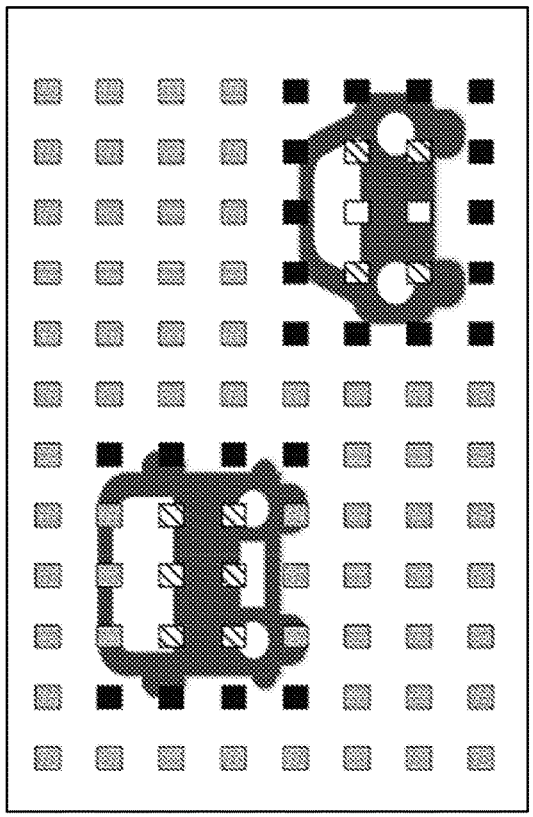
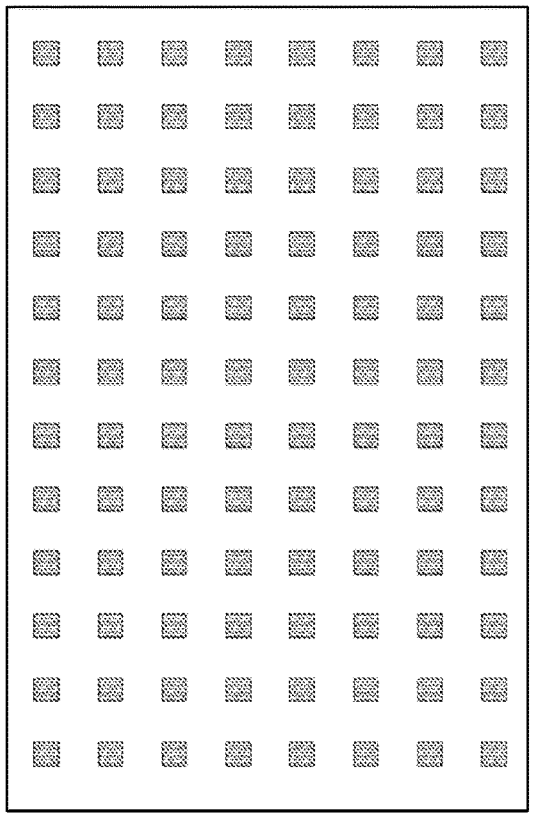
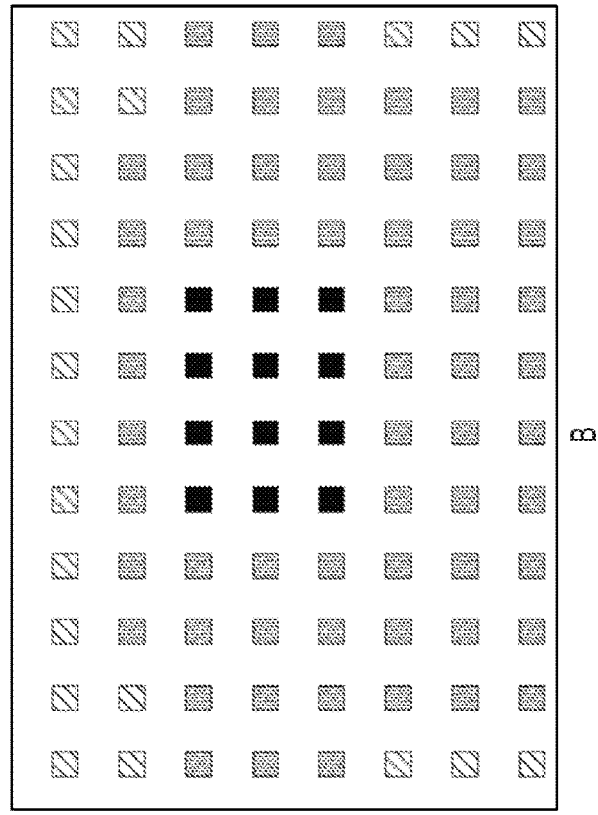
500
NO LIGHT FLUX
LOW LIGHT FLUX
DEFAULT LIGHT FLUX
HIGH LIGHT FLUX
*FIG. 5B*

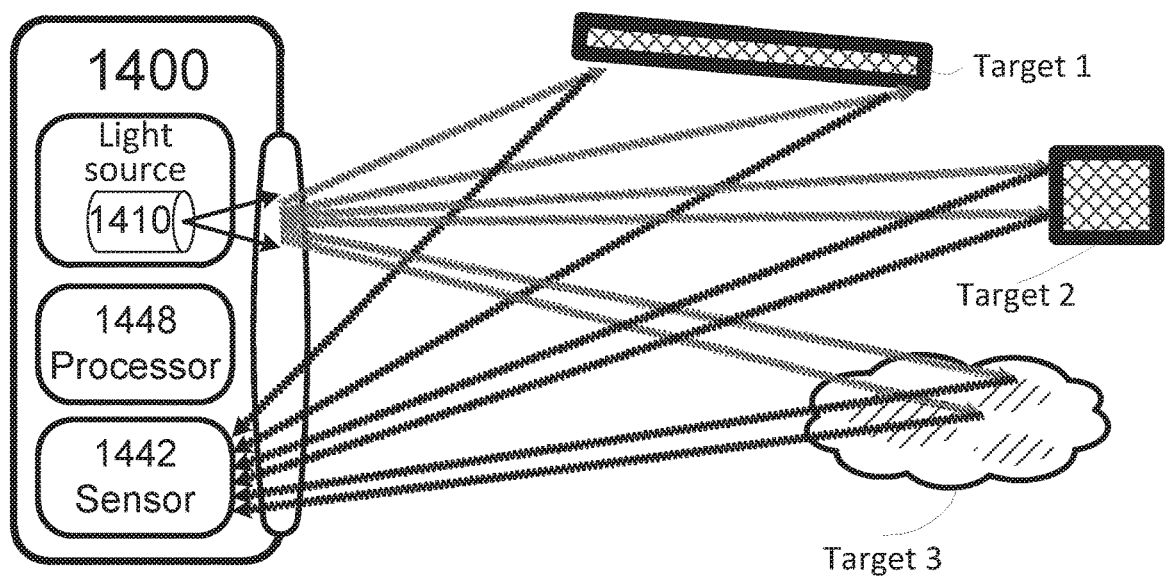
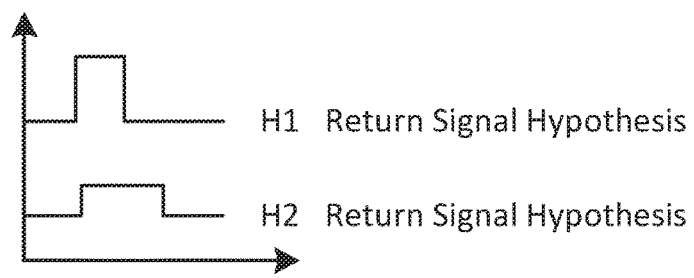
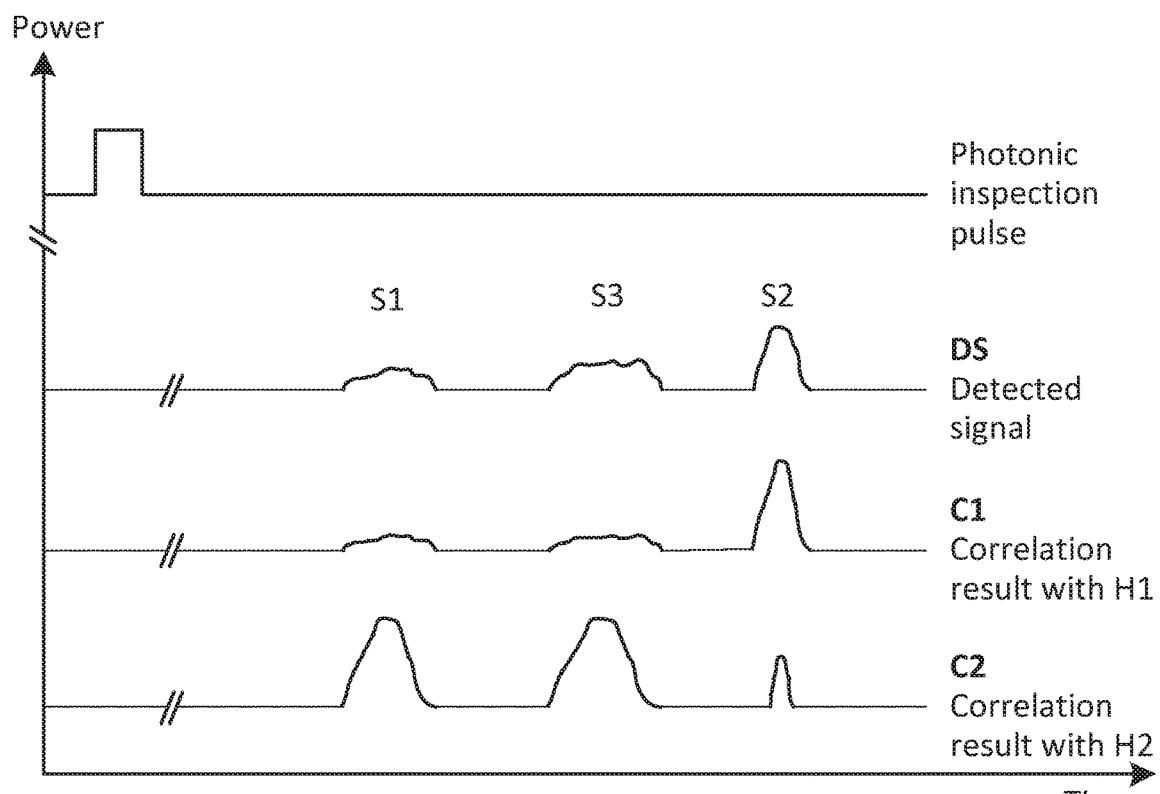
Fig. 16

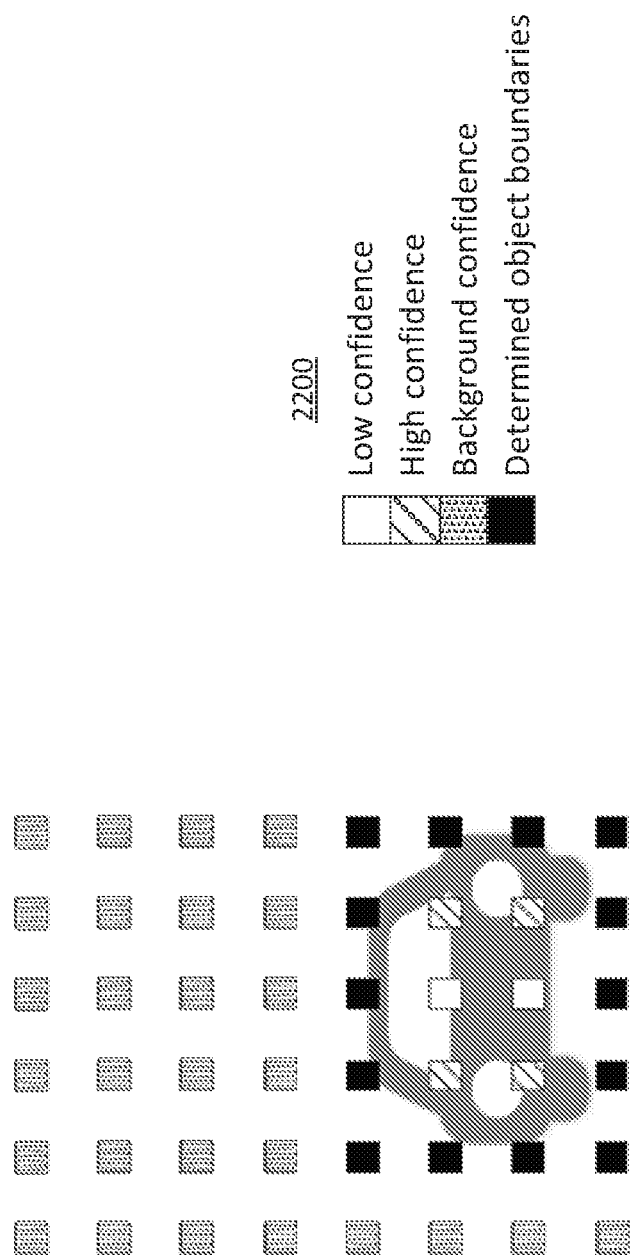

4500

4502
Processing first Lidar detection information to provide a first 3D model

4504
Processing second Lidar detection information, obtained after the first Lidar detection information, to provide a second 3D model

4506
Identify a first object detection in the first 3D model

4508
Identify a second object detection in the second 3D model

4510
Based on the first object detection and the second object detection, determine a classification for an object detected by the Lidar

Fig. 24

DETECTING ANGLES OF OBJECTS

CROSS-REFERENCES TO RELATED APPLICATIONS

This application is a continuation of International Application No. PCT/IB2018/000063, filed Jan. 3, 2018, which claims the benefit of priority of U.S. Provisional Patent Application No. 62/441,574, filed Jan. 3, 2017; U.S. Provisional Patent Application No. 62/441,578, filed Jan. 3, 2017; U.S. Provisional Patent Application No. 62/441,581, filed Jan. 3, 2017; U.S. Provisional Patent Application No. 62/441,583, filed Jan. 3, 2017; U.S. Provisional Patent Application No. 62/441,606, filed Jan. 3, 2017; U.S. Provisional Patent Application No. 62/441,610, filed Jan. 3, 2017; U.S. Provisional Patent Application No. 62/441,611, filed Jan. 3, 2017; U.S. Provisional Patent Application No. 62/455,627, filed Feb. 7, 2017; U.S. Provisional Patent Application No. 62/456,691, filed Feb. 9, 2017; U.S. Provisional Patent Application No. 62/461,802, filed Feb. 22, 2017; U.S. Provisional Patent Application No. 62/516,694, filed Jun. 8, 2017; U.S. Provisional Patent Application No. 62/521,450, filed Jun. 18, 2017; U.S. Provisional Patent Application No. 62/560,985, filed Sep. 20, 2017; U.S. Provisional Patent Application No. 62/563,367, filed Sep. 26, 2017; U.S. Provisional Patent Application No. 62/567,692, filed Oct. 3, 2017; U.S. Provisional Patent Application No. 62/589,686, filed Nov. 22, 2017; U.S. Provisional Patent Application No. 62/591,409, filed Nov. 28, 2017; and U.S. Provisional Patent Application No. 62/596,261, filed Dec. 8, 2017. All of the foregoing applications are incorporated herein by reference in their entirety.

BACKGROUND

I. Technical Field

The present disclosure relates generally to surveying technology for scanning a surrounding environment, and, more specifically, to systems and methods that use LIDAR technology to detect and classify objects in the surrounding environment.

II. Background Information

With the advent of driver assist systems and autonomous vehicles, automobiles need to be equipped with systems capable of reliably sensing and interpreting their surroundings, including identifying obstacles, hazards, objects, and other physical parameters that might impact navigation of the vehicle. To this end, a number of differing technologies have been suggested including radar, LIDAR, camera-based systems, operating alone or in a redundant manner.

One consideration with driver assistance systems and autonomous vehicles is an ability of the system to determine surroundings across different conditions including, rain, fog, darkness, bright light, and snow. A light detection and ranging system, (LIDAR a/k/a LADAR) is an example of technology that can work well in differing conditions, by measuring distances to objects by illuminating objects with light and measuring the reflected pulses with a sensor. A laser is one example of a light source that can be used in a LIDAR system. As with any sensing system, in order for a LIDAR-based sensing system to be fully adopted by the automotive industry, the system should provide reliable data enabling detection of far-away objects. Currently, however, the maximum illumination power of LIDAR systems is limited by the need to make the LIDAR systems eye-safe (i.e., so that they will not damage the human eye which can occur when a projected light emission is absorbed in the eye's cornea and lens, causing thermal damage to the retina.)

Moreover, extant LIDAR systems generally identify and classify objects using distance information determined from reflected pulses. For example, such information may be used to construct a point-cloud map (or other 3D map), from which objects may be identified and classified. However, such identification and classification is frequently error-prone and inaccurate, as well as inefficient. The systems and methods of the present disclosure are directed towards improving performance of LIDAR systems, particularly with regards to identification and classification of objects.

SUMMARY

Embodiments of the present disclosure may therefore improve the accuracy of and/or improve the efficiency of identification and classification of objects using a LIDAR. For example, systems of the present disclosure may detect one or more surface angles of an object based on one or more temporal distortions in reflection signals. In further embodiments, the systems of the present disclosure may identify objects using reflectivity fingerprints, surface angle fingerprints, or other measured properties, such as object surface physical composition, ambient illumination measured at a LIDAR dead time, difference in detection information from a previous frame, and confidence levels associated with one or more detection characteristics.

In one embodiment of the present disclosure, a LIDAR system for detecting a vehicle based on license plate reflectivity may comprise at least one processor. The at least one processor may be configured to scan a field of view by controlling movement of at least one deflector at which at least one light source is directed; receive, from at least one sensor, signals indicative of light reflected from a particular object in the field of view; detect, based on time of flight in the received signals, portions of the particular object in the field of view that are similarly spaced from the light source; and determine, based on the detected portions, at least a first portion having a first reflectivity corresponding to a license plate, and at least two additional spaced-apart portions corresponding to locations on the particular object other than a location of the first portion. The at least two additional portions may have reflectivity substantially lower than the first reflectivity. The at least one processor may be further configured to, based on a spatial relationship and a reflectivity relationship between the first portion and the at least two additional portions, classify the particular object as a vehicle.

In an embodiment of the present disclosure, a vehicle may comprise a body and at least one processor within the body. The at least one processor may be configured to scan a field of view by controlling movement of at least one deflector at which at least one light source is directed; receive, from at least one sensor, reflections signals indicative of light reflected from a particular object in the field of view; detect, based on time of flight, portions of the particular object in the field of view that are similarly spaced from the light source; and identify, based on the detected portions, at least a first portion having a first reflectivity, a second portion having a second reflectivity, and a third portion having a third reflectivity. The at least second and third portions may have reflectivity substantially lower than the first reflectivity. The at least one processor may be further configured to determine a reflectivity fingerprint of the particular object based on a reflectivity relationship between the first portion, the second portion, and the third portion; and classify the particular object based on the determined reflectivity fingerprint of the particular object.

In an embodiment of the present disclosure, a method for using LIDAR to detect a vehicle based on license plate reflectivity may comprise scanning a field of view by controlling movement of at least one deflector at which at least one light source is directed; receiving, from at least one sensor, signals indicative of light reflected from a particular object in the field of view; detecting, based on time of flight in the received signals, portions of the particular object in the field of view that are similarly spaced from the light source, and determining based on the detected portions, at least a first portion having a first reflectivity corresponding to a license plate, and at least two additional spaced-apart portions corresponding to locations on the particular object other than a location of the first portion. The at least two additional portions may have reflectivity substantially lower than the first reflectivity. The method may further comprise, based on a spatial relationship and a reflectivity relationship between the first portion and the at least two additional portions, classifying the particular object as a vehicle.

In an embodiment of the present disclosure, a non-transitory computer-readable storage medium may store instructions that, when executed by at least one processor, cause the at least one processor to perform a method for using LIDAR to detect a vehicle based on license plate reflectivity. The method may comprise scanning a field of view by controlling movement of at least one deflector at which at least one light source is directed; receiving, from at least one sensor, signals indicative of light reflected from a particular object in the field of view; detecting, based on time of flight in the received signals, portions of the particular object in the field of view that are similarly spaced from the light source; and determining based on the detected portions, at least a first portion having a first reflectivity corresponding to a license plate, and at least two additional spaced-apart portions corresponding to locations on the particular object other than a location of the first portion. The at least two additional portions may have reflectivity substantially lower than the first reflectivity. The method may further comprise, based on a spatial relationship and a reflectivity relationship between the first portion and the at least two additional portions, classifying the particular object as a vehicle.

In an embodiment of the present disclosure, a LIDAR system for use in a vehicle may comprise at least one processor. The at least one processor may be configured to control at least one light source for illuminating a field of view; scan a field of view by controlling movement of at least one deflector at which the at least one light source is directed; receive, from at least one sensor, reflections signals indicative of light reflected from an object in the field of view; detect at least one temporal distortion in the reflections signals; and determine from the at least one temporal distortion an angular orientation of at least a portion of the object.

In an embodiment of the present disclosure, a vehicle may comprise a body and at least one processor within the body. The at least one processor may be configured to control activation of at least one light source for illuminating a field of view; scan a field of view by controlling movement of at least one deflector at which the at least one light source is directed; receive, from at least one sensor, reflections signals indicative of light reflected from an object in the field of view; detect at least one temporal distortion in the reflections signals; and determine from the at least one temporal distortion an angular orientation of at least a portion of the object.

In an embodiment of the present disclosure, a method for using LIDAR to determine angular orientation of objects in a field of view may comprise controlling activation of at least one light source for illuminating a field of view; scanning a field of view by controlling movement of at least one deflector at which the at least one light source is directed; receiving, from at least one sensor, reflections signals indicative of light reflected from an object in the field of view; detecting at least one temporal distortion in the reflections signals; and determining from the at least one temporal distortion an angular orientation of at least a portion of the object.

In an embodiment of the present disclosure, a non-transitory computer-readable storage medium may store instructions that, when executed by at least one processor, cause the at least one processor to perform a method for using LIDAR to determine angular orientation of objects in a field of view. The method may comprise controlling activation of at least one light source for illuminating a field of view; scanning a field of view by controlling movement of at least one deflector at which the at least one light source is directed; receiving, from at least one sensor, reflections signals indicative of light reflected from an object in the field of view; detecting at least one temporal distortion in the reflections signals; and determining from the at least one temporal distortion an angular orientation of at least a portion of the object.

In an embodiment of the present disclosure, a vehicle-assistance system for classifying objects in a vehicle's surroundings may comprise at least one memory configured to store classification information for classifying a plurality of objects and at least one processor. The at least one processor may be configured to receive, on a pixel-by-pixel basis, a plurality of measurements associated with LIDAR detection results. The measurements may include at least one of: a presence indication, a surface angle, object surface physical composition, and a reflectivity level. The at least one processor may be further configured to receive, on the pixel-by-pixel basis, at least one confidence level associated with each received measurement; access the classification information; and based on the classification information and the received measurements with the at least one associated confidence level, identify a plurality of pixels as being associated with a particular object.

In an embodiment of the present disclosure, a vehicle-assistance system for identifying objects in a vehicle's surroundings may comprise at least one processor. The at least one processor may be configured to receive point-cloud information originating from a LIDAR configured to project light toward the vehicle's surroundings. The point-cloud information may be associated with a plurality of data points, and each data point may include indications of a three-dimensional location and angular information with respect to a reference plane. The at least one processor may be further configured to construct, from the received point cloud (PC) information, a point cloud map of the vehicle's surroundings. The point cloud map may be indicative of a shape of a particular object in the vehicle's surroundings and of angular orientations of at least two surfaces of the particular object. The at least one processor may be further configured to access object-related classification information; and identify the particular object based on the information from the point cloud map and the object-related classification information.

In an embodiment of the present disclosure, a method for using LIDAR system to classify objects in a field of view may comprise receiving, on a pixel-by-pixel basis, measurements associated with LIDAR detection results. The measurements may include at least one of a presence indication, a surface angle, and a reflectivity level. The method may further comprise receiving, on the pixel-by-pixel basis, a confidence level associated with each received measurement; accessing classification information for classifying the objects; and based on the classification information and the received measurements with the associated confidence level, classifying a plurality of pixels as being associated with a particular object.

In an embodiment of the present disclosure, a non-transitory computer-readable storage medium may store instructions that, when executed by at least one processor, cause the at least one processor to perform a method for identifying objects in a vehicle's surroundings. The method may comprise receiving point-cloud information originating from a LIDAR configured to project light toward the vehicle's surroundings. The point-cloud information may be associated with a plurality of data points, and each data point may include indications of a three-dimensional location and angular information with respect to a reference plane. The method may further comprise constructing, from the received point cloud information, a point cloud map of the vehicle's surroundings. The point cloud map may be indicative of a shape of a particular object in the vehicle's surroundings and of angular orientations of at least two surfaces of the particular object. The method may further comprise accessing object-related classification information; and identifying the particular object based on the information from the point cloud map and the object-related classification information.

In an embodiment of the present disclosure, a vehicle-assistance system for classifying objects in a vehicle's surroundings may comprise at least one memory configured to store classification information for classifying a plurality of objects and at least one processor. The at least one processor may be configured to receive a plurality of detection results associated with LIDAR detection results. Each detection result may include location information, and further information indicative of at least two of the following detection characteristics: object surface reflectivity; temporal spreading of signal reflected from the object; object surface physical composition; ambient illumination measured at a LIDAR dead time; difference in detection information from a previous frame; and confidence level associated with another detection characteristic. The at least one processor may be further configured to access the classification information; and based on the classification information and detections results, classify an object in the vehicle's surroundings.

Consistent with other disclosed embodiments, non-transitory computer-readable storage media may store program instructions, which are executed by at least one processing device and perform any of the methods or processor-executed steps described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 2A is a diagram illustrating an example configuration of an example projecting unit in accordance with some embodiments of the present disclosure.

FIG. 2C is a diagram illustrating yet another example configuration of an example projecting unit in accordance with some embodiments of the present disclosure.

FIG. 3B is a diagram illustrating another example configuration of an example scanning unit in accordance with some embodiments of the present disclosure.

FIG. 4C is a diagram illustrating yet another example configuration of an example sensing unit in accordance with some embodiments of the present disclosure.

FIG. 5B includes three example diagrams illustrating emission scheme in a single frame-time for the whole field of view.

FIG. 16 illustrates an example of correlating temporal sequences of detected reflection levels and a return-signal hypothesis to provide a correlation output consistent with some embodiments of the present disclosure.

FIG. 22 depicts an example of identification performed using confidence levels consistent with some embodiments of the present disclosure.

FIG. 24 is a flowchart illustrating an exemplary method for object classification consistent with some embodiments of the present disclosure.

DETAILED DESCRIPTION

Figure 1A:
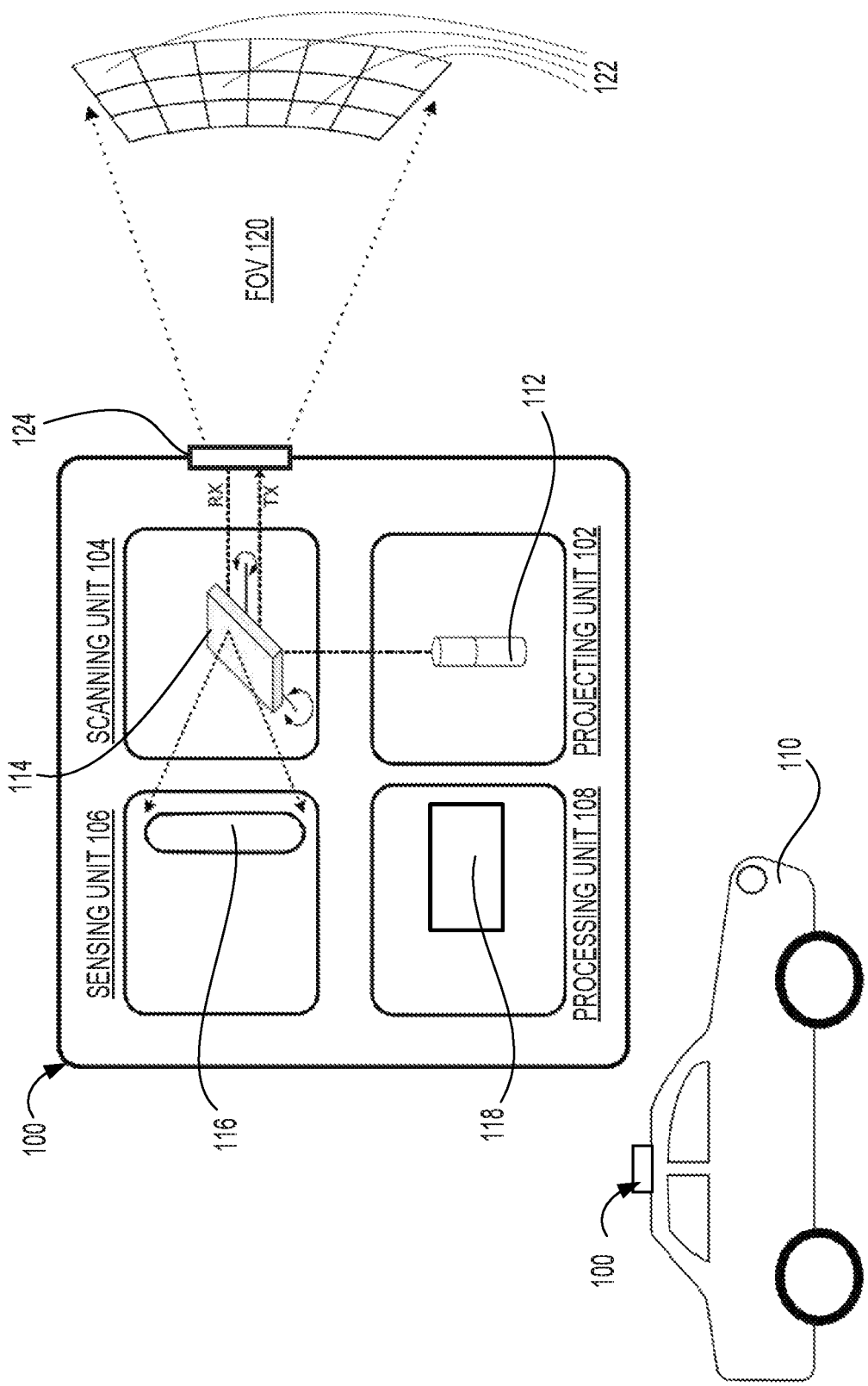
FIG. 1A is a diagram illustrating an exemplary LIDAR system consistent with disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Terms Definitions

Disclosed embodiments may involve an optical system. As used herein, the term "optical system" broadly includes any system that is used for the generation, detection and/or manipulation of light. By way of example only, an optical system may include one or more optical components for generating, detecting and/or manipulating light. For example, light sources, lenses, mirrors, prisms, beam splitters, collimators, polarizing optics, optical modulators, optical switches, optical amplifiers, optical detectors, optical sensors, fiber optics, semiconductor optic components, while each not necessarily required, may each be part of an optical system. In addition to the one or more optical components, an optical system may also include other non-optical components such as electrical components, mechanical components, chemical reaction components, and semiconductor components. The non-optical components may cooperate with optical components of the optical system. For example, the optical system may include at least one processor for analyzing detected light.

Consistent with the present disclosure, the optical system may be a LIDAR system. As used herein, the term "LIDAR system" broadly includes any system which can determine values of parameters indicative of a distance between a pair of tangible objects based on reflected light. In one embodiment, the LIDAR system may determine a distance between a pair of tangible objects based on reflections of light emitted by the LIDAR system. As used herein, the term "determine distances" broadly includes generating outputs which are indicative of distances between pairs of tangible objects. The determined distance may represent the physical dimension between a pair of tangible objects. By way of example only, the determined distance may include a line of flight distance between the LIDAR system and another tangible object in a field of view of the LIDAR system. In another embodiment, the LIDAR system may determine the relative velocity between a pair of tangible objects based on reflections of light emitted by the LIDAR system. Examples of outputs indicative of the distance between a pair of tangible objects include: a number of standard length units between the tangible objects (e.g. number of meters, number of inches, number of kilometers, number of millimeters), a number of arbitrary length units (e.g. number of LIDAR system lengths), a ratio between the distance to another length (e.g. a ratio to a length of an object detected in a field of view of the LIDAR system), an amount of time (e.g. given as standard unit, arbitrary units or ratio, for example, the time it takes light to travel between the tangible objects), one or more locations (e.g. specified using an agreed coordinate system, specified in relation to a known location), and more.

The LIDAR system may determine the distance between a pair of tangible objects based on reflected light. In one embodiment, the LIDAR system may process detection results of a sensor which creates temporal information indicative of a period of time between the emission of a light signal and the time of its detection by the sensor. The period of time is occasionally referred to as "time of flight" of the light signal. In one example, the light signal may be a short pulse, whose rise and/or fall time may be detected in reception. Using known information about the speed of light in the relevant medium (usually air), the information regarding the time of flight of the light signal can be processed to provide the distance the light signal traveled between emission and detection. In another embodiment, the LIDAR system may determine the distance based on frequency phase-shift (or multiple frequency phase-shift). Specifically, the LIDAR system may process information indicative of one or more modulation phase shifts (e.g. by solving some simultaneous equations to give a final measure) of the light signal. For example, the emitted optical signal may be modulated with one or more constant frequencies. The at least one phase shift of the modulation between the emitted signal and the detected reflection may be indicative of the distance the light traveled between emission and detection. The modulation may be applied to a continuous wave light signal, to a quasi-continuous wave light signal, or to another type of emitted light signal. It is noted that additional information may be used by the LIDAR system for determining the distance, e.g. location information (e.g. relative positions) between the projection location, the detection location of the signal (especially if distanced from one another), and more.

In some embodiments, the LIDAR system may be used for detecting a plurality of objects in an environment of the LIDAR system. The term "detecting an object in an environment of the LIDAR system" broadly includes generating information which is indicative of an object that reflected light toward a detector associated with the LIDAR system. If more than one object is detected by the LIDAR system, the generated information pertaining to different objects may be interconnected, for example a car is driving on a road, a bird is sitting on the tree, a man touches a bicycle, a van moves towards a building. The dimensions of the environment in which the LIDAR system detects objects may vary with respect to implementation. For example, the LIDAR system may be used for detecting a plurality of objects in an environment of a vehicle on which the LIDAR system is installed, up to a horizontal distance of 100 m (or 200 m, 300 m, etc.), and up to a vertical distance of 10 m (or 25 m, 50 m, etc.). In another example, the LIDAR system may be used for detecting a plurality of objects in an environment of a vehicle or within a predefined horizontal range (e.g., 25°, 50°, 100°, 180°, etc.), and up to a predefined vertical elevation (e.g., ±10°, ±20°, +40°-20°, ±90° or 0°-90°).

As used herein, the term "detecting an object" may broadly refer to determining an existence of the object (e.g., an object may exist in a certain direction with respect to the LIDAR system and/or to another reference location, or an object may exist in a certain spatial volume). Additionally or alternatively, the term "detecting an object" may refer to determining a distance between the object and another location (e.g. a location of the LIDAR system, a location on earth, or a location of another object). Additionally or alternatively, the term "detecting an object" may refer to identifying the object (e.g. classifying a type of object such as car, plant, tree, road; recognizing a specific object (e.g., the Washington Monument); determining a license plate number; determining a composition of an object (e.g., solid, liquid, transparent, semitransparent); determining a kinematic parameter of an object (e.g., whether it is moving, its velocity, its movement direction, expansion of the object). Additionally or alternatively, the term "detecting an object" may refer to generating a point cloud map in which every point of one or more points of the point cloud map correspond to a location in the object or a location on a face thereof. In one embodiment, the data resolution associated with the point cloud map representation of the field of view may be associated with 0.1×0.1° or 0.3°×0.3° of the field of view.

Consistent with the present disclosure, the term "object" broadly includes a finite composition of matter that may reflect light from at least a portion thereof. For example, an object may be at least partially solid (e.g. cars, trees); at least partially liquid (e.g. puddles on the road, rain); at least partly gaseous (e.g. fumes, clouds); made from a multitude of distinct particles (e.g. sand storm, fog, spray); and may be of one or more scales of magnitude, such as ~1 millimeter (mm), ~5 mm, ~10 mm, ~50 mm, ~100 mm, ~500 mm, ~1 meter (m), ~5 m, ~10 m, ~50 m, ~100 m, and so on. Smaller or larger objects, as well as any size in between those examples, may also be detected. It is noted that for various reasons, the LIDAR system may detect only part of the object. For example, in some cases, light may be reflected from only some sides of the object (e.g., only the side opposing the LIDAR system will be detected); in other cases, light may be projected on only part of the object (e.g. laser beam projected onto a road or a building); in other cases, the object may be partly blocked by another object between the LIDAR system and the detected object; in other cases, the LIDAR's sensor may only detects light reflected from a portion of the object, e.g., because ambient light or other interferences interfere with detection of some portions of the object.

Consistent with the present disclosure, a LIDAR system may be configured to detect objects by scanning the environment of LIDAR system. The term "scanning the environment of LIDAR system" broadly includes illuminating the field of view or a portion of the field of view of the LIDAR system. In one example, scanning the environment of LIDAR system may be achieved by moving or pivoting a light deflector to deflect light in differing directions toward different parts of the field of view. In another example, scanning the environment of LIDAR system may be achieved by changing a positioning (i.e. location and/or orientation) of a sensor with respect to the field of view. In another example, scanning the environment of LIDAR system may be achieved by changing a positioning (i.e. location and/or orientation) of a light source with respect to the field of view. In yet another example, scanning the environment of LIDAR system may be achieved by changing the positions of at least one light source and of at least one sensor to move rigidly respect to the field of view (i.e. the relative distance and orientation of the at least one sensor and of the at least one light source remains).

As used herein the term "field of view of the LIDAR system" may broadly include an extent of the observable environment of LIDAR system in which objects may be detected. It is noted that the field of view (FOV) of the LIDAR system may be affected by various conditions such as but not limited to: an orientation of the LIDAR system (e.g. is the direction of an optical axis of the LIDAR system); a position of the LIDAR system with respect to the environment (e.g. distance above ground and adjacent topography and obstacles); operational parameters of the LIDAR system (e.g. emission power, computational settings, defined angles of operation), etc. The field of view of LIDAR system may be defined, for example, by a solid angle (e.g. defined using φ, θ angles, in which φ and θ are angles defined in perpendicular planes, e.g. with respect to symmetry axes of the LIDAR system and/or its FOV). In one example, the field of view may also be defined within a certain range (e.g. up to 200 m).

Similarly, the term "instantaneous field of view" may broadly include an extent of the observable environment in which objects may be detected by the LIDAR system at any given moment. For example, for a scanning LIDAR system, the instantaneous field of view is narrower than the entire FOV of the LIDAR system, and it can be moved within the FOV of the LIDAR system in order to enable detection in other parts of the FOV of the LIDAR system. The movement of the instantaneous field of view within the FOV of the LIDAR system may be achieved by moving a light deflector of the LIDAR system (or external to the LIDAR system), so as to deflect beams of light to and/or from the LIDAR system in differing directions. In one embodiment, LIDAR system may be configured to scan scene in the environment in which the LIDAR system is operating. As used herein the term "scene" may broadly include some or all of the objects within the field of view of the LIDAR system, in their relative positions and in their current states, within an operational duration of the LIDAR system. For example, the scene may include ground elements (e.g. earth, roads, grass, sidewalks, road surface marking), sky, man-made objects (e.g. vehicles, buildings, signs), vegetation, people, animals, light projecting elements (e.g. flashlights, sun, other LIDAR systems), and so on.

Disclosed embodiments may involve obtaining information for use in generating reconstructed three-dimensional models. Examples of types of reconstructed three-dimensional models which may be used include point cloud models, and Polygon Mesh (e.g. a triangle mesh). The terms "point cloud" and "point cloud model" are widely known in the art, and should be construed to include a set of data points located spatially in some coordinate system (i.e., having an identifiable location in a space described by a respective coordinate system). The term "point cloud point" refer to a point in space (which may be dimensionless, or a miniature cellular space, e.g. 1 cm³), and whose location may be described by the point cloud model using a set of coordinates (e.g. (X,Y,Z), (r,φ,θ)). By way of example only, the point cloud model may store additional information for some or all of its points (e.g. color information for points generated from camera images). Likewise, any other type of reconstructed three-dimensional model may store additional information for some or all of its objects. Similarly, the terms "polygon mesh" and "triangle mesh" are widely known in the art, and are to be construed to include, among other things, a set of vertices, edges and faces that define the shape of one or more 3D objects (such as a polyhedral object). The faces may include one or more of the following: triangles (triangle mesh), quadrilaterals, or other simple convex polygons, since this may simplify rendering. The faces may also include more general concave polygons, or polygons with holes. Polygon meshes may be represented using differing techniques, such as: Vertex-vertex meshes, Face-vertex meshes, Winged-edge meshes and Render dynamic meshes. Different portions of the polygon mesh (e.g., vertex, face, edge) are located spatially in some coordinate system (i.e., having an identifiable location in a space described by the respective coordinate system), either directly and/or relative to one another. The generation of the reconstructed three-dimensional model may be implemented using any standard, dedicated and/or novel photogrammetry technique, many of which are known in the art. It is noted that other types of models of the environment may be generated by the LIDAR system.

Consistent with disclosed embodiments, the LIDAR system may include at least one projecting unit with a light source configured to project light. As used herein the term "light source" broadly refers to any device configured to emit light. In one embodiment, the light source may be a laser such as a solid-state laser, laser diode, a high power laser, or an alternative light source such as, a light emitting diode (LED)-based light source. In addition, light source 112 as illustrated throughout the figures, may emit light in differing formats, such as light pulses, continuous wave (CW), quasi-CW, and so on. For example, one type of light source that may be used is a vertical-cavity surface-emitting laser (VCSEL). Another type of light source that may be used is an external cavity diode laser (ECDL). In some examples, the light source may include a laser diode configured to emit light at a wavelength between about 650 nm and 1,150 nm. Alternatively, the light source may include a laser diode configured to emit light at a wavelength between about 800 nm and about 1,000 nm, between about 850 nm and about 950 nm, or between about 1,300 nm and about 1,600 nm. Unless indicated otherwise, the term "about" with regards to a numeric value is defined as a variance of up to 5% with respect to the stated value. Additional details on the projecting unit and the at least one light source are described below with reference to FIGS. 2A-2C.

Consistent with disclosed embodiments, the LIDAR system may include at least one scanning unit with at least one light deflector configured to deflect light from the light source in order to scan the field of view. The term "light deflector" broadly includes any mechanism or module which is configured to make light deviate from its original path; for example, a mirror, a prism, controllable lens, a mechanical mirror, mechanical scanning polygons, active diffraction (e.g. controllable LCD), Risley prisms, non-mechanical-electro-optical beam steering (such as made by Vscent), polarization grating (such as offered by Boulder Non-Linear Systems), optical phased array (OPA), and more. In one embodiment, a light deflector may include a plurality of optical components, such as at least one reflecting element (e.g. a mirror), at least one refracting element (e.g. a prism, a lens), and so on. In one example, the light deflector may be movable, to cause light deviate to differing degrees (e.g. discrete degrees, or over a continuous span of degrees). The light deflector may optionally be controllable in different ways (e.g. deflect to a degree α, change deflection angle by Δα, move a component of the light deflector by M millimeters, change speed in which the deflection angle changes). In addition, the light deflector may optionally be operable to change an angle of deflection within a single plane (e.g., θ coordinate). The light deflector may optionally be operable to change an angle of deflection within two non-parallel planes (e.g., θ and φ coordinates). Alternatively or in addition, the light deflector may optionally be operable to change an angle of deflection between predetermined settings (e.g. along a predefined scanning route) or otherwise. With respect the use of light deflectors in LIDAR systems, it is noted that a light deflector may be used in the outbound direction (also referred to as transmission direction, or TX) to deflect light from the light source to at least a part of the field of view. However, a light deflector may also be used in the inbound direction (also referred to as reception direction, or RX) to deflect light from at least a part of the field of view to one or more light sensors. Additional details on the scanning unit and the at least one light deflector are described below with reference to FIGS. 3A-3C.

Disclosed embodiments may involve pivoting the light deflector in order to scan the field of view. As used herein the term "pivoting" broadly includes rotating of an object (especially a solid object) about one or more axis of rotation, while substantially maintaining a center of rotation fixed. In one embodiment, the pivoting of the light deflector may include rotation of the light deflector about a fixed axis (e.g., a shaft), but this is not necessarily so. For example, in some MEMS mirror implementation, the MEMS mirror may move by actuation of a plurality of benders connected to the mirror, the mirror may experience some spatial translation in addition to rotation. Nevertheless, such mirror may be designed to rotate about a substantially fixed axis, and therefore consistent with the present disclosure it considered to be pivoted. In other embodiments, some types of light deflectors (e.g. non-mechanical-electro-optical beam steering, OPA) do not require any moving components or internal movements in order to change the deflection angles of deflected light. It is noted that any discussion relating to moving or pivoting a light deflector is also mutatis mutandis applicable to controlling the light deflector such that it changes a deflection behavior of the light deflector. For example, controlling the light deflector may cause a change in a deflection angle of beams of light arriving from at least one direction.

Disclosed embodiments may involve receiving reflections associated with a portion of the field of view corresponding to a single instantaneous position of the light deflector. As used herein, the term "instantaneous position of the light deflector" (also referred to as "state of the light deflector") broadly refers to the location or position in space where at least one controlled component of the light deflector is situated at an instantaneous point in time, or over a short span of time. In one embodiment, the instantaneous position of light deflector may be gauged with respect to a frame of reference. The frame of reference may pertain to at least one fixed point in the LIDAR system. Or, for example, the frame of reference may pertain to at least one fixed point in the scene. In some embodiments, the instantaneous position of the light deflector may include some movement of one or more components of the light deflector (e.g. mirror, prism), usually to a limited degree with respect to the maximal degree of change during a scanning of the field of view. For example, a scanning of the entire field of view of the LIDAR system may include changing deflection of light over a span of 30°, and the instantaneous position of the at least one light deflector may include angular shifts of the light deflector within 0.05°. In other embodiments, the term "instantaneous position of the light deflector" may refer to the positions of the light deflector during acquisition of light which is processed to provide data for a single point of a point cloud (or another type of 3D model) generated by the LIDAR system. In some embodiments, an instantaneous position of the light deflector may correspond with a fixed position or orientation in which the deflector pauses for a short time during illumination of a particular sub-region of the LIDAR field of view. In other cases, an instantaneous position of the light deflector may correspond with a certain position/orientation along a scanned range of positions/orientations of the light deflector that the light deflector passes through as part of a continuous or semi-continuous scan of the LIDAR field of view. In some embodiments, the light deflector may be moved such that during a scanning cycle of the LIDAR FOV the light deflector is located at a plurality of different instantaneous positions. In other words, during the period of time in which a scanning cycle occurs, the deflector may be moved through a series of different instantaneous positions/orientations, and the deflector may reach each different instantaneous position/orientation at a different time during the scanning cycle.

Consistent with disclosed embodiments, the LIDAR system may include at least one sensing unit with at least one sensor configured to detect reflections from objects in the field of view. The term "sensor" broadly includes any device, element, or system capable of measuring properties (e.g., power, frequency, phase, pulse timing, pulse duration) of electromagnetic waves and to generate an output relating to the measured properties. In some embodiments, the at least one sensor may include a plurality of detectors constructed from a plurality of detecting elements. The at least one sensor may include light sensors of one or more types. It is noted that the at least one sensor may include multiple sensors of the same type which may differ in other characteristics (e.g., sensitivity, size). Other types of sensors may also be used. Combinations of several types of sensors can be used for different reasons, such as improving detection over a span of ranges (especially in close range); improving the dynamic range of the sensor; improving the temporal response of the sensor; and improving detection in varying environmental conditions (e.g. atmospheric temperature, rain, etc.).

In one embodiment, the at least one sensor includes a SiPM (Silicon photomultipliers) which is a solid-state single-photon-sensitive device built from an array of avalanche photodiode (APD), single photon avalanche diode (SPAD), serving as detection elements on a common silicon substrate. In one example, a typical distance between SPADs may be between about 10 µm and about 50 µm, wherein each SPAD may have a recovery time of between about 20 ns and about 100 ns. Similar photomultipliers from other, non-silicon materials may also be used. Although a SiPM device works in digital/switching mode, the SiPM is an analog device because all the microcells may be read in parallel, making it possible to generate signals within a dynamic range from a single photon to hundreds and thousands of photons detected by the different SPADs. It is noted that outputs from different types of sensors (e.g., SPAD, APD, SiPM, PIN diode, Photodetector) may be combined together to a single output which may be processed by a processor of the LIDAR system. Additional details on the sensing unit and the at least one sensor are described below with reference to FIGS. 4A-4C.

Consistent with disclosed embodiments, the LIDAR system may include or communicate with at least one processor configured to execute differing functions. The at least one processor may constitute any physical device having an electric circuit that performs a logic operation on input or inputs. For example, the at least one processor may include one or more integrated circuits (IC), including Application-specific integrated circuit (ASIC), microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by at least one processor may, for example, be pre-loaded into a memory integrated with or embedded into the controller or may be stored in a separate memory. The memory may comprise a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the memory is configured to store information representative data about objects in the environment of the LIDAR system. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact. Additional details on the processing unit and the at least one processor are described below with reference to FIGS. 5A-5C.

System Overview

FIG. 1A illustrates a LIDAR system 100 including a projecting unit 102, a scanning unit 104, a sensing unit 106, and a processing unit 108. LIDAR system 100 may be mountable on a vehicle 110. Consistent with embodiments of the present disclosure, projecting unit 102 may include at least one light source 112, scanning unit 104 may include at least one light deflector 114, sensing unit 106 may include at least one sensor 116, and processing unit 108 may include at least one processor 118. In one embodiment, at least one processor 118 may be configured to coordinate operation of the at least one light source 112 with the movement of at least one light deflector 114 in order to scan a field of view 120. During a scanning cycle, each instantaneous position of at least one light deflector 114 may be associated with a particular portion 122 of field of view 120. In addition, LIDAR system 100 may include at least one optional optical window 124 for directing light projected towards field of view 120 and/or receiving light reflected from objects in field of view 120. Optional optical window 124 may serve different purposes, such as collimation of the projected light and focusing of the reflected light. In one embodiment, optional optical window 124 may be an opening, a flat window, a lens, or any other type of optical window.

Consistent with the present disclosure, LIDAR system 100 may be used in autonomous or semi-autonomous road-vehicles (for example, cars, buses, vans, trucks and any other terrestrial vehicle). Autonomous road-vehicles with LIDAR system 100 may scan their environment and drive to a destination vehicle without human input. Similarly, LIDAR system 100 may also be used in autonomous/semi-autonomous aerial-vehicles (for example, UAV, drones, quadcopters, and any other airborne vehicle or device); or in an autonomous or semi-autonomous water vessel (e.g., boat, ship, submarine, or any other watercraft). Autonomous aerial-vehicles and water craft with LIDAR system 100 may scan their environment and navigate to a destination autonomously or using a remote human operator. According to one embodiment, vehicle 110 (either a road-vehicle, aerial-vehicle, or watercraft) may use LIDAR system 100 to aid in detecting and scanning the environment in which vehicle 110 is operating.

In some embodiments, LIDAR system 100 may include one or more scanning units 104 to scan the environment around vehicle 110. LIDAR system 100 may be attached or mounted to any part of vehicle 110. Sensing unit 106 may receive reflections from the surroundings of vehicle 110, and transfer reflections signals indicative of light reflected from objects in field of view 120 to processing unit 108. Consistent with the present disclosure, scanning units 104 may be mounted to or incorporated into a bumper, a fender, a side panel, a spoiler, a roof, a headlight assembly, a taillight assembly, a rear-view mirror assembly, a hood, a trunk or any other suitable part of vehicle 110 capable of housing at least a portion of the LIDAR system. In some cases, LIDAR system 100 may capture a complete surround view of the environment of vehicle 110. Thus, LIDAR system 100 may have a 360-degree horizontal field of view. In one example, as shown in FIG. 1A, LIDAR system 100 may include a single scanning unit 104 mounted on a roof vehicle 110. Alternatively, LIDAR system 100 may include multiple scanning units (e.g., two, three, four, or more scanning units 104) each with a field of few such that in the aggregate the horizontal field of view is covered by a 360-degree scan around vehicle 110. One skilled in the art will appreciate that LIDAR system 100 may include any number of scanning units 104 arranged in any manner, each with an 80° to 120° field of view or less, depending on the number of units employed. Moreover, a 360-degree horizontal field of view may be also obtained by mounting a multiple LIDAR systems 100 on vehicle 110, each with a single scanning unit 104. It is nevertheless noted, that the one or more LIDAR systems 100 do not have to provide a complete 360° field of view, and that narrower fields of view may be useful in some situations. For example, vehicle 110 may require a first LIDAR system 100 having an field of view of 75° looking ahead of the vehicle, and possibly a second LIDAR system 100 with a similar FOV looking backward (optionally with a lower detection range). It is also noted that different vertical field of view angles may also be implemented.

Figure 1B:
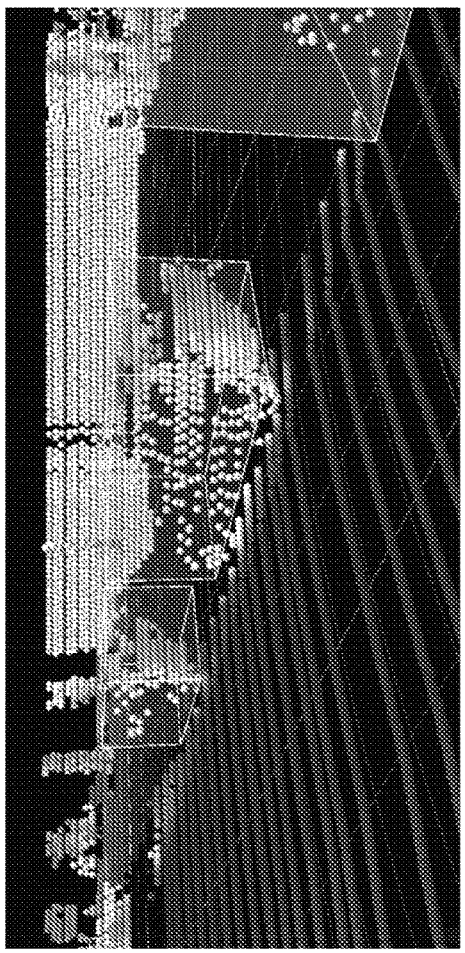
FIG. 1B is an image showing an exemplary output of single scanning cycle of a LIDAR system mounted on a vehicle consistent with disclosed embodiments.

FIG. 1B is an image showing an exemplary output from a single scanning cycle of LIDAR system 100 mounted on vehicle 110 consistent with disclosed embodiments. In this example, scanning unit 104 is incorporated into a right headlight assembly of vehicle 110. Every gray dot in the image corresponds to a location in the environment around vehicle 110 determined from reflections detected by sensing unit 106. In addition to location, each gray dot may also be associated with different types of information, for example, intensity (e.g., how much light returns back from that location), reflectivity, proximity to other dots, and more. In one embodiment, LIDAR system 100 may generate a plurality of point-cloud data entries from detected reflections of multiple scanning cycles of the field of view to enable, for example, determining a point cloud model of the environment around vehicle 110.

Figure 1C:
FIG. 1C is another image showing a representation of a point cloud model determined from output of a LIDAR system consistent with disclosed embodiments.

FIG. 1C is an image showing a representation of the point cloud model determined from the output of LIDAR system 100. Consistent with disclosed embodiments, by processing the generated point-cloud data entries of the environment around vehicle 110, a surround-view image may be produced from the point cloud model. In one embodiment, the point cloud model may be provided to a feature extraction module, which processes the point cloud information to identify a plurality of features. Each feature may include data about different aspects of the point cloud and/or of objects in the environment around vehicle 110 (e.g. cars, trees, people, and roads). Features may have the same resolution of the point cloud model (i.e. having the same number of data points, optionally arranged into similar sized 2D arrays), or may have different resolutions. The features may be stored in any kind of data structure (e.g. raster, vector, 2D array, 1D array). In addition, virtual features, such as a representation of vehicle 110, border lines, or bounding boxes separating regions or objects in the image (e.g., as depicted in FIG. 1B), and icons representing one or more identified objects, may be overlaid on the representation of the point cloud model to form the final surround-view image. For example, a symbol of vehicle 110 may be overlaid at a center of the surround-view image.

The Projecting Unit

Figure 2B:
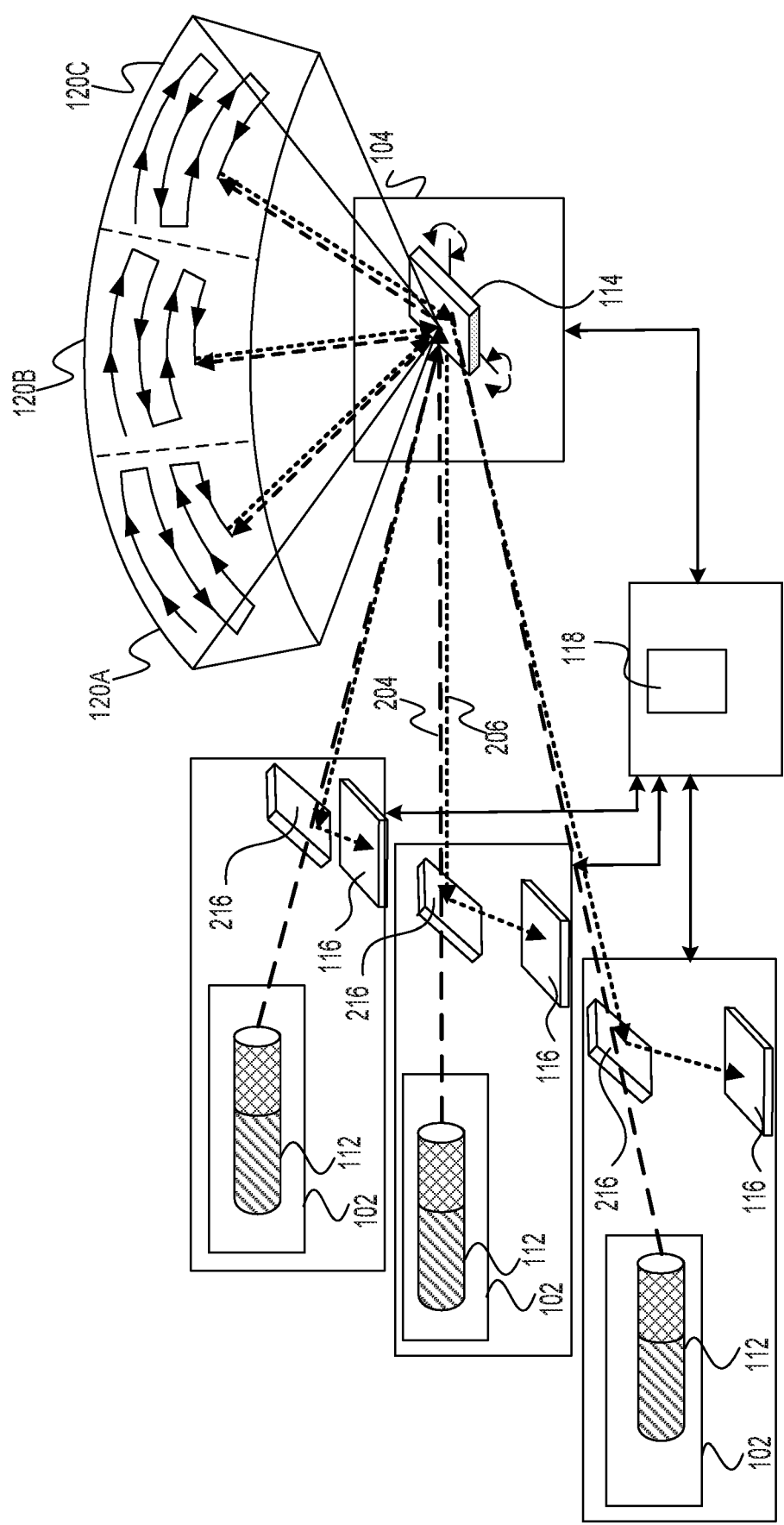
FIG. 2B is a diagram illustrating another example configuration of an example projecting unit in accordance with some embodiments of the present disclosure.
Figure 2D:
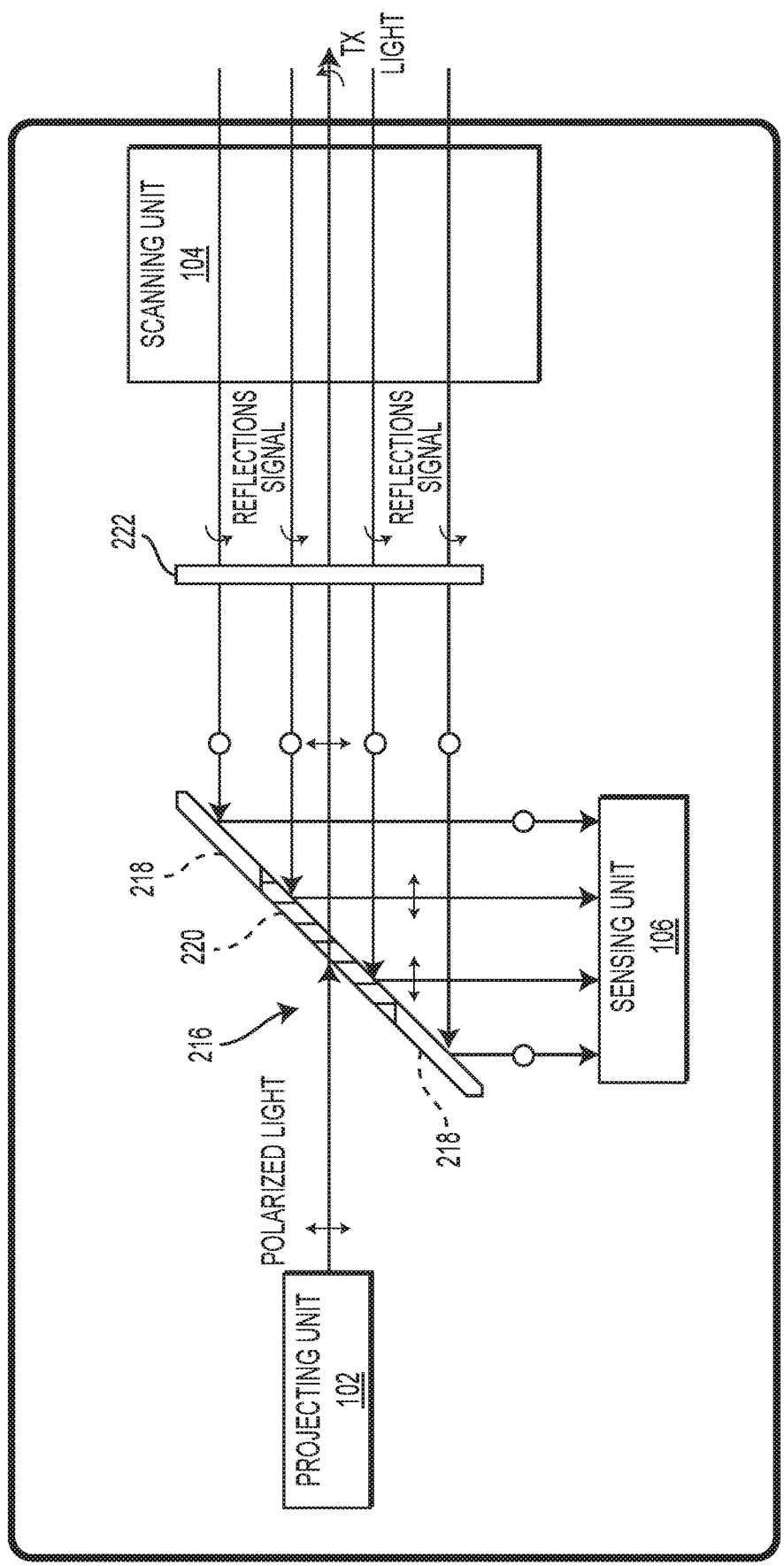
FIG. 2D is a diagram illustrating a fourth example configuration of an example projecting unit in accordance with some embodiments of the present disclosure.

FIGS. 2A-2D depict various configurations of projecting unit 102 and its role in LIDAR system 100. Specifically, FIG. 2A is a diagram illustrating projecting unit 102 with a single light source, FIG. 2B is a diagram illustrating a plurality of projecting units 102 with a plurality of light sources aimed at a common light deflector 114, FIG. 2C is a diagram illustrating projecting unit 102 with a primary and a secondary light sources 112, and FIG. 2D is a diagram illustrating an asymmetrical deflector used in some configurations of projecting unit 102. One skilled in the art will appreciate that the depicted configurations of projecting unit 102 may have numerous variations and modifications.

FIG. 2A illustrates an example of a bi-static configuration of LIDAR system 100 in which projecting unit 102 includes a single light source 112. The term "bi-static configuration" broadly refers to LIDAR systems configurations in which the projected light exiting the LIDAR system and the reflected light entering the LIDAR system pass through different optical channels. Specifically, the outbound light radiation may pass through a first optical window (not shown) and the inbound light radiation may pass through another optical window (not shown). In the example depicted in FIG. 2A, the Bi-static configuration includes a configuration where scanning unit 104 includes two light deflectors, a first light deflector 114A for outbound light and a second light deflector 114B for inbound light (the inbound light in LIDAR system includes emitted light reflected from objects in the scene, and may also include ambient light arriving from other sources). In such a configuration the inbound and outbound paths differ.

In this embodiment, all the components of LIDAR system 100 may be contained within a single housing 200, or may be divided among a plurality of housings. As shown, projecting unit 102 is associated with a single light source 112 that includes a laser diode 202A (or one or more laser diodes coupled together) configured to emit light (projected light 204). In one non limiting example, the light projected by light source 112 may be at a wavelength between about 800 nm and 950 nm, have an average power between about 50 mW and about 500 mW, have a peak power between about 50 W and about 200 W, and a pulse width of between about 2 ns and about 100 ns. In addition, light source 112 may optionally be associated with optical assembly 202B used for manipulation of the light emitted by laser diode 202A (e.g. for collimation, focusing, etc.). It is noted that other types of light sources 112 may be used, and that the disclosure is not restricted to laser diodes. In addition, light source 112 may emit its light in different formats, such as light pulses, frequency modulated, continuous wave (CW), quasi-CW, or any other form corresponding to the particular light source employed. The projection format and other parameters may be changed by the light source from time to time based on different factors, such as instructions from processing unit 108. The projected light is projected towards an outbound deflector 114A that functions as a steering element for directing the projected light in field of view 120. In this example, scanning unit 104 also include a pivotable return deflector 114B that direct photons (reflected light 206) reflected back from an object 208 within field of view 120 toward sensor 116. The reflected light is detected by sensor 116 and information about the object (e.g., the distance to object 212) is determined by processing unit 108.

In this figure, LIDAR system 100 is connected to a host 210. Consistent with the present disclosure, the term "host" refers to any computing environment that may interface with LIDAR system 100, it may be a vehicle system (e.g., part of vehicle 110), a testing system, a security system, a surveillance system, a traffic control system, an urban modelling system, or any system that monitors its surroundings. Such computing environment may include at least one processor and/or may be connected LIDAR system 100 via the cloud. In some embodiments, host 210 may also include interfaces to external devices such as camera and sensors configured to measure different characteristics of host 210 (e.g., acceleration, steering wheel deflection, reverse drive, etc.). Consistent with the present disclosure, LIDAR system 100 may be fixed to a stationary object associated with host 210 (e.g. a building, a tripod) or to a portable system associated with host 210 (e.g., a portable computer, a movie camera). Consistent with the present disclosure, LIDAR system 100 may be connected to host 210, to provide outputs of LIDAR system 100 (e.g., a 3D model, a reflectivity image) to host 210. Specifically, host 210 may use LIDAR system 100 to aid in detecting and scanning the environment of host 210 or any other environment. In addition, host 210 may integrate, synchronize or otherwise use together the outputs of LIDAR system 100 with outputs of other sensing systems (e.g. cameras, microphones, radar systems). In one example, LIDAR system 100 may be used by a security system. This embodiment is described in greater detail below with reference to FIG. 7.

LIDAR system 100 may also include a bus 212 (or other communication mechanisms) that interconnect subsystems and components for transferring information within LIDAR system 100. Optionally, bus 212 (or another communication mechanism) may be used for interconnecting LIDAR system 100 with host 210. In the example of FIG. 2A, processing unit 108 includes two processors 118 to regulate the operation of projecting unit 102, scanning unit 104, and sensing unit 106 in a coordinated manner based, at least partially, on information received from internal feedback of LIDAR system 100. In other words, processing unit 108 may be configured to dynamically operate LIDAR system 100 in a closed loop. A closed loop system is characterized by having feedback from at least one of the elements and updating one or more parameters based on the received feedback. Moreover, a closed loop system may receive feedback and update its own operation, at least partially, based on that feedback. A dynamic system or element is one that may be updated during operation.

According to some embodiments, scanning the environment around LIDAR system 100 may include illuminating field of view 120 with light pulses. The light pulses may have parameters such as: pulse duration, pulse angular dispersion, wavelength, instantaneous power, photon density at different distances from light source 112, average power, pulse power intensity, pulse width, pulse repetition rate, pulse sequence, pulse duty cycle, wavelength, phase, polarization, and more. Scanning the environment around LIDAR system 100 may also include detecting and characterizing various aspects of the reflected light. Characteristics of the reflected light may include, for example: time-of-flight (i.e., time from emission until detection), instantaneous power (e.g., power signature), average power across entire return pulse, and photon distribution/signal over return pulse period. By comparing characteristics of a light pulse with characteristics of corresponding reflections, a distance and possibly a physical characteristic, such as reflected intensity of object 212 may be estimated. By repeating this process across multiple adjacent portions 122, in a predefined pattern (e.g., raster, Lissajous or other patterns) an entire scan of field of view 120 may be achieved. As discussed below in greater detail, in some situations LIDAR system 100 may direct light to only some of the portions 122 in field of view 120 at every scanning cycle. These portions may be adjacent to each other, but not necessarily so.

In another embodiment, LIDAR system 100 may include network interface 214 for communicating with host 210 (e.g., a vehicle controller). The communication between LIDAR system 100 and host 210 is represented by a dashed arrow. In one embodiment, network interface 214 may include an integrated services digital network (ISDN) card, cable modem, satellite modem, or a modem to provide a data communication connection to a corresponding type of telephone line. As another example, network interface 214 may include a local area network (LAN) card to provide a data communication connection to a compatible LAN. In another embodiment, network interface 214 may include an Ethernet port connected to radio frequency receivers and transmitters and/or optical (e.g., infrared) receivers and transmitters. The specific design and implementation of network interface 214 depends on the communications network(s) over which LIDAR system 100 and host 210 are intended to operate. For example, network interface 214 may be used, for example, to provide outputs of LIDAR system 100 to the external system, such as a 3D model, operational parameters of LIDAR system 100, and so on. In other embodiment, the communication unit may be used, for example, to receive instructions from the external system, to receive information regarding the inspected environment, to receive information from another sensor, etc.

FIG. 2B illustrates an example of a monostatic configuration of LIDAR system 100 including a plurality projecting units 102. The term "monostatic configuration" broadly refers to LIDAR systems configurations in which the projected light exiting from the LIDAR system and the reflected light entering the LIDAR system pass through at least a partially shared optical path. In one example, the outbound light beam and the inbound light beam may share at least one optical assembly through which both light beams. In another example, the outbound light radiation may pass through an optical window (not shown) and the inbound light radiation may pass through the same optical window. A monostatic configuration may include a configuration where the scanning unit 104 includes a single light deflector 114 that directs the projected light towards field of view 120 and directs the reflected light towards a sensor 116. As shown, both projected light 204 and reflected light 206 hits an asymmetrical deflector 216. The term "asymmetrical deflector" refers to any optical device having two sides capable of deflecting a beam of light hitting it from one side in a different direction than it deflects a beam of light hitting it from the second side. In one example, the asymmetrical deflector does not deflect projected light 204 and deflects reflected light 206 towards sensor 116. One example of an asymmetrical deflector may include a polarization beam splitter. In another example, asymmetrical 216 may include an optical isolator that allows the passage of light in only one direction. Consistent with the present disclosure, a monostatic configuration of LIDAR system 100 may include an asymmetrical deflector to prevent reflected light from hitting light source 112, and to direct all the reflected light toward sensor 116, thereby increasing detection sensitivity.

In the embodiment of FIG. 2B, LIDAR system 100 includes three projecting units 102 each with a single of light source 112 aimed at a common light deflector 114. In one embodiment, the plurality of light sources 112 (including two or more light sources) may project light with substantially the same wavelength and each light source 112 is generally associated with a differing area of the field of view (denoted in the figure as 120A, 120B, and 120C). This enables scanning of a broader field of view than can be achieved with a light source 112. In another embodiment, the plurality of light sources 102 may project light with differing wavelengths, and all the light sources 112 may be directed to the same portion (or overlapping portions) of field of view 120.

FIG. 2C illustrates an example of LIDAR system 100 in which projecting unit 102 includes a primary light source 112A and a secondary light source 112B. Primary light source 112A may project light with a longer wavelength than is sensitive to the human eye in order to optimize SNR and detection range. For example, primary light source 112A may project light with a wavelength between about 750 nm and 1,100 nm. In contrast, secondary light source 112B may project light with a wavelength visible to the human eye. For example, secondary light source 112B may project light with a wavelength between about 400 nm and 700 nm. In one embodiment, secondary light source 112B may project light along substantially the same optical path the as light projected by primary light source 112A. Both light sources may be time-synchronized and may project light emission together or in interleaved pattern. An interleave pattern means that the light sources are not active at the same time which may mitigate mutual interference. A person who is of skill in the art would readily see that other combinations of wavelength ranges and activation schedules may also be implemented.

Consistent with some embodiments, secondary light source 112B may cause human eyes to blink when it is too close to the LIDAR optical output port. This may ensure an eye safety mechanism not feasible with typical laser sources that utilize the near-infrared light spectrum. In another embodiment, secondary light source 112B may be used for calibration and reliability at a point of service, in a manner somewhat similar to the calibration of headlights with a special reflector/pattern at a certain height from the ground with respect to vehicle 110. An operator at a point of service could examine the calibration of the LIDAR by simple visual inspection of the scanned pattern over a featured target such a test pattern board at a designated distance from LIDAR system 100. In addition, secondary light source 112B may provide means for operational confidence that the LIDAR is working for the end-user. For example, the system may be configured to permit a human to place a hand in front of light deflector 114 to test its operation.

Secondary light source 112B may also have a non-visible element that can double as a backup system in case primary light source 112A fails. This feature may be useful for fail-safe devices with elevated functional safety ratings. Given that secondary light source 112B may be visible and also due to reasons of cost and complexity, secondary light source 112B may be associated with a smaller power compared to primary light source 112A. Therefore, in case of a failure of primary light source 112A, the system functionality will fall back to secondary light source 112B set of functionalities and capabilities. While the capabilities of secondary light source 112B may be inferior to the capabilities of primary light source 112A, LIDAR system 100 system may be designed in such a fashion to enable vehicle 110 to safely arrive its destination.

FIG. 2D illustrates asymmetrical deflector 216 that may be part of LIDAR system 100. In the illustrated example, asymmetrical deflector 216 includes a reflective surface 218 (such as a mirror) and a one-way deflector 220. While not necessarily so, asymmetrical deflector 216 may optionally be a static deflector. Asymmetrical deflector 216 may be used in a monostatic configuration of LIDAR system 100, in order to allow a common optical path for transmission and for reception of light via the at least one deflector 114, e.g. as illustrated in FIGS. 2B and 2C. However, typical asymmetrical deflectors such as beam splitters are characterized by energy losses, especially in the reception path, which may be more sensitive to power loses than the transmission path.

As depicted in FIG. 2D, LIDAR system 100 may include asymmetrical deflector 216 positioned in the transmission path, which includes one-way deflector 220 for separating between the transmitted and received light signals. Optionally, one-way deflector 220 may be substantially transparent to the transmission light and substantially reflective to the received light. The transmitted light is generated by projecting unit 102 and may travel through one-way deflector 220 to scanning unit 104 which deflects it towards the optical outlet. The received light arrives through the optical inlet, to the at least one deflecting element 114, which deflects the reflections signal into a separate path away from the light source and towards sensing unit 106. Optionally, asymmetrical deflector 216 may be combined with a polarized light source 112 which is linearly polarized with the same polarization axis as one-way deflector 220. Notably, the cross-section of the outbound light beam is much smaller than that of the reflections signals. Accordingly, LIDAR system 100 may include one or more optical components (e.g. lens, collimator) for focusing or otherwise manipulating the emitted polarized light beam to the dimensions of the asymmetrical deflector 216. In one embodiment, one-way deflector 220 may be a polarizing beam splitter that is virtually transparent to the polarized light beam.

Consistent with some embodiments, LIDAR system 100 may further include optics 222 (e.g., a quarter wave plate retarder) for modifying a polarization of the emitted light. For example, optics 222 may modify a linear polarization of the emitted light beam to circular polarization. Light reflected back to system 100 from the field of view would arrive back through deflector 114 to optics 222, bearing a circular polarization with a reversed handedness with respect to the transmitted light. Optics 222 would then convert the received reversed handedness polarization light to a linear polarization that is not on the same axis as that of the polarized beam splitter 216. As noted above, the received light-patch is larger than the transmitted light-patch, due to optical dispersion of the beam traversing through the distance to the target.

Some of the received light will impinge on one-way deflector 220 that will reflect the light towards sensor 106 with some power loss. However, another part of the received patch of light will fall on a reflective surface 218 which surrounds one-way deflector 220 (e.g., polarizing beam splitter slit). Reflective surface 218 will reflect the light towards sensing unit 106 with substantially zero power loss. One-way deflector 220 would reflect light that is composed of various polarization axes and directions that will eventually arrive at the detector. Optionally, sensing unit 106 may include sensor 116 that is agnostic to the laser polarization, and is primarily sensitive to the amount of impinging photons at a certain wavelength range.

It is noted that the proposed asymmetrical deflector 216 provides far superior performances when compared to a simple mirror with a passage hole in it. In a mirror with a hole, all of the reflected light which reaches the hole is lost to the detector. However, in deflector 216, one-way deflector 220 deflects a significant portion of that light (e.g., about 50%) toward the respective sensor 116. In LIDAR systems, the number photons reaching the LIDAR from remote distances is very limited, and therefore the improvement in photon capture rate is important.

According to some embodiments, a device for beam splitting and steering is described. A polarized beam may be emitted from a light source having a first polarization. The emitted beam may be directed to pass through a polarized beam splitter assembly. The polarized beam splitter assembly includes on a first side a one-directional slit and on an opposing side a mirror. The one-directional slit enables the polarized emitted beam to travel toward a quarter-waveplate/wave-retarder which changes the emitted signal from a polarized signal to a linear signal (or vice versa) so that subsequently reflected beams cannot travel through the one-directional slit.

The Scanning Unit

Figure 3A:
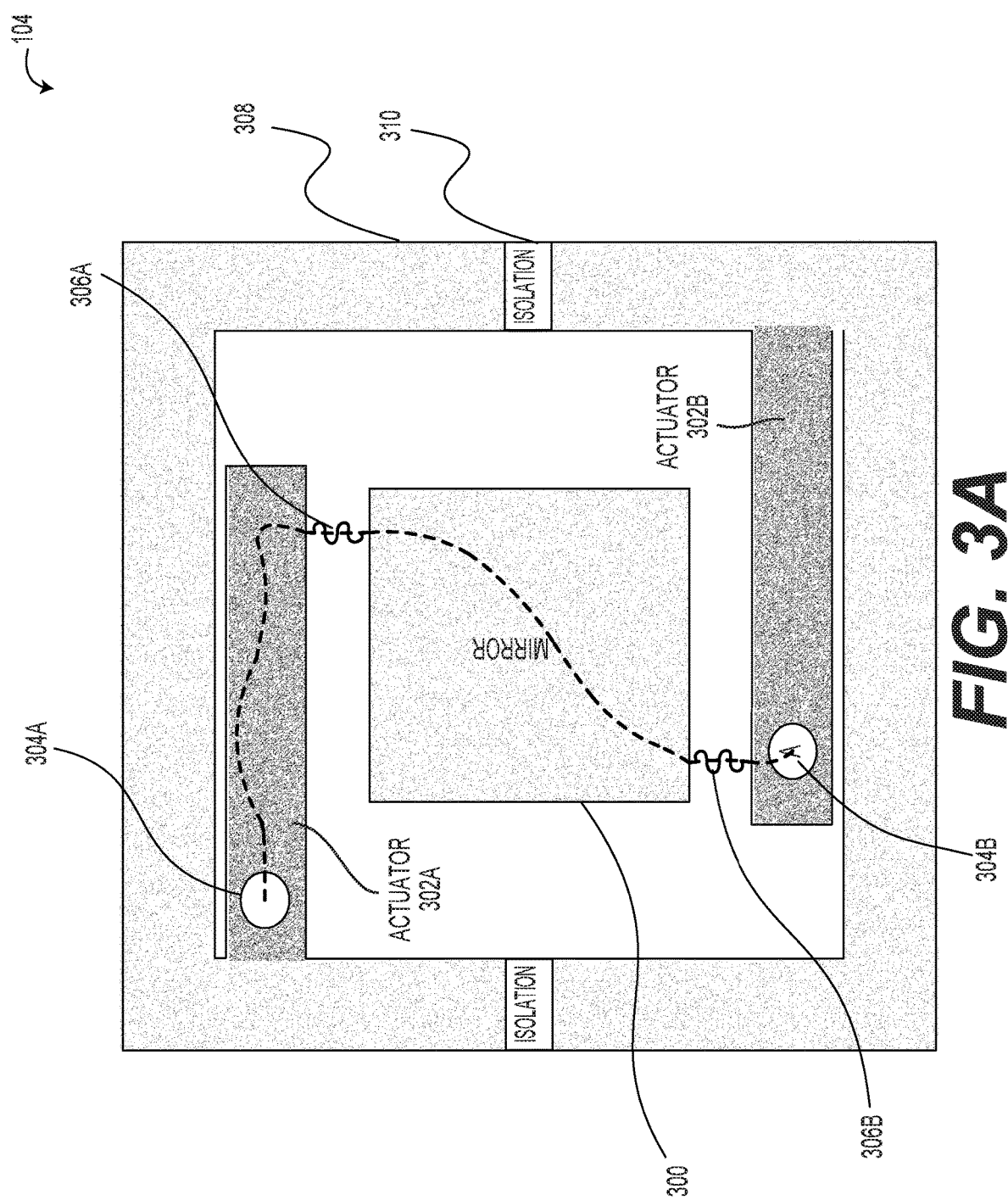
FIG. 3A is a diagram illustrating an example configuration of an example scanning unit in accordance with some embodiments of the present disclosure.
Figure 3C:
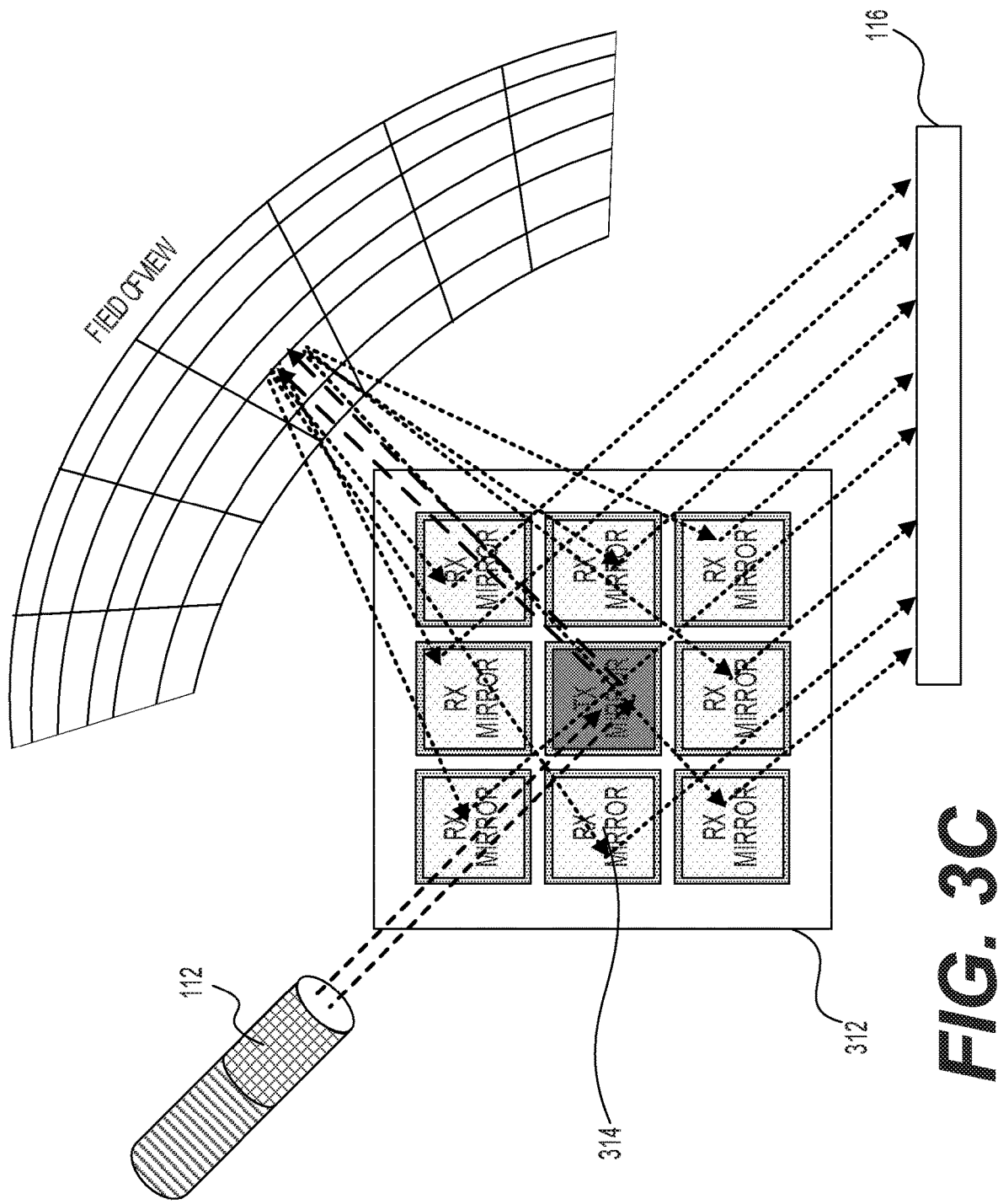
FIG. 3C is a diagram illustrating yet another example configuration of an example scanning unit in accordance with some embodiments of the present disclosure.
Figure 3D:
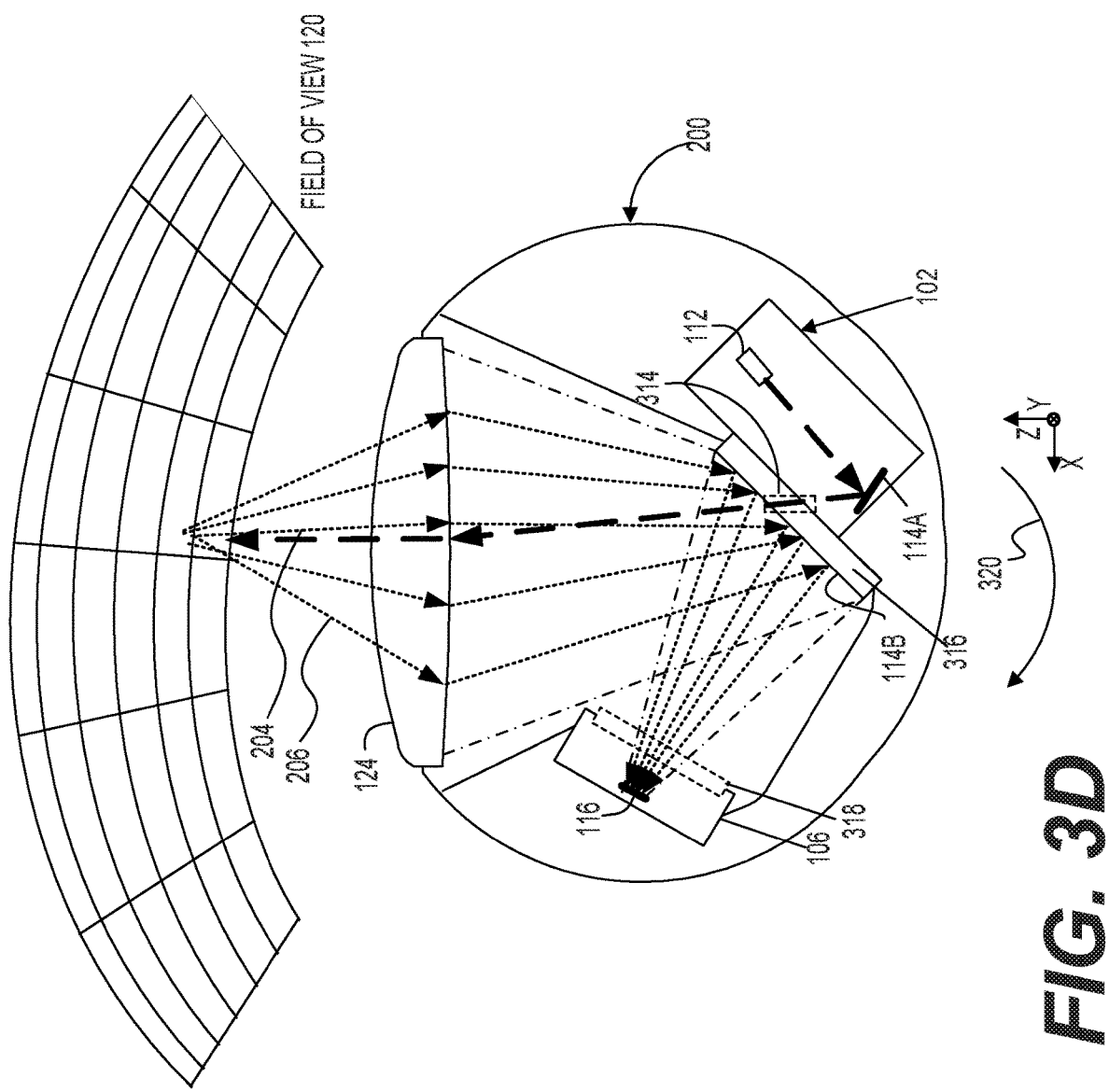
FIG. 3D is a diagram illustrating a fourth example configuration of an example scanning unit in accordance with some embodiments of the present disclosure.

FIGS. 3A-3D depict various configurations of scanning unit 104 and its role in LIDAR system 100. Specifically, FIG. 3A is a diagram illustrating scanning unit 104 with a MEMS mirror (e.g., square shaped), FIG. 3B is a diagram illustrating another scanning unit 104 with a MEMS mirror (e.g., round shaped), FIG. 3C is a diagram illustrating scanning unit 104 with an array of reflectors used for monostatic scanning LIDAR system, and FIG. 3D is a diagram illustrating an example LIDAR system 100 that mechanically scans the environment around LIDAR system 100. One skilled in the art will appreciate that the depicted configurations of scanning unit 104 are exemplary only, and may have numerous variations and modifications within the scope of this disclosure.

FIG. 3A illustrates an example scanning unit 104 with a single axis square MEMS mirror 300. In this example MEMS mirror 300 functions as at least one deflector 114. As shown, scanning unit 104 may include one or more actuators 302 (specifically, 302A and 302B). In one embodiment, actuator 302 may be made of semiconductor (e.g., silicon) and includes a piezoelectric layer (e.g. PZT, Lead zirconate titanate, aluminum nitride), which changes its dimension in response to electric signals applied by an actuation controller, a semi conductive layer, and a base layer. In one embodiment, the physical properties of actuator 302 may determine the mechanical stresses that actuator 302 experiences when electrical current passes through it. When the piezoelectric material is activated it exerts force on actuator 302 and causes it to bend. In one embodiment, the resistivity of one or more actuators 302 may be measured in an active state (Ractive) when mirror 300 is deflected at a certain angular position and compared to the resistivity at a resting state (Rrest). Feedback including Ractive may provide information to determine the actual mirror deflection angle compared to an expected angle, and, if needed, mirror 300 deflection may be corrected. The difference between Rrest and Ractive may be correlated by a mirror drive into an angular deflection value that may serve to close the loop. This embodiment may be used for dynamic tracking of the actual mirror position and may optimize response, amplitude, deflection efficiency, and frequency for both linear mode and resonant mode MEMS mirror schemes. This embodiment is described in greater detail below with reference to FIGS. 32-34.

During scanning, current (represented in the figure as the dashed line) may flow from contact 304A to contact 304B (through actuator 302A, spring 306A, mirror 300, spring 306B, and actuator 302B). Isolation gaps in semiconducting frame 308 such as isolation gap 310 may cause actuator 302A and 302B to be two separate islands connected electrically through springs 306 and frame 308. The current flow, or any associated electrical parameter (voltage, current frequency, capacitance, relative dielectric constant, etc.), may be monitored by an associated position feedback. In case of a mechanical failure—where one of the components is damaged—the current flow through the structure would alter and change from its functional calibrated values. At an extreme situation (for example, when a spring is broken), the current would stop completely due to a circuit break in the electrical chain by means of a faulty element.

FIG. 3B illustrates another example scanning unit 104 with a dual axis round MEMS mirror 300. In this example MEMS mirror 300 functions as at least one deflector 114. In one embodiment, MEMS mirror 300 may have a diameter of between about 1 mm to about 5 mm. As shown, scanning unit 104 may include four actuators 302 (302A, 302B, 302C, and 302D) each may be at a differing length. In the illustrated example, the current (represented in the figure as the dashed line) flows from contact 304A to contact 304D, but in other cases current may flow from contact 304A to contact 304B, from contact 304A to contact 304C, from contact 304B to contact 304C, from contact 304B to contact 304D, or from contact 304C to contact 304D. Consistent with some embodiments, a dual axis MEMS mirror may be configured to deflect light in a horizontal direction and in a vertical direction. For example, the angles of deflection of a dual axis MEMS mirror may be between about 0° to 30° in the vertical direction and between about 0° to 50° in the horizontal direction. One skilled in the art will appreciate that the depicted configuration of mirror 300 may have numerous variations and modifications. In one example, at least of deflector 114 may have a dual axis square-shaped mirror or single axis round-shaped mirror. Examples of round and square mirror are depicted in FIGS. 3A and 3B as examples only. Any shape may be employed depending on system specifications. In one embodiment, actuators 302 may be incorporated as an integral part of at least of deflector 114, such that power to move MEMS mirror 300 is applied directly towards it. In addition, MEMS mirror 300 may be connected to frame 308 by one or more rigid supporting elements. In another embodiment, at least of deflector 114 may include an electrostatic or electromagnetic MEMS mirror.

As described above, a monostatic scanning LIDAR system utilizes at least a portion of the same optical path for emitting projected light 204 and for receiving reflected light 206. The light beam in the outbound path may be collimated and focused into a narrow beam while the reflections in the return path spread into a larger patch of light, due to dispersion. In one embodiment, scanning unit 104 may have a large reflection area in the return path and asymmetrical deflector 216 that redirects the reflections (i.e., reflected light 206) to sensor 116. In one embodiment, scanning unit 104 may include a MEMS mirror with a large reflection area and negligible impact on the field of view and the frame rate performance. Additional details about the asymmetrical deflector 216 are provided below with reference to FIG. 2D.

In some embodiments (e.g. as exemplified in FIG. 3C), scanning unit 104 may include a deflector array (e.g. a reflector array) with small light deflectors (e.g. mirrors). In one embodiment, implementing light deflector 114 as a group of smaller individual light deflectors working in synchronization may allow light deflector 114 to perform at a high scan rate with larger angles of deflection. The deflector array may essentially act as a large light deflector (e.g. a large mirror) in terms of effective area. The deflector array may be operated using a shared steering assembly configuration that allows sensor 116 to collect reflected photons from substantially the same portion of field of view 120 being concurrently illuminated by light source 112. The term "concurrently" means that the two selected functions occur during coincident or overlapping time periods, either where one begins and ends during the duration of the other, or where a later one starts before the completion of the other.

FIG. 3C illustrates an example of scanning unit 104 with a reflector array 312 having small mirrors. In this embodiment, reflector array 312 functions as at least one deflector 114. Reflector array 312 may include a plurality of reflector units 314 configured to pivot (individually or together) and steer light pulses toward field of view 120. For example, reflector array 312 may be a part of an outbound path of light projected from light source 112. Specifically, reflector array 312 may direct projected light 204 towards a portion of field of view 120. Reflector array 312 may also be part of a return path for light reflected from a surface of an object located within an illumined portion of field of view 120. Specifically, reflector array 312 may direct reflected light 206 towards sensor 116 or towards asymmetrical deflector 216. In one example, the area of reflector array 312 may be between about 75 to about 150 mm$^2$, where each reflector units 314 may have a width of about 10 µm and the supporting structure may be lower than 100 µm.

According to some embodiments, reflector array 312 may include one or more sub-groups of steerable deflectors. Each sub-group of electrically steerable deflectors may include one or more deflector units, such as reflector unit 314. For example, each steerable deflector unit 314 may include at least one of a MEMS mirror, a reflective surface assembly, and an electromechanical actuator. In one embodiment, each reflector unit 314 may be individually controlled by an individual processor (not shown), such that it may tilt towards a specific angle along each of one or two separate axes. Alternatively, reflector array 312 may be associated with a common controller (e.g., processor 118) configured to synchronously manage the movement of reflector units 314 such that at least part of them will pivot concurrently and point in approximately the same direction.

In addition, at least one processor 118 may select at least one reflector unit 314 for the outbound path (referred to hereinafter as "TX Mirror") and a group of reflector units 314 for the return path (referred to hereinafter as "RX Mirror"). Consistent with the present disclosure, increasing the number of TX Mirrors may increase a reflected photons beam spread. Additionally, decreasing the number of RX Mirrors may narrow the reception field and compensate for ambient light conditions (such as clouds, rain, fog, extreme heat, and other environmental conditions) and improve the signal to noise ratio. Also, as indicated above, the emitted light beam is typically narrower than the patch of reflected light, and therefore can be fully deflected by a small portion of the deflection array. Moreover, it is possible to block light reflected from the portion of the deflection array used for transmission (e.g. the TX mirror) from reaching sensor 116, thereby reducing an effect of internal reflections of the LIDAR system 100 on system operation. In addition, at least one processor 118 may pivot one or more reflector units 314 to overcome mechanical impairments and drifts due, for example, to thermal and gain effects. In an example, one or more reflector units 314 may move differently than intended (frequency, rate, speed etc.) and their movement may be compensated for by electrically controlling the deflectors appropriately.

FIG. 3D illustrates an exemplary LIDAR system 100 that mechanically scans the environment of LIDAR system 100. In this example, LIDAR system 100 may include a motor or other mechanisms for rotating housing 200 about the axis of the LIDAR system 100. Alternatively, the motor (or other mechanism) may mechanically rotate a rigid structure of LIDAR system 100 on which one or more light sources 112 and one or more sensors 116 are installed, thereby scanning the environment. As described above, projecting unit 102 may include at least one light source 112 configured to project light emission. The projected light emission may travel along an outbound path towards field of view 120. Specifically, the projected light emission may be reflected by deflector 114A through an exit aperture 314 when projected light 204 travel towards optional optical window 124. The reflected light emission may travel along a return path from object 208 towards sensing unit 106. For example, the reflected light 206 may be reflected by deflector 114B when reflected light 206 travels towards sensing unit 106. A person skilled in the art would appreciate that a LIDAR system with a rotation mechanism for synchronically rotating one or more light sources or one or more sensors, may use this synchronized rotation instead of (or in addition to) steering an internal light deflector.

In embodiments in which the scanning of field of view 120 is mechanical, the projected light emission may be directed to exit aperture 314 that is part of a wall 316 separating projecting unit 102 from other parts of LIDAR system 100. In some examples, wall 316 can be formed from a transparent material (e.g., glass) coated with a reflective material to form deflector 114B. In this example, exit aperture 314 may correspond to the portion of wall 316 that is not coated by the reflective material. Additionally or alternatively, exit aperture 314 may include a hole or cut-away in the wall 316. Reflected light 206 may be reflected by deflector 114B and directed towards an entrance aperture 318 of sensing unit 106. In some examples, an entrance aperture 318 may include a filtering window configured to allow wavelengths in a certain wavelength range to enter sensing unit 106 and attenuate other wavelengths. The reflections of object 208 from field of view 120 may be reflected by deflector 114B and hit sensor 116. By comparing several properties of reflected light 206 with projected light 204, at least one aspect of object 208 may be determined. For example, by comparing a time when projected light 204 was emitted by light source 112 and a time when sensor 116 received reflected light 206, a distance between object 208 and LIDAR system 100 may be determined. In some examples, other aspects of object 208, such as shape, color, material, etc. may also be determined.

In some examples, the LIDAR system 100 (or part thereof, including at least one light source 112 and at least one sensor 116) may be rotated about at least one axis to determine a three-dimensional map of the surroundings of the LIDAR system 100. For example, the LIDAR system 100 may be rotated about a substantially vertical axis as illustrated by arrow 320 in order to scan field of 120. Although FIG. 3D illustrates that the LIDAR system 100 is rotated clock-wise about the axis as illustrated by the arrow 320, additionally or alternatively, the LIDAR system 100 may be rotated in a counter clockwise direction. In some examples, the LIDAR system 100 may be rotated 360 degrees about the vertical axis. In other examples, the LIDAR system 100 may be rotated back and forth along a sector smaller than 360-degree of the LIDAR system 100. For example, the LIDAR system 100 may be mounted on a platform that wobbles back and forth about the axis without making a complete rotation.

The Sensing Unit

Figure 4A:
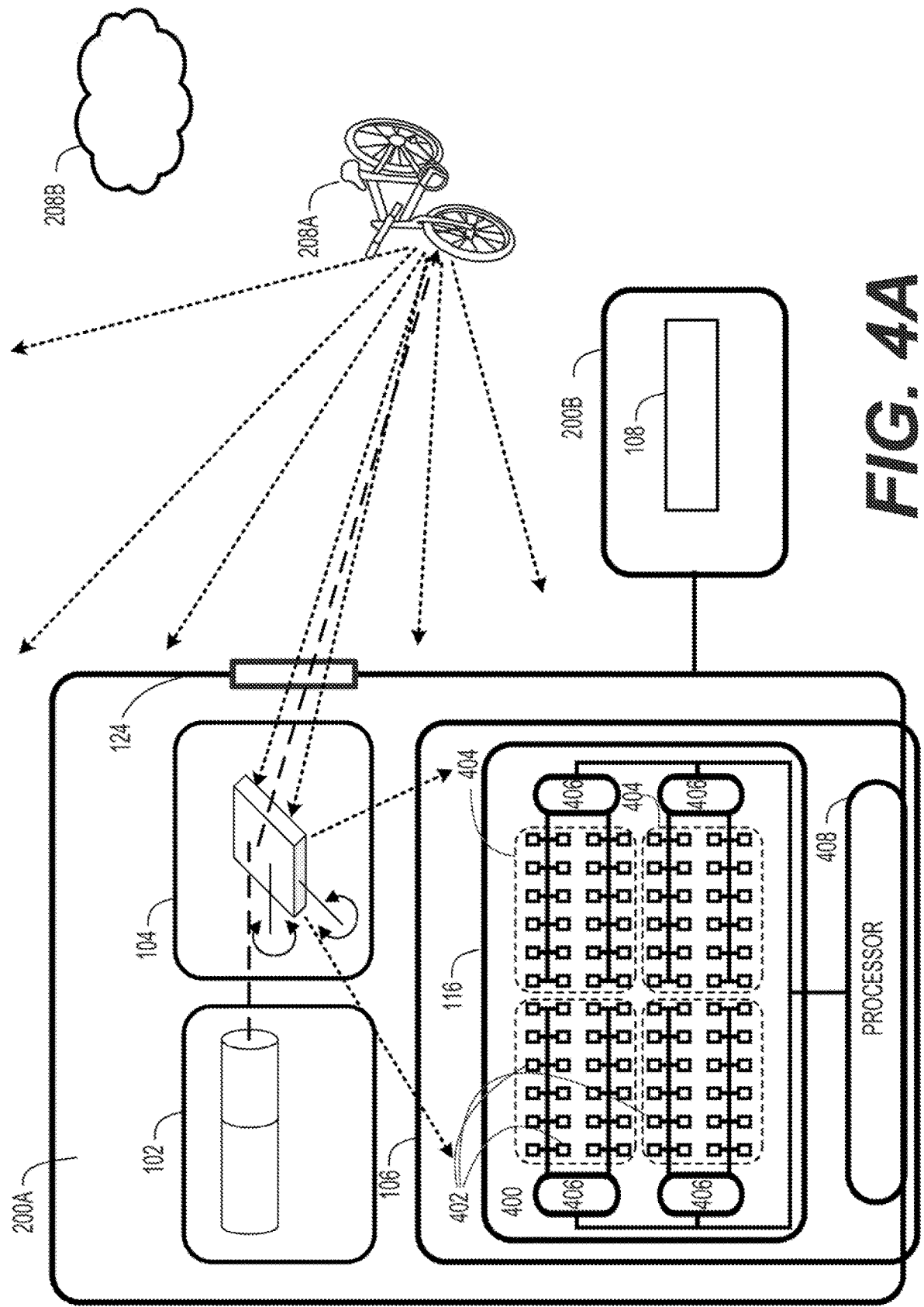
FIG. 4A is a diagram illustrating an example configuration of an example sensing unit in accordance with some embodiments of the present disclosure.
Figure 4B:
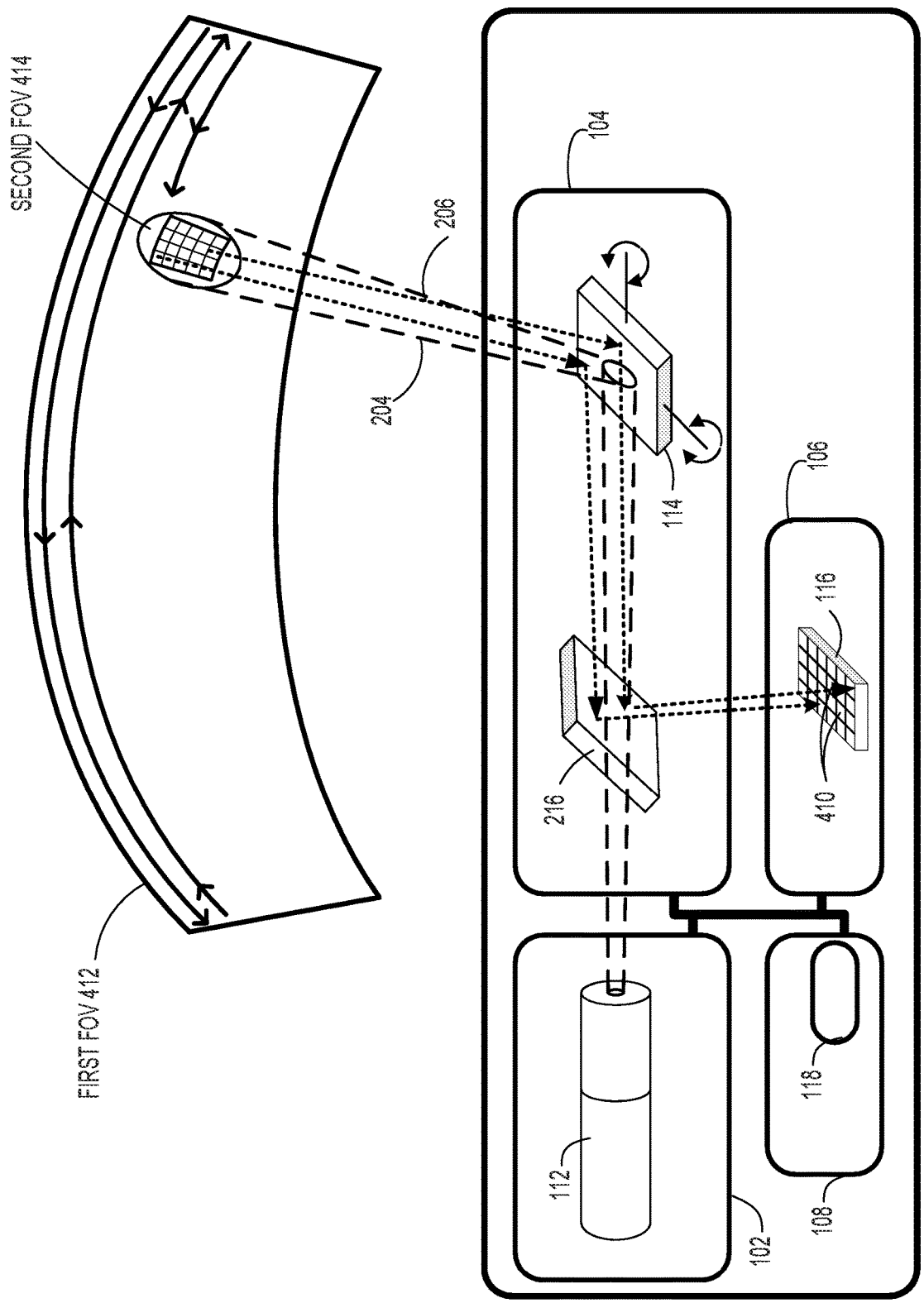
FIG. 4B is a diagram illustrating another example configuration of an example sensing unit in accordance with some embodiments of the present disclosure.
Figure 4D:
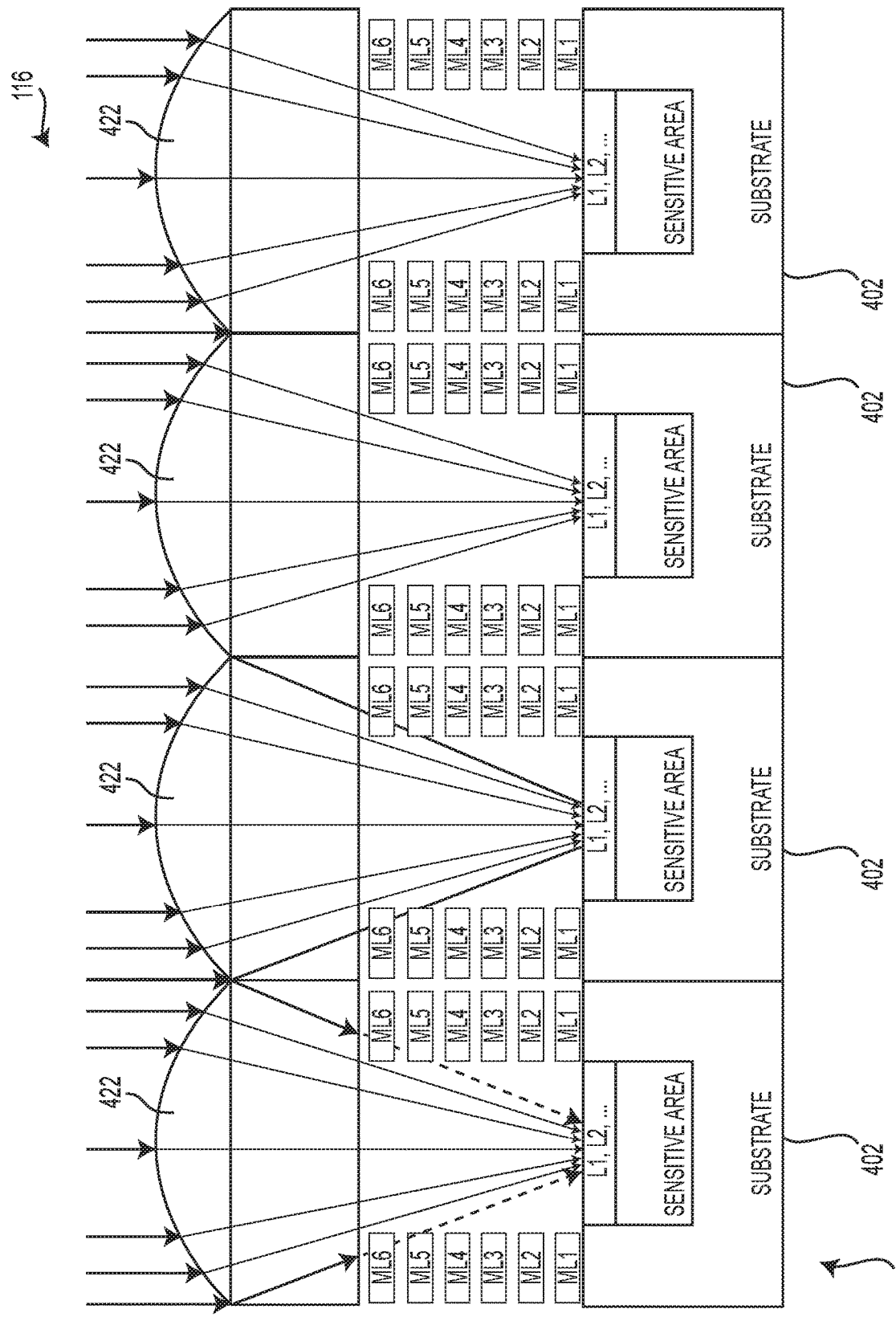
FIG. 4D is a diagram illustrating a fourth example configuration of an example sensing unit in accordance with some embodiments of the present disclosure.

FIGS. 4A-4E depict various configurations of sensing unit 106 and its role in LIDAR system 100. Specifically. FIG. 4A is a diagram illustrating an example sensing unit 106 with a detector array, FIG. 4B is a diagram illustrating monostatic scanning using a two-dimensional sensor, FIG. 4C is a diagram illustrating an example of a two-dimensional sensor 116, FIG. 4D is a diagram illustrating a lens array associated with sensor 116, and FIG. 4E includes three diagram illustrating the lens structure. One skilled in the art will appreciate that the depicted configurations of sensing unit 106 are exemplary only and may have numerous alternative variations and modifications consistent with the principles of this disclosure.

FIG. 4A illustrates an example of sensing unit 106 with detector array 400. In this example, at least one sensor 116 includes detector array 400. LIDAR system 100 is configured to detect objects (e.g., bicycle 208A and cloud 208B) in field of view 120 located at different distances from LIDAR system 100 (could be meters or more). Objects 208 may be a solid object (e.g. a road, a tree, a car, a person), fluid object (e.g. fog, water, atmosphere particles), or object of another type (e.g. dust or a powdery illuminated object). When the photons emitted from light source 112 hit object 208 they either reflect, refract, or get absorbed. Typically, as shown in the figure, only a portion of the photons reflected from object 208A enters optional optical window 124. As each ~15 cm change in distance results in a travel time difference of 1 ns (since the photons travel at the speed of light to and from object 208), the time differences between the travel times of different photons hitting the different objects may be detectable by a time-of-flight sensor with sufficiently quick response.

Sensor 116 includes a plurality of detection elements 402 for detecting photons of a photonic pulse reflected back from field of view 120. The detection elements may all be included in detector array 400, which may have a rectangular arrangement (e.g. as shown) or any other arrangement. Detection elements 402 may operate concurrently or partially concurrently with each other. Specifically, each detection element 402 may issue detection information for every sampling duration (e.g. every 1 nanosecond). In one example, detector array 400 may be a SiPM (Silicon photomultipliers) which is a solid-state single-photon-sensitive device built from an array of single photon avalanche diode (SPAD, serving as detection elements 402) on a common silicon substrate. Similar photomultipliers from other, non-silicon materials may also be used. Although a SiPM device works in digital/switching mode, the SiPM is an analog device because all the microcells are read in parallel, making it possible to generate signals within a dynamic range from a single photon to hundreds and thousands of photons detected by the different SPADs. As mentioned above, more than one type of sensor may be implemented (e.g. SiPM and APD). Possibly, sensing unit 106 may include at least one APD integrated into an SiPM array and/or at least one APD detector located next to a SiPM on a separate or common silicon substrate.

In one embodiment, detection elements 402 may be grouped into a plurality of regions 404. The regions are geometrical locations or environments within sensor 116 (e.g. within detector array 400)—and may be shaped in different shapes (e.g. rectangular as shown, squares, rings, and so on, or in any other shape). While not all of the individual detectors, which are included within the geometrical area of a region 404, necessarily belong to that region, in most cases they will not belong to other regions 404 covering other areas of the sensor 310—unless some overlap is desired in the seams between regions. As illustrated in FIG. 4A, the regions may be non-overlapping regions 404, but alternatively, they may overlap. Every region may be associated with a regional output circuitry 406 associated with that region. The regional output circuitry 406 may provide a region output signal of a corresponding group of detection elements 402. For example, the region of output circuitry 406 may be a summing circuit, but other forms of combined output of the individual detector into a unitary output (whether scalar, vector, or any other format) may be employed. Optionally, each region 404 is a single SiPM, but this is not necessarily so, and a region may be a sub-portion of a single SiPM, a group of several SiPMs, or even a combination of different types of detectors.

In the illustrated example, processing unit 108 is located at a separated housing 200B (within or outside) host 210 (e.g. within vehicle 110), and sensing unit 106 may include a dedicated processor 408 for analyzing the reflected light. Alternatively, processing unit 108 may be used for analyzing reflected light 206. It is noted that LIDAR system 100 may be implemented multiple housings in other ways than the illustrated example. For example, light deflector 114 may be located in a different housing than projecting unit 102 and/or sensing module 106. In one embodiment, LIDAR system 100 may include multiple housings connected to each other in different ways, such as: electric wire connection, wireless connection (e.g., RF connection), fiber optics cable, and any combination of the above.

In one embodiment, analyzing reflected light 206 may include determining a time of flight for reflected light 206, based on outputs of individual detectors of different regions. Optionally, processor 408 may be configured to determine the time of flight for reflected light 206 based on the plurality of regions of output signals. In addition to the time of flight, processing unit 108 may analyze reflected light 206 to determine the average power across an entire return pulse, and the photon distribution/signal may be determined over the return pulse period ("pulse shape"). In the illustrated example, the outputs of any detection elements 402 may not be transmitted directly to processor 408, but rather combined (e.g. summed) with signals of other detectors of the region 404 before being passed to processor 408. However, this is only an example and the circuitry of sensor 116 may transmit information from a detection element 402 to processor 408 via other routes (not via a region output circuitry 406).

FIG. 4B is a diagram illustrating LIDAR system 100 configured to scan the environment of LIDAR system 100 using a two-dimensional sensor 116. In the example of FIG. 4B, sensor 116 is a matrix of 4×6 detectors 410 (also referred to as "pixels"). In one embodiment, a pixel size may be about 1×1 mm. Sensor 116 is two-dimensional in the sense that it has more than one set (e.g. row, column) of detectors 410 in two non-parallel axes (e.g. orthogonal axes, as exemplified in the illustrated examples). The number of detectors 410 in sensor 116 may vary between differing implementations, e.g. depending on the desired resolution, signal to noise ratio (SNR), desired detection distance, and so on. For example, sensor 116 may have anywhere between 5 and 5,000 pixels. In another example (not shown in the figure) Also, sensor 116 may be a one-dimensional matrix (e.g. 1×8 pixels).

It is noted that each detector 410 may include a plurality of detection elements 402, such as Avalanche Photo Diodes (APD), Single Photon Avalanche Diodes (SPADs), combination of Avalanche Photo Diodes (APD) and Single Photon Avalanche Diodes (SPADs) or detecting elements that measure both the time of flight from a laser pulse transmission event to the reception event and the intensity of the received photons. For example, each detector 410 may include anywhere between 20 and 5,000 SPADs. The outputs of detection elements 402 in each detector 410 may be summed, averaged, or otherwise combined to provide a unified pixel output.

In the illustrated example, sensing unit 106 may include a two-dimensional sensor 116 (or a plurality of two-dimensional sensors 116), whose field of view is smaller than field of view 120 of LIDAR system 100. In this discussion, field of view 120 (the overall field of view which can be scanned by LIDAR system 100 without moving, rotating or rolling in any direction) is denoted "first FOV 412", and the smaller FOV of sensor 116 is denoted "second FOV 412" (interchangeably "instantaneous FOV"). The coverage area of second FOV 414 relative to the first FOV 412 may differ, depending on the specific use of LIDAR system 100, and may be, for example, between 0.5% and 50%. In one example, second FOV 412 may be between about 0.05° and 1° elongated in the vertical dimension. Even if LIDAR system 100 includes more than one two-dimensional sensor 116, the combined field of view of the sensors array may still be smaller than the first FOV 412, e.g. by a factor of at least 5, by a factor of at least 10, by a factor of at least 20, or by a factor of at least 50, for example.

In order to cover first FOV 412, scanning unit 106 may direct photons arriving from different parts of the environment to sensor 116 at different times. In the illustrated monostatic configuration, together with directing projected light 204 towards field of view 120 and when least one light deflector 114 is located in an instantaneous position, scanning unit 106 may also direct reflected light 206 to sensor 116. Typically, at every moment during the scanning of first FOV 412, the light beam emitted by LIDAR system 100 covers part of the environment which is larger than the second FOV 414 (in angular opening) and includes the part of the environment from which light is collected by scanning unit 104 and sensor 116.

FIG. 4C is a diagram illustrating an example of a two-dimensional sensor 116. In this embodiment, sensor 116 is a matrix of 8×5 detectors 410 and each detector 410 includes a plurality of detection elements 402. In one example, detector 410A is located in the second row (denoted "R2") and third column (denoted "C3") of sensor 116, which includes a matrix of 4×3 detection elements 402. In another example, detector 410B located in the fourth row (denoted "R4") and sixth column (denoted "C6") of sensor 116 includes a matrix of 3×3 detection elements 402. Accordingly, the number of detection elements 402 in each detector 410 may be constant, or may vary, and differing detectors 410 in a common array may have a different number of detection elements 402. The outputs of all detection elements 402 in each detector 410 may be summed, averaged, or otherwise combined to provide a single pixel-output value. It is noted that while detectors 410 in the example of FIG. 4C are arranged in a rectangular matrix (straight rows and straight columns), other arrangements may also be used, e.g. a circular arrangement or a honeycomb arrangement.

According to some embodiments, measurements from each detector 410 may enable determination of the time of flight from a light pulse emission event to the reception event and the intensity of the received photons. The reception event may be the result of the light pulse being reflected from object 208. The time of flight may be a timestamp value that represents the distance of the reflecting object to optional optical window 124. Time of flight values may be realized by photon detection and counting methods, such as Time Correlated Single Photon Counters (TCSPC), analog methods for photon detection such as signal integration and qualification (via analog to digital converters or plain comparators) or otherwise.

In some embodiments and with reference to FIG. 4B, during a scanning cycle, each instantaneous position of at least one light deflector 114 may be associated with a particular portion 122 of field of view 120. The design of sensor 116 enables an association between the reflected light from a single portion of field of view 120 and multiple detectors 410. Therefore, the scanning resolution of LIDAR system may be represented by the number of instantaneous positions (per scanning cycle) times the number of detectors 410 in sensor 116. The information from each detector 410 (i.e., each pixel) represents the basic data element that from which the captured field of view in the three-dimensional space is built. This may include, for example, the basic element of a point cloud representation, with a spatial position and an associated reflected intensity value. In one embodiment, the reflections from a single portion of field of view 120 that are detected by multiple detectors 410 may be returning from different objects located in the single portion of field of view 120. For example, the single portion of field of view 120 may be greater than 50×50 cm at the far field, which can easily include two, three, or more objects partly covered by each other.

FIG. 4D is a cross cut diagram of a part of sensor 116, in accordance with examples of the presently disclosed subject matter. The illustrated part of sensor 116 includes a part of a detector array 400 which includes four detection elements 402 (e.g., four SPADs, four APDs). Detector array 400 may be a photodetector sensor realized in complementary metal-oxide-semiconductor (CMOS). Each of the detection elements 402 has a sensitive area, which is positioned within a substrate surrounding. While not necessarily so, sensor 116 may be used in a monostatic LiDAR system having a narrow field of view (e.g., because scanning unit 104 scans different parts of the field of view at different times). The narrow field of view for the incoming light beam-if implemented-eliminates the problem of out-of-focus imaging. As exemplified in FIG. 4D, sensor 116 may include a plurality of lenses 422 (e.g., microlenses), each lens 422 may direct incident light toward a different detection element 402 (e.g., toward an active area of detection element 402), which may be usable when out-of-focus imaging is not an issue. Lenses 422 may be used for increasing an optical fill factor and sensitivity of detector array 400, because most of the light that reaches sensor 116 may be deflected toward the active areas of detection elements 402

Detector array 400, as exemplified in FIG. 4D, may include several layers built into the silicon substrate by various methods (e.g., implant) resulting in a sensitive area, contact elements to the metal layers and isolation elements (e.g., shallow trench implant STI, guard rings, optical trenches, etc.). The sensitive area may be a volumetric element in the CMOS detector that enables the optical conversion of incoming photons into a current flow given an adequate voltage bias is applied to the device. In the case of a APD/SPAD, the sensitive area would be a combination of an electrical field that pulls electrons created by photon absorption towards a multiplication area where a photon induced electron is amplified creating a breakdown avalanche of multiplied electrons.

A front side illuminated detector (e.g., as illustrated in FIG. 4D) has the input optical port at the same side as the metal layers residing on top of the semiconductor (Silicon). The metal layers are required to realize the electrical connections of each individual photodetector element (e.g., anode and cathode) with various elements such as: bias voltage, quenching/ballast elements, and other photodetectors in a common array. The optical port through which the photons impinge upon the detector sensitive area is comprised of a passage through the metal layer. It is noted that passage of light from some directions through this passage may be blocked by one or more metal layers (e.g., metal layer ML6, as illustrated for the leftmost detector elements 402 in FIG. 4D). Such blockage reduces the total optical light absorbing efficiency of the detector.

Figure 4E:
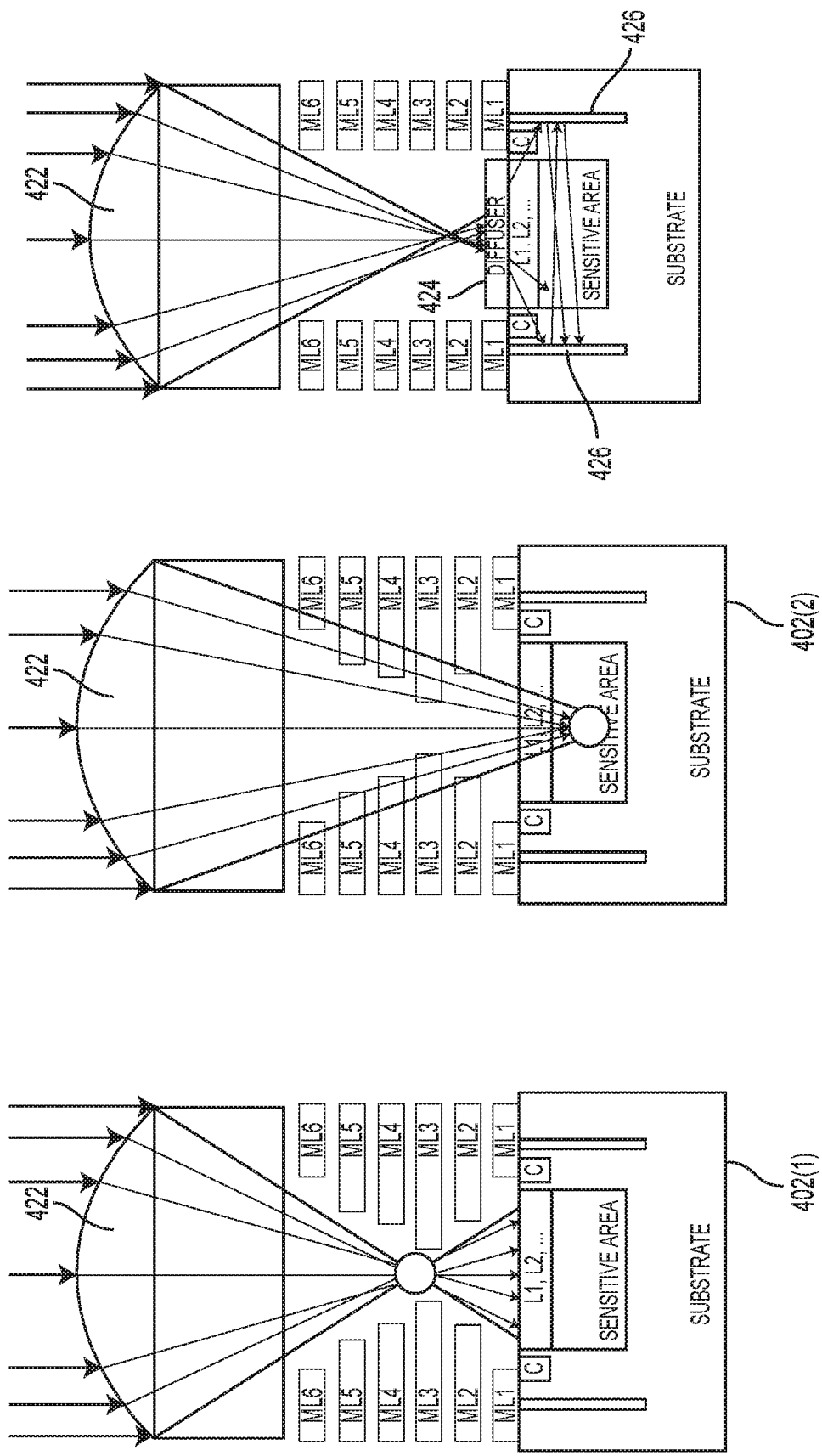
FIG. 4E is a diagram illustrating a fifth example configuration of an example sensing unit in accordance with some embodiments of the present disclosure.

FIG. 4E illustrates three detection elements 402, each with an associated lens 422, in accordance with examples of the presenting disclosed subject matter. Each of the three detection elements of FIG. 4E, denoted 402(1), 402(2), and 402(3), illustrates a lens configuration which may be implemented in associated with one or more of the detecting elements 402 of sensor 116. It is noted that combinations of these lens configurations may also be implemented.

In the lens configuration illustrated with regards to detection element 402(1), a focal point of the associated lens 422 may be located above the semiconductor surface. Optionally, openings in different metal layers of the detection element may have different sizes aligned with the cone of focusing light generated by the associated lens 422. Such a structure may improve the signal-to-noise and resolution of the array 400 as a whole device. Large metal layers may be important for delivery of power and ground shielding. This approach may be useful, e.g., with a monostatic LiDAR design with a narrow field of view where the incoming light beam is comprised of parallel rays and the imaging focus does not have any consequence to the detected signal.

In the lens configuration illustrated with regards to detection element 402(2), an efficiency of photon detection by the detection elements 402 may be improved by identifying a sweet spot. Specifically, a photodetector implemented in CMOS may have a sweet spot in the sensitive volume area where the probability of a photon creating an avalanche effect is the highest. Therefore, a focal point of lens 422 may be positioned inside the sensitive volume area at the sweet spot location, as demonstrated by detection elements 402(2). The lens shape and distance from the focal point may take into account the refractive indices of all the elements the laser beam is passing along the way from the lens to the sensitive sweet spot location buried in the semiconductor material.

In the lens configuration illustrated with regards to the detection element on the right of FIG. 4E, an efficiency of photon absorption in the semiconductor material may be improved using a diffuser and reflective elements. Specifically, a near IR wavelength requires a significantly long path of silicon material in order to achieve a high probability of absorbing a photon that travels through. In a typical lens configuration, a photon may traverse the sensitive area and may not be absorbed into a detectable electron. A long absorption path that improves the probability for a photon to create an electron renders the size of the sensitive area towards less practical dimensions (tens of um for example) for a CMOS device fabricated with typical foundry processes. The rightmost detector element in FIG. 4E demonstrates a technique for processing incoming photons. The associated lens 422 focuses the incoming light onto a diffuser element 424. In one embodiment, light sensor 116 may further include a diffuser located in the gap distant from the outer surface of at least some of the detectors. For example, diffuser 424 may steer the light beam sideways (e.g., as perpendicular as possible) towards the sensitive area and the reflective optical trenches 426. The diffuser is located at the focal point, above the focal point, or below the focal point. In this embodiment, the incoming light may be focused on a specific location where a diffuser element is located. Optionally, detector element 422 is designed to optically avoid the inactive areas where a photon induced electron may get lost and reduce the effective detection efficiency. Reflective optical trenches 426 (or other forms of optically reflective structures) cause the photons to bounce back and forth across the sensitive area, thus increasing the likelihood of detection. Ideally, the photons will get trapped in a cavity consisting of the sensitive area and the reflective trenches indefinitely until the photon is absorbed and creates an electron/hole pair.

Consistent with the present disclosure, a long path is created for the impinging photons to be absorbed and contribute to a higher probability of detection. Optical trenches may also be implemented in detecting element 422 for reducing cross talk effects of parasitic photons created during an avalanche that may leak to other detectors and cause false detection events. According to some embodiments, a photo detector array may be optimized so that a higher yield of the received signal is utilized, meaning, that as much of the received signal is received and less of the signal is lost to internal degradation of the signal. The photo detector array may be improved by: (a) moving the focal point at a location above the semiconductor surface, optionally by designing the metal layers above the substrate appropriately; (b) by steering the focal point to the most responsive/sensitive area (or "sweet spot") of the substrate and (c) adding a diffuser above the substrate to steer the signal toward the "sweet spot" and/or adding reflective material to the trenches so that deflected signals are reflected back to the "sweet spot."

While in some lens configurations, lens 422 may be positioned so that its focal point is above a center of the corresponding detection element 402, it is noted that this is not necessarily so. In other lens configuration, a position of the focal point of the lens 422 with respect to a center of the corresponding detection element 402 is shifted based on a distance of the respective detection element 402 from a center of the detection array 400. This may be useful in relatively larger detection arrays 400, in which detector elements further from the center receive light in angles which are increasingly off-axis. Shifting the location of the focal points (e.g., toward the center of detection array 400) allows correcting for the incidence angles. Specifically, shifting the location of the focal points (e.g., toward the center of detection array 400) allows correcting for the incidence angles while using substantially identical lenses 422 for all detection elements, which are positioned at the same angle with respect to a surface of the detector.

Adding an array of lenses 422 to an array of detection elements 402 may be useful when using a relatively small sensor 116 which covers only a small part of the field of view because in such a case, the reflection signals from the scene reach the detectors array 400 from substantially the same angle, and it is, therefore, easy to focus all the light onto individual detectors. It is also noted, that in one embodiment, lenses 422 may be used in LIDAR system 100 for favoring about increasing the overall probability of detection of the entire array 400 (preventing photons from being "wasted" in the dead area between detectors/sub-detectors) at the expense of spatial distinctiveness. This embodiment is in contrast to prior art implementations such as CMOS RGB camera, which prioritize spatial distinctiveness (i.e., light that propagates in the direction of detection element A is not allowed to be directed by the lens toward detection element B, that is, to "bleed" to another detection element of the array). Optionally, sensor 116 includes an array of lens 422, each being correlated to a corresponding detection element 402, while at least one of the lenses 422 deflects light which propagates to a first detection element 402 toward a second detection element 402 (thereby it may increase the overall probability of detection of the entire array).

Specifically, consistent with some embodiments of the present disclosure, light sensor 116 may include an array of light detectors (e.g., detector array 400), each light detector (e.g., detector 410) being configured to cause an electric current to flow when light passes through an outer surface of a respective detector. In addition, light sensor 116 may include at least one micro-lens configured to direct light toward the array of light detectors, the at least one micro-lens having a focal point. Light sensor 116 may further include at least one layer of conductive material interposed between the at least one micro-lens and the array of light detectors and having a gap therein to permit light to pass from the at least one micro-lens to the array, the at least one layer being sized to maintain a space between the at least one micro-lens and the array to cause the focal point (e.g., the focal point may be a plane) to be located in the gap, at a location spaced from the detecting surfaces of the array of light detectors.

In related embodiments, each detector may include a plurality of Single Photon Avalanche Diodes (SPADs) or a plurality of Avalanche Photo Diodes (APD). The conductive material may be a multi-layer metal constriction, and the at least one layer of conductive material may be electrically connected to detectors in the array. In one example, the at least one layer of conductive material includes a plurality of layers. In addition, the gap may be shaped to converge from the at least one micro-lens toward the focal point, and to diverge from a region of the focal point toward the array. In other embodiments, light sensor 116 may further include at least one reflector adjacent each photo detector. In one embodiment, a plurality of micro-lenses may be arranged in a lens array and the plurality of detectors may be arranged in a detector array. In another embodiment, the plurality of micro-lenses may include a single lens configured to project light to a plurality of detectors in the array.

The Processing Unit

Figure 5A:
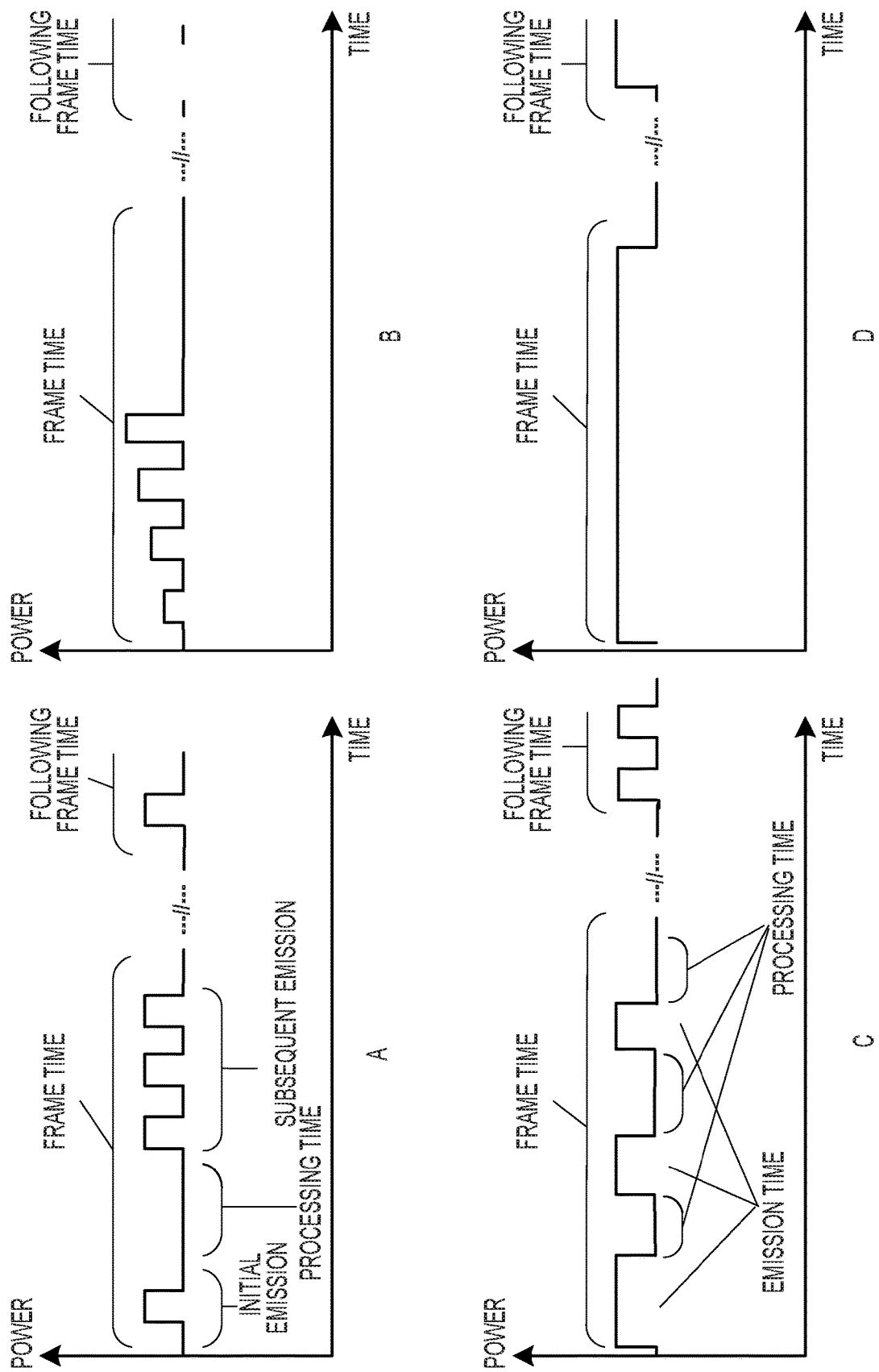
FIG. 5A includes four example diagrams illustrating emission patterns in a single frame-time for a single portion of the field of view.
Figure 5C:
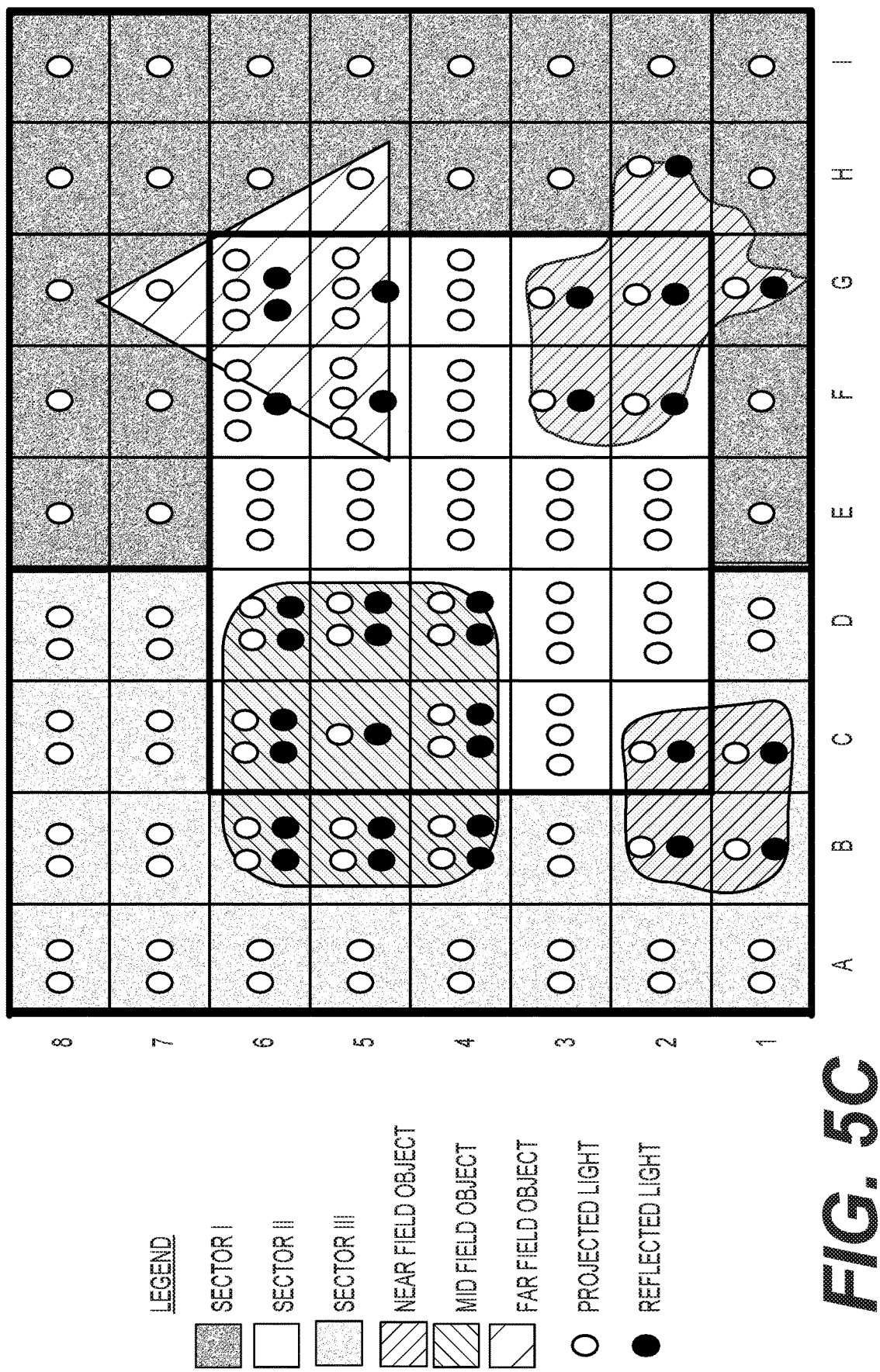
FIG. 5C is a diagram illustrating the actual light emission projected towards and reflections received during a single frame-time for the whole field of view.

FIGS. 5A-5C depict different functionalities of processing units 108 in accordance with some embodiments of the present disclosure. Specifically, FIG. 5A is a diagram illustrating emission patterns in a single frame-time for a single portion of the field of view, FIG. 5B is a diagram illustrating emission scheme in a single frame-time for the whole field of view, and, FIG. 5C is a diagram illustrating the actual light emission projected towards field of view during a single scanning cycle.

FIG. 5A illustrates four examples of emission patterns in a single frame-time for a single portion 122 of field of view 120 associated with an instantaneous position of at least one light deflector 114. Consistent with embodiments of the present disclosure, processing unit 108 may control at least one light source 112 and light deflector 114 (or coordinate the operation of at least one light source 112 and at least one light deflector 114) in a manner enabling light flux to vary over a scan of field of view 120. Consistent with other embodiments, processing unit 108 may control only at least one light source 112 and light deflector 114 may be moved or pivoted in a fixed predefined pattern.

Diagrams A-D in FIG. 5A depict the power of light emitted towards a single portion 122 of field of view 120 over time. In Diagram A, processor 118 may control the operation of light source 112 in a manner such that during scanning of field of view 120 an initial light emission is projected toward portion 122 of field of view 120. When projecting unit 102 includes a pulsed-light light source, the initial light emission may include one or more initial pulses (also referred to as "pilot pulses"). Processing unit 108 may receive from sensor 116 pilot information about reflections associated with the initial light emission. In one embodiment, the pilot information may be represented as a single signal based on the outputs of one or more detectors (e.g. one or more SPADs, one or more APDs, one or more SiPMs, etc.) or as a plurality of signals based on the outputs of multiple detectors. In one example, the pilot information may include analog and/or digital information. In another example, the pilot information may include a single value and/or a plurality of values (e.g. for different times and/or parts of the segment).

Based on information about reflections associated with the initial light emission, processing unit 108 may be configured to determine the type of subsequent light emission to be projected towards portion 122 of field of view 120. The determined subsequent light emission for the particular portion of field of view 120 may be made during the same scanning cycle (i.e., in the same frame) or in a subsequent scanning cycle (i.e., in a subsequent frame). This embodiment is described in greater detail below with reference to FIGS. 23-25.

In Diagram B, processor 118 may control the operation of light source 112 in a manner such that during scanning of field of view 120 light pulses in different intensities are projected towards a single portion 122 of field of view 120. In one embodiment, LIDAR system 100 may be operable to generate depth maps of one or more different types, such as any one or more of the following types: point cloud model, polygon mesh, depth image (holding depth information for each pixel of an image or of a 2D array), or any other type of 3D model of a scene. The sequence of depth maps may be a temporal sequence, in which different depth maps are generated at a different time. Each depth map of the sequence associated with a scanning cycle (interchangeably "frame") may be generated within the duration of a corresponding subsequent frame-time. In one example, a typical frame-time may last less than a second. In some embodiments, LIDAR system 100 may have a fixed frame rate (e.g. 10 frames per second, 25 frames per second, 50 frames per second) or the frame rate may be dynamic. In other embodiments, the frame-times of different frames may not be identical across the sequence. For example, LIDAR system 100 may implement a 10 frames-per-second rate that includes generating a first depth map in 100 milliseconds (the average), a second frame in 92 milliseconds, a third frame at 142 milliseconds, and so on.

In Diagram C, processor 118 may control the operation of light source 112 in a manner such that during scanning of field of view 120 light pulses associated with different durations are projected towards a single portion 122 of field of view 120. In one embodiment, LIDAR system 100 may be operable to generate a different number of pulses in each frame. The number of pulses may vary between 0 to 32 pulses (e.g., 1, 5, 12, 28, or more pulses) and may be based on information derived from previous emissions. The time between light pulses may depend on desired detection range and can be between 500 ns and 5,000 ns. In one example, processing unit 108 may receive from sensor 116 information about reflections associated with each light-pulse. Based on the information (or the lack of information), processing unit 108 may determine if additional light pulses are needed. It is noted that the durations of the processing times and the emission times in diagrams A-D are not in-scale. Specifically, the processing time may be substantially longer than the emission time. In diagram D, projecting unit 102 may include a continuous-wave light source. In one embodiment, the initial light emission may include a period of time where light is emitted and the subsequent emission may be a continuation of the initial emission, or there may be a discontinuity. In one embodiment, the intensity of the continuous emission may change over time.

Consistent with some embodiments of the present disclosure, the emission pattern may be determined per each portion of field of view 120. In other words, processor 118 may control the emission of light to allow differentiation in the illumination of different portions of field of view 120. In one example, processor 118 may determine the emission pattern for a single portion 122 of field of view 120, based on detection of reflected light from the same scanning cycle (e.g., the initial emission), which makes LIDAR system 100 extremely dynamic. In another example, processor 118 may determine the emission pattern for a single portion 122 of field of view 120, based on detection of reflected light from a previous scanning cycle. The differences in the patterns of the subsequent emissions may result from determining different values for light-source parameters for the subsequent emission, such as any one of the following.

a. Overall energy of the subsequent emission.
 b. Energy profile of the subsequent emission.
 c. A number of light-pulse-repetition per frame.
 d. Light modulation characteristics such as duration, rate, peak, average power, and pulse shape.
 e. Wave properties of the subsequent emission, such as polarization, wavelength, etc.

Consistent with the present disclosure, the differentiation in the subsequent emissions may be put to different uses. In one example, it is possible to limit emitted power levels in one portion of field of view 120 where safety is a consideration, while emitting higher power levels (thus improving signal-to-noise ratio and detection range) for other portions of field of view 120. This is relevant for eye safety, but may also be relevant for skin safety, safety of optical systems, safety of sensitive materials, and more. In another example, it is possible to direct more energy towards portions of field of view 120 where it will be of greater use (e.g. regions of interest, further distanced targets, low reflection targets, etc.)

while limiting the lighting energy to other portions of field of view 120 based on detection results from the same frame or previous frame. It is noted that processing unit 108 may process detected signals from a single instantaneous field of view several times within a single scanning frame time; for example, subsequent emission may be determined upon after every pulse emitted, or after a number of pulses emitted.

FIG. 5B illustrates three examples of emission schemes in a single frame-time for field of view 120. Consistent with embodiments of the present disclosure, at least on processing unit 108 may use obtained information to dynamically adjust the operational mode of LIDAR system 100 and/or determine values of parameters of specific components of LIDAR system 100. The obtained information may be determined from processing data captured in field of view 120, or received (directly or indirectly) from host 210. Processing unit 108 may use the obtained information to determine a scanning scheme for scanning the different portions of field of view 120. The obtained information may include a current light condition, a current weather condition, a current driving environment of the host vehicle, a current location of the host vehicle, a current trajectory of the host vehicle, a current topography of road surrounding the host vehicle, or any other condition or object detectable through light reflection. In some embodiments, the determined scanning scheme may include at least one of the following: (a) a designation of portions within field of view 120 to be actively scanned as part of a scanning cycle, (b) a projecting plan for projecting unit 102 that defines the light emission profile at different portions of field of view 120; (c) a deflecting plan for scanning unit 104 that defines, for example, a deflection direction, frequency, and designating idle elements within a reflector array; and (d) a detection plan for sensing unit 106 that defines the detectors sensitivity or responsivity pattern.

In addition, processing unit 108 may determine the scanning scheme at least partially by obtaining an identification of at least one region of interest within the field of view 120 and at least one region of non-interest within the field of view 120. In some embodiments, processing unit 108 may determine the scanning scheme at least partially by obtaining an identification of at least one region of high interest within the field of view 120 and at least one region of lower-interest within the field of view 120. The identification of the at least one region of interest within the field of view 120 may be determined, for example, from processing data captured in field of view 120, based on data of another sensor (e.g. camera, GPS), received (directly or indirectly) from host 210, or any combination of the above. In some embodiments, the identification of at least one region of interest may include identification of portions, areas, sections, pixels, or objects within field of view 120 that are important to monitor. Examples of areas that may be identified as regions of interest may include, crosswalks, moving objects, people, nearby vehicles or any other environmental condition or object that may be helpful in vehicle navigation. Examples of areas that may be identified as regions of non-interest (or lower-interest) may be static (non-moving) far-away buildings, a skyline, an area above the horizon and objects in the field of view. Upon obtaining the identification of at least one region of interest within the field of view 120, processing unit 108 may determine the scanning scheme or change an existing scanning scheme. Further to determining or changing the light-source parameters (as described above), processing unit 108 may allocate detector resources based on the identification of the at least one region of interest. In one example, to reduce noise, processing unit 108 may activate detectors 410 where a region of interest is expected and disable detectors 410 where regions of non-interest are expected. In another example, processing unit 108 may change the detector sensitivity, e.g., increasing sensor sensitivity for long range detection where the reflected power is low.

Diagrams A-C in FIG. 5B depict examples of different scanning schemes for scanning field of view 120. Each square in field of view 120 represents a different portion 122 associated with an instantaneous position of at least one light deflector 114. Legend 500 details the level of light flux represented by the filling pattern of the squares. Diagram A depicts a first scanning scheme in which all of the portions have the same importance/priority and a default light flux is allocated to them. The first scanning scheme may be utilized in a start-up phase or periodically interleaved with another scanning scheme to monitor the whole field of view for unexpected/new objects. In one example, the light source parameters in the first scanning scheme may be configured to generate light pulses at constant amplitudes. Diagram B depicts a second scanning scheme in which a portion of field of view 120 is allocated with high light flux while the rest of field of view 120 is allocated with default light flux and low light flux. The portions of field of view 120 that are the least interesting may be allocated with low light flux. Diagram C depicts a third scanning scheme in which a compact vehicle and a bus (see silhouettes) are identified in field of view 120. In this scanning scheme, the edges of the vehicle and bus may be tracked with high power and the central mass of the vehicle and bus may be allocated with less light flux (or no light flux). Such light flux allocation enables concentration of more of the optical budget on the edges of the identified objects and less on their center which have less importance.

FIG. 5C illustrating the emission of light towards field of view 120 during a single scanning cycle. In the depicted example, field of view 120 is represented by an 8×9 matrix, where each of the 72 cells corresponds to a separate portion 122 associated with a different instantaneous position of at least one light deflector 114. In this exemplary scanning cycle, each portion includes one or more white dots that represent the number of light pulses projected toward that portion, and some portions include black dots that represent reflected light from that portion detected by sensor 116. As shown, field of view 120 is divided into three sectors: sector I on the right side of field of view 120, sector II in the middle of field of view 120, and sector III on the left side of field of view 120. In this exemplary scanning cycle, sector I was initially allocated with a single light pulse per portion; sector II, previously identified as a region of interest, was initially allocated with three light pulses per portion; and sector III was initially allocated with two light pulses per portion. Also as shown, scanning of field of view 120 reveals four objects 208: two free-form objects in the near field (e.g., between 5 and 50 meters), a rounded-square object in the mid field (e.g., between 50 and 150 meters), and a triangle object in the far field (e.g., between 150 and 500 meters). While the discussion of FIG. 5C uses number of pulses as an example of light flux allocation, it is noted that light flux allocation to different parts of the field of view may also be implemented in other ways such as: pulse duration, pulse angular dispersion, wavelength, instantaneous power, photon density at different distances from light source 112, average power, pulse power intensity, pulse width, pulse repetition rate, pulse sequence, pulse duty cycle, wavelength, phase, polarization, and more. The illustration of the light emission as a single scanning cycle in FIG. 5C demonstrates different capabilities of LIDAR system 100. In a first embodiment, processor 118 is configured to use two light pulses to detect a first object (e.g., the rounded-square object) at a first distance, and to use three light pulses to detect a second object (e.g., the triangle object) at a second distance greater than the first distance. This embodiment is described in greater detail below with reference to FIGS. 11-13. In a second embodiment, processor 118 is configured to allocate more light to portions of the field of view where a region of interest is identified. Specifically, in the present example, sector II was identified as a region of interest and accordingly it was allocated with three light pulses while the rest of field of view 120 was allocated with two or less light pulses. This embodiment is described in greater detail below with reference to FIGS. 20-22. In a third embodiment, processor 118 is configured to control light source 112 in a manner such that only a single light pulse is projected toward to portions B1, B2, and C1 in FIG. 5C, although they are part of sector III that was initially allocated with two light pulses per portion. This occurs because the processing unit 108 detected an object in the near field based on the first light pulse. This embodiment is described in greater detail below with reference to FIGS. 23-25. Allocation of less than maximal amount of pulses may also be a result of other considerations. For examples, in at least some regions, detection of object at a first distance (e.g. a near field object) may result in reducing an overall amount of light emitted to this portion of field of view 120. This embodiment is described in greater detail below with reference to FIGS. 14-16. Other reasons for determining power allocation to different portions is discussed below with respect to FIGS. 29-31, FIGS. 53-55, and FIGS. 50-52.

Additional details and examples on different components of LIDAR system 100 and their associated functionalities are included in Applicant's U.S. patent application Ser. No. 15/391,916 filed Dec. 28, 2016; Applicant's U.S. patent application Ser. No. 15/393,749 filed Dec. 29, 2016; Applicant's U.S. patent application Ser. No. 15/393,285 filed Dec. 29, 2016; and Applicant's U.S. patent application Ser. No. 15/393,593 filed Dec. 29, 2016, which are incorporated herein by reference in their entirety.

Example Implementation: Vehicle

Figure 6C:
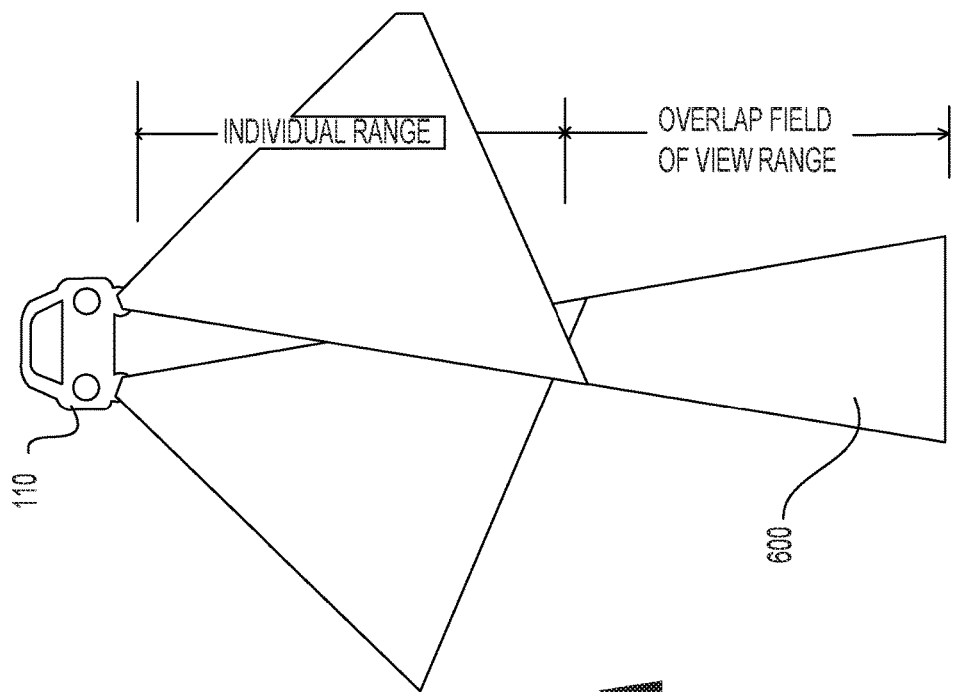
FIG. 6C is a diagram illustrating an example view range of the example implementation of FIG. 6A.
Figure 6A:
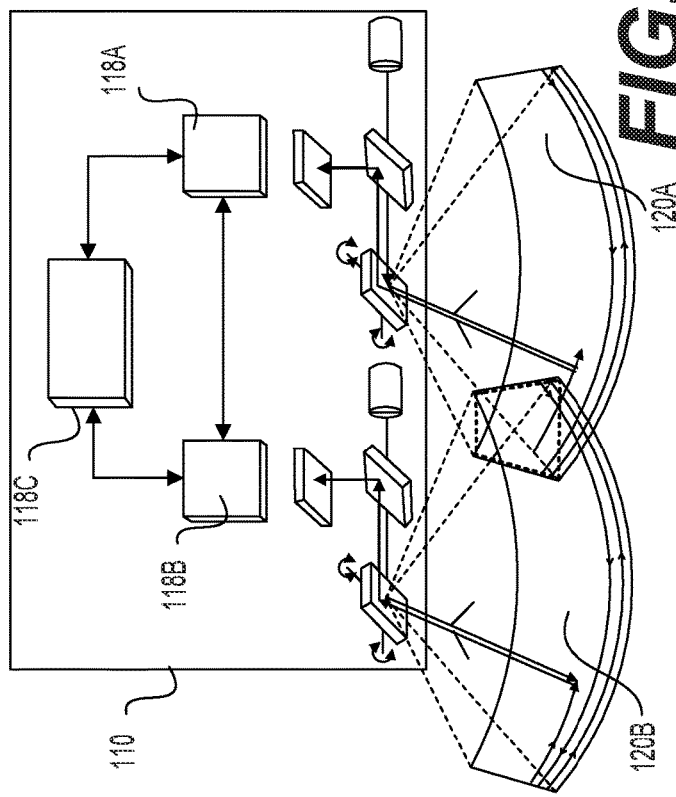
FIG. 6A is a diagram illustrating a first example implementation consistent with some embodiments of the present disclosure.
Figure 6B:
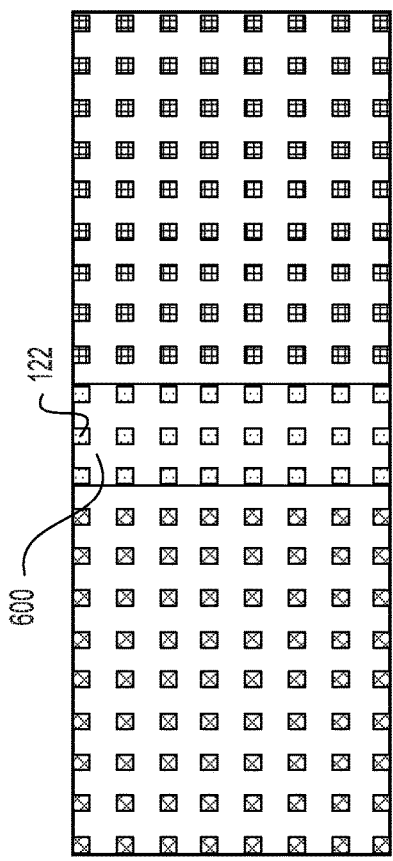
FIG. 6B is a diagram illustrating an example emission scheme used in the example implementation of FIG. 6A.

FIGS. 6A-6C illustrate the implementation of LIDAR system 100 in a vehicle (e.g., vehicle 110). Any of the aspects of LIDAR system 100 described above or below may be incorporated into vehicle 110 to provide a range-sensing vehicle. Specifically, in this example, LIDAR system 100 integrates multiple scanning units 104 and potentially multiple projecting units 102 in a single vehicle. In one embodiment, a vehicle may take advantage of such a LIDAR system to improve power, range and accuracy in the overlap zone and beyond it, as well as redundancy in sensitive parts of the FOV (e.g. the forward movement direction of the vehicle). As shown in FIG. 6A, vehicle 110 may include a first processor 118A for controlling the scanning of field of view 120A, a second processor 118B for controlling the scanning of field of view 120B, and a third processor 118C for controlling synchronization of scanning the two fields of view. In one example, processor 118C may be the vehicle controller and may have a shared interface between first processor 118A and second processor 118B. The shared interface may enable an exchanging of data at intermediate processing levels and a synchronization of scanning of the combined field of view in order to form an overlap in the temporal and/or spatial space. In one embodiment, the data exchanged using the shared interface may be: (a) time of flight of received signals associated with pixels in the overlapped field of view and/or in its vicinity; (b) laser steering position status; (c) detection status of objects in the field of view.

FIG. 6B illustrates overlap region 600 between field of view 120A and field of view 120B. In the depicted example, the overlap region is associated with 24 portions 122 from field of view 120A and 24 portions 122 from field of view 120B. Given that the overlap region is defined and known by processors 118A and 118B, each processor may be designed to limit the amount of light emitted in overlap region 600 in order to conform with an eye safety limit that spans multiple source lights, or for other reasons such as maintaining an optical budget. In addition, processors 118A and 118B may avoid interferences between the light emitted by the two light sources by loose synchronization between the scanning unit 104A and scanning unit 104B, and/or by control of the laser transmission timing, and/or the detection circuit enabling timing.

FIG. 6C illustrates how overlap region 600 between field of view 120A and field of view 120B may be used to increase the detection distance of vehicle 110. Consistent with the present disclosure, two or more light sources 112 projecting their nominal light emission into the overlap zone may be leveraged to increase the effective detection range. The term "detection range" may include an approximate distance from vehicle 110 at which LIDAR system 100 can clearly detect an object. In one embodiment, the maximum detection range of LIDAR system 100 is about 300 meters, about 400 meters, or about 500 meters. For example, for a detection range of 200 meters, LIDAR system 100 may detect an object located 200 meters (or less) from vehicle 110 at more than 95%, more than 99%, more than 99.5% of the times. Even when the object's reflectivity may be less than 50% (e.g., less than 20%, less than 10%, or less than 5%). In addition, LIDAR system 100 may have less than 1% false alarm rate. In one embodiment, light from projected from two light sources that are collocated in the temporal and spatial space can be utilized to improve SNR and therefore increase the range and/or quality of service for an object located in the overlap region. Processor 118C may extract high-level information from the reflected light in field of view 120A and 120B. The term "extracting information" may include any process by which information associated with objects, individuals, locations, events, etc., is identified in the captured image data by any means known to those of ordinary skill in the art. In addition, processors 118A and 118B may share the high-level information, such as objects (road delimiters, background, pedestrians, vehicles, etc.), and motion vectors, to enable each processor to become alert to the peripheral regions about to become regions of interest. For example, a moving object in field of view 120A may be determined to soon be entering field of view 120B.

Example Implementation: Surveillance System

Figure 6D:
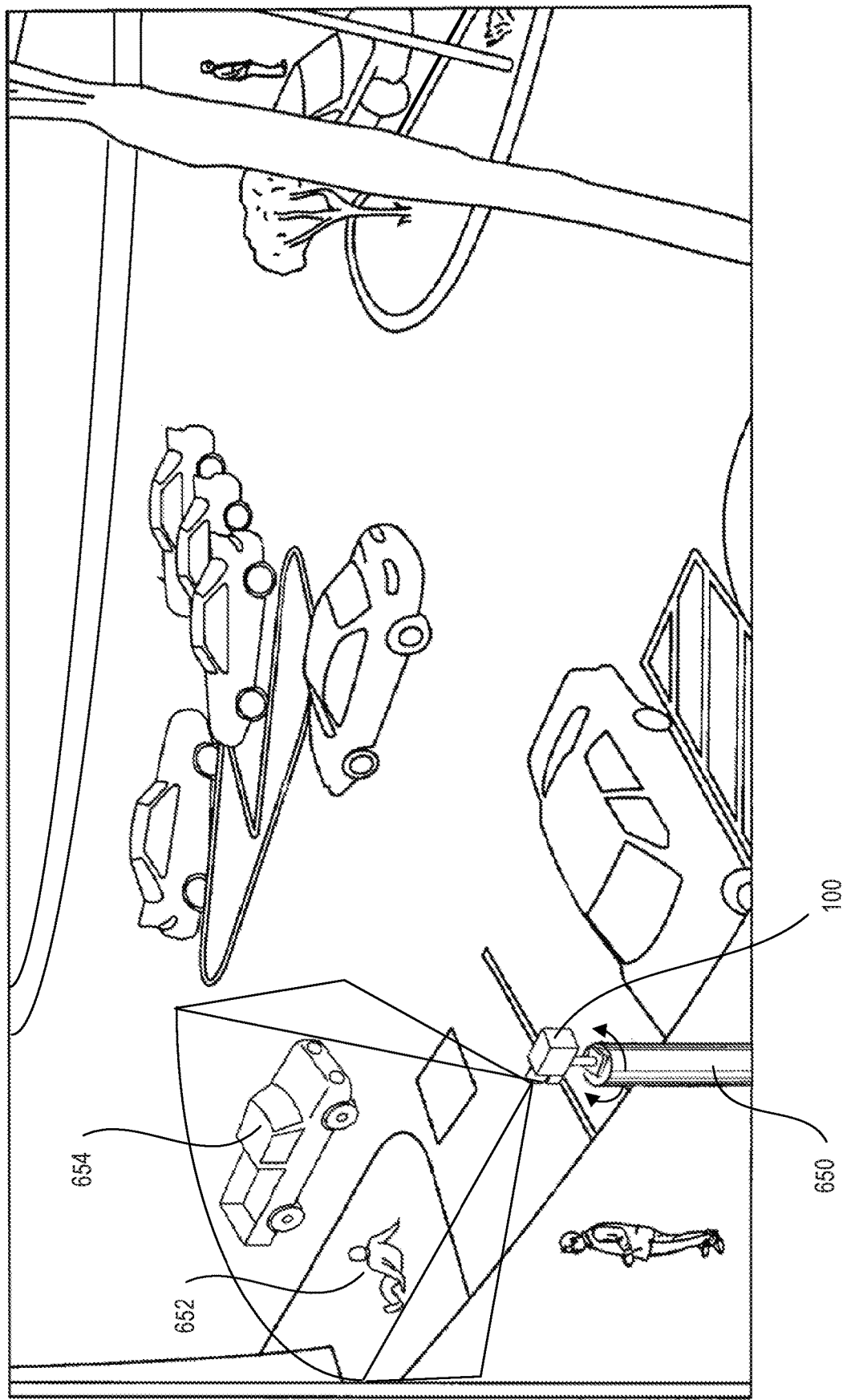
FIG. 6D is a diagram illustrating a second example implementation consistent with some embodiments of the present disclosure.

FIG. 6D illustrates the implementation of LIDAR system 100 in a surveillance system. As mentioned above. LIDAR system 100 may be fixed to a stationary object 650 that may include a motor or other mechanisms for rotating the housing of the LIDAR system 100 to obtain a wider field of view. Alternatively, the surveillance system may include a plurality of LIDAR units. In the example depicted in FIG. 6D, the surveillance system may use a single rotatable LIDAR system 100 to obtain 3D data representing field of view 120 and to process the 3D data to detect people 652, vehicles 654, changes in the environment, or any other form of security-significant data.

Consistent with some embodiment of the present disclosure, the 3D data may be analyzed to monitor retail business processes. In one embodiment, the 3D data may be used in retail business processes involving physical security (e.g., detection of: an intrusion within a retail facility, an act of vandalism within or around a retail facility, unauthorized access to a secure area, and suspicious behavior around cars in a parking lot). In another embodiment, the 3D data may be used in public safety (e.g., detection of: people slipping and falling on store property, a dangerous liquid spill or obstruction on a store floor, an assault or abduction in a store parking lot, an obstruction of a fire exit, and crowding in a store area or outside of the store). In another embodiment, the 3D data may be used for business intelligence data gathering (e.g., tracking of people through store areas to determine, for example, how many people go through, where they dwell, how long they dwell, how their shopping habits compare to their purchasing habits).

Consistent with other embodiments of the present disclosure, the 3D data may be analyzed and used for traffic enforcement. Specifically, the 3D data may be used to identify vehicles traveling over the legal speed limit or some other road legal requirement. In one example, LIDAR system 100 may be used to detect vehicles that cross a stop line or designated stopping place while a red traffic light is showing. In another example, LIDAR system 100 may be used to identify vehicles traveling in lanes reserved for public transportation. In yet another example, LIDAR system 100 may be used to identify vehicles turning in intersections where specific turns are prohibited on red.

It should be noted that while examples of various disclosed embodiments have been described above and below with respect to a control unit that controls scanning of a deflector, the various features of the disclosed embodiments are not limited to such systems. Rather, the techniques for allocating light to various portions of a LIDAR FOV may be applicable to type of light-based sensing system (LIDAR or otherwise) in which there may be a desire or need to direct different amounts of light to different portions of field of view. In some cases, such light allocation techniques may positively impact detection capabilities, as described herein, but other advantages may also result.

Detecting Objects Based on Reflectivity Fingerprints

In addition to determining distances based on reflected pulses, LIDAR systems disclosed herein may further determine the reflectivity of portions of a field of view based on reflected pulses. For example, the intensity of the reflected pulses may be normalized based on determined distances in order to determine reflectivity values. The determined reflectivities may be used for object identification (e.g., using a "reflectivity fingerprint").

Systems of the present disclosure may provide more detailed feedback than extant systems. For example, LIDAR systems of the present disclosure may output any combination of one or more of: reflectivity (e.g., an illumination level, optionally corrected for distance and the like), surface angles (e.g., based on single pixel information and/or information across pixels), confidence levels (e.g., associated with detections or with other parameters such as reflectivity, surface angles, etc.), ambient light level (e.g., measurements taken without illumination from the LIDAR), properties of detected objects (e.g., whether the object is metal), or the like. In addition, LIDAR systems of the present disclosure may allow for determination of changes in any of the outputs as compared with one or more previous frames (e.g., changes in reflectivity, changes in confidence levels, changes in ambient light, or the like). In some embodiments, this additional information may be used directly to detect objects and determine properties of detected objects. Additionally or alternatively, this additional information may be used to construct and/or analyze point cloud maps (an example of which is described above with respect to FIG. 1C).

In some embodiments, objects detected by a LIDAR system may possess reflectivity patterns that allow for identification based on known patterns. For example, other vehicles may possess recognizable reflectivity patterns based on highly reflective components such as headlamps, taillamps, license plates, or the like. By identifying objects using reflectivity patterns, objects may be identified at larger distances and/or with less data than using extant LIDAR identification techniques. Some non-limiting examples of "less data" in the present context include: fewer point-cloud points, point-clouds with lower confidence levels (e.g., of detection, ranges, or other parameters), point-cloud points for which less parameters have been determined, or the like.

As used herein, "reflectivity" may refer to the detection level output by one or more sensors of the LIDAR but may also refer to a detection level that has been corrected or normalized (e.g., corrected for distance between a light source of the LIDAR and a detected object, such as dividing by R or by $R^2$, or the like). By combining (optionally corrected or normalized) reflectivity values with a spatial point cloud map, systems of the present disclosure may allow for more accurate detection, identification and characterization of objects than extant techniques. In addition, systems of the present disclosure may allow for detection, identification and characterization of objects that may otherwise be undetectable and/or unidentifiable with extant techniques. Characterization may include, for example, assessing the spatial dimensions of a detected or identified objects, assessing of its progression direction and velocity, or the like.

Figure 7:
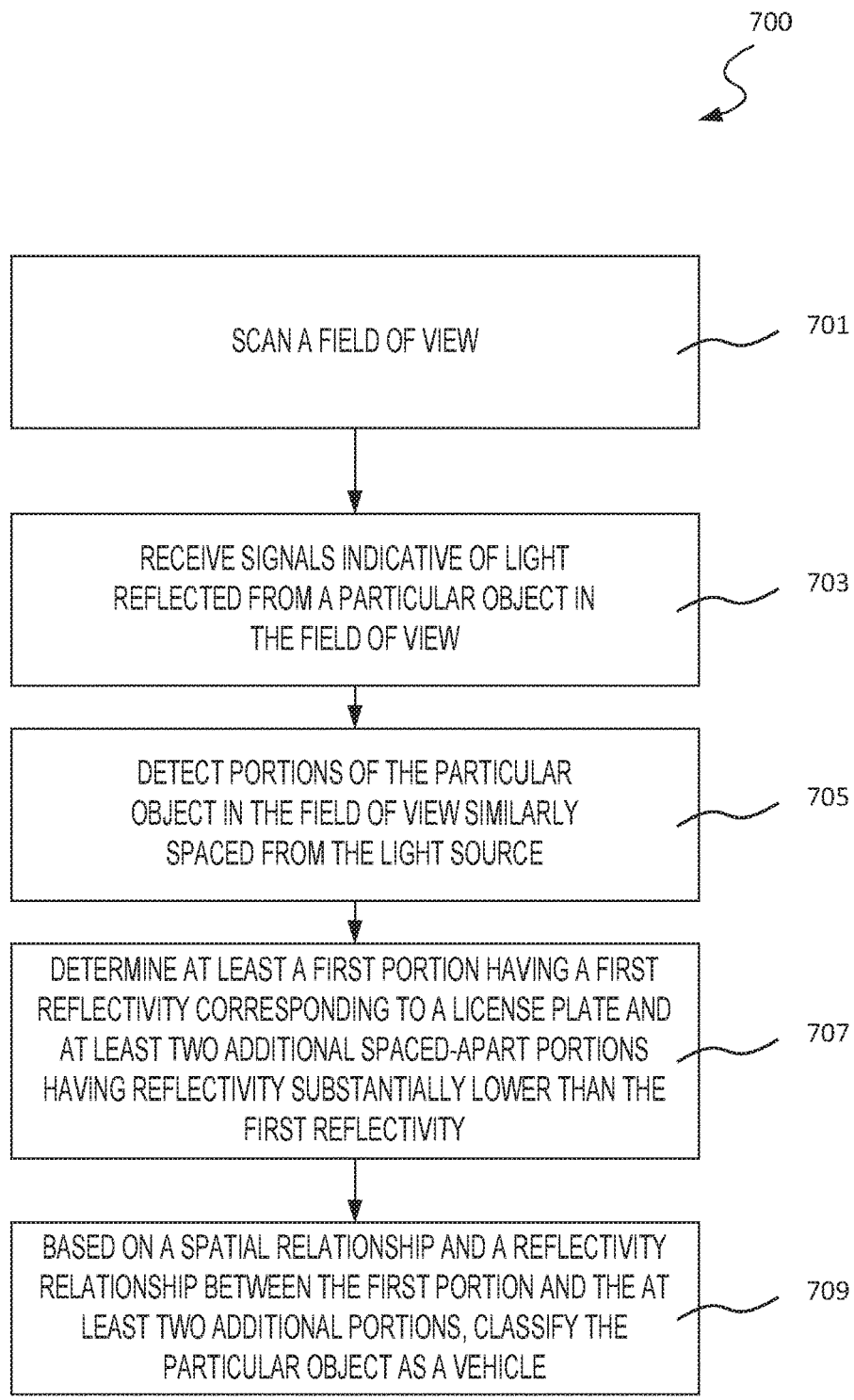
FIG. 7 depicts an exemplary method for detecting a vehicle based on license plate reflectivity consistent with some embodiments of the present disclosure.

FIG. 7 depicts an example method 700 for detecting a vehicle based on license plate reflectivity, in accordance with examples of the presently disclosed subject matter. Method 700 may be executed by at least one processor, such as a processor of a LIDAR system (e.g., at least one processor 118 of processing unit 108 in the example of FIG. 1A, two processors 118 of processing unit 108 of FIG. 2A, any one or more of processing units 108 of FIGS. 5A-5C, or the like). It is noted that method 700 may be implemented by any type of LIDAR system, and not necessarily by LIDAR system 100. For example, method 700 may be executed by a scanning or a non-scanning LIDAR system, by a pulsed or continuous-wave LIDAR system, or the like.

At step 701, the at least one processor scans a field of view by controlling movement of at least one deflector at which at least one light source is directed. For example, the at least one processor may control movement of light deflector 114 of FIG. 1A, light deflectors 114A and 114B of FIG. 2A, light deflectors 216 of FIG. 2B, light deflector 216 of FIG. 2C, or the like. In some embodiments, step 701 may be omitted from method 700. For example, method 700 may be performed with a LIDAR system that is stationary (also referred to as "fixed" or "staring") rather than scanning.

In some embodiments, the at least one processor may further control the at least one light source in a manner enabling light flux of light projected from the at least one light source to vary during scanning of the field of view. For example, the at least one processor may vary the timing of pulses from the at least one light source. Alternatively or concurrently, the at least one processor may vary the length of pulses from the at least one light source. By way of further example, the at least one processor may alternatively or concurrently vary a size (e.g., length or width or otherwise alter a cross-sectional area) of pulses from the at least one light source. In a yet further example, the at least one processor may alternatively or concurrently vary the amplitude and/or frequency of pulses from the at least one light source. In certain aspects, the at least one processor may vary the light flux during a single scan and/or across a plurality of scans. Additionally or alternatively, the at least one processor may vary the light flux across a plurality of regions in the field of view (e.g., during a scan and/or across a plurality of scans).

In some embodiments, method 700 may further include controlling the at least one light deflector such that during a scanning cycle of the field of view, the at least one light deflector instantaneously assumes a plurality of instantaneous positions. In one example, the at least one processor may coordinate the at least one light deflector and the at least one light source such that when the at least one light deflector assumes a particular instantaneous position, a portion of a light beam is deflected by the at least one light deflector from the at least one light source towards an object in the field of view, and reflections of the portion of the light beam from the object are deflected by the at least one light deflector toward at least one sensor. In another example, the at least one light source may comprise a plurality of lights sources aimed at the at least one light deflector, and the at least one processor may control the at least one light deflector such that when the at least one light deflector assumes a particular instantaneous position, light from the plurality of light sources is projected towards a plurality of independent regions in the field of view.

In other embodiments, method 700 may be performed without varying the light flux of the at least one light source. For example, method 700 may be performed with a LIDAR system that is fixed-power rather than variable-power.

Optionally, the at least one processor may further control the at least one light source in a manner enabling modulating the projected light and distinguishing between light reflected from objects in the field of view and light emitted by objects in the field of view. For example, the at least one processor may pulse the at least one light source such that the gap between pulses is sufficiently long to receive light emitted by objects in the field of view without any reflections from objects in the field of view of light emitted by the LIDAR system.

At step 703, the at least one processor receives from at least one sensor signals indicative of light reflected from a particular object in the field of view. For example, the at least one processor may receive the signals from the sensor of the LIDAR system (e.g., sensor 116 of FIG. 1A or FIG. 2A, sensors 116 of FIG. 2B, sensor 116 of FIG. 2C, or the like). In some embodiments, the signals may comprise raw signal data from the at least one sensor.

In other embodiments, one or more processors (e.g., the at least one processor and/or one or more other processors) may first perform one or more operations on the raw signal data. For example, as discussed above, the one or more operations may include correction and/or normalization based on a detected distance for each signal. In another example, the one or more operations may include correction and/or normalization for noise (e.g., based on an expected level of noise, based on a measured level of noise, based on expected signal level and/or based on a measured signal level). In yet another example, the one or more operations may include application of one or more filters (e.g., a low pass filter, a bandpass filter, and/or a high pass filter).

It is noted that steps 701 and 703 are optional, and may alternatively be executed by another system than the system which utilizes the detection results for object classification. For example, steps 701 and/or 703 may be executed by a LIDAR sensing system (e.g., located at the front of a vehicle having the LIDAR system) that may process the sensor detection to provide a 3D model of the surrounding while steps 705, 707, and 709 may be executed by a LIDAR system that may process the inputs to classify object, such as a host system of the vehicle. It is noted that the system which executes steps 705, 707, and 709 may also utilize other sensor inputs (e.g., camera, radar, etc.) to analyze the environment of the vehicle in addition to the LIDAR detection results. In embodiments where steps 701 and 703 are executed by another system, method 700 may alternatively begin with receiving detection results from a LIDAR sensing system including reflectivity information associated with different locations in the environment of the LIDAR sensing system.

At step 705, the at least one processor detects portions of the particular object in the field of view that are similarly spaced from the light source. For example, the detection of the portions of the particular object that are similarly spaced from the light source may be based on time of flight of the received signals (which may be calculated based on a difference between a time of illumination—e.g., a time of sending one or more pulses from the at least one light source—and a time of detection—e.g., a time that one or more reflected pulses are absorbed on the at least one sensor). The detection of the portions of the particular object that are similarly spaced from the light source may additionally or alternatively be based on location information determined for different locations in the environment of the LIDAR system by analysis of the LIDAR detection results (e.g., point-cloud points).

Optionally, the at least one processor may first detect (e.g., identify boundaries of) the particular object. In one example, the at least one processor may construct a point cloud map from the received signals and detect the particular object therewith. In another example, the at least one processor may use one or more properties of the received signals (e.g., brightness, color, etc.) to detect the particular object. In other embodiments, the at least one processor may detect the similarly spaced portions without first detecting the particular object.

As used herein, "similarly spaced" may refer to portions that are at the same distance from the light source or to portions that are at distances from the light source within a particular threshold (e.g., 0.2 m, 1 m, 2 m, within 2% of the shortest distance, 5% of each other, or the like). It is noted that step 705 may additionally or alternatively include detecting the portions of the particular object which—in addition to being similarly spaced from the light source—are also grouped in a relatively small volume. For example, these portions may also be detected in proximate viewing angle of the LIDAR system, (e.g., within a 1°-1° portion of the FOV, within a 2°-2° portion of the FOV) and/or within a limited distance from one another (e.g., less than 1 m, 2 m, 5 m, etc. from one another, in any direction).

At step 707, the at least one processor determines, based on the detected portions, at least a first portion having a first reflectivity corresponding to a license plate, and at least two additional spaced-apart portions corresponding to locations on the particular object other than a location of the first portion, and wherein the at least two additional portions have reflectivity substantially lower than the first reflectivity. For example, the first reflectivity may be within a preset range such that the at least one processor classifies the portion as a license plate. In another example, the first reflectivity may be higher (e.g., two times, five times, etc.) than the reflectivity of a surrounding area, the maximum reflectivity of the surrounding area and/or the rest of the received signals, or a statistical value derived from the received signals or a portion thereof (e.g., corresponding to the surrounding area). The statistical value may include a mean, a median, a standard deviation, or the like.

Optionally, the at least two additional portions may have the same (or substantially the same, e.g., within 2%, within 5%, etc.) reflectivity. In other embodiments, the at least two additional portions may have differing reflectivities, each of which is substantially lower than the first reflectivity. As used herein, "substantially lower" may refer to a value lower as measured by a particular threshold (e.g., at least 20% lower, at least 25% lower, at least 50% lower, or the like). Although having a lower reflectivity value than the first portion, the second portion and the third portion generally have sufficiently high reflectivity to be detected. Optionally, the portions selected as the second portion and third portion (as well as any other potentially selected portion of the particular object) may be required to meet a minimal reflectivity criterion. It is further noted that method 700 may be used for particular objects whose overall reflection is generally low (e.g., because of color, distance from the LIDAR system, weather, or the like) such that only a few portions of the particular object are even detected.

As used herein, "spaced-apart portions corresponding to locations on the particular object other than a location of the first portion" indicates portions that are excluded from each other as well as from the license plate. Furthermore, as used herein, "reflectivity" may refer to reflectivity by active illumination by LIDAR as well as reflectivity at the same wavelength as the LIDAR.

Additionally or alternatively, at step 707, the at least one processor identifies based on the detected portions, at least a first portion having a first reflectivity, a second portion having a second reflectivity, and a third portion having a third reflectivity, and wherein the at least second and third portions have reflectivity substantially lower than the first reflectivity.

At step 709, based on a spatial relationship and a reflectivity relationship between the first portion and the at least two additional portions, the at least one processor classifies the particular object as a vehicle. Accordingly, the spatial relationship and the reflectivity relationship may form a "reflectivity fingerprint" (or a part of a "reflectivity fingerprint") used to classify the particular object as a vehicle. For example, the spatial relationship may comprise one or more lengths between the first portions and the at least two additional portions (whether center-center, center-edge, edge-edge, or the like), one or more angles between the first portions and the at least two additional portions (or between a connecting line drawn center-center, center-edge, edge-edge, or the like), one or more sizes of the first portions and the at least two additional portions (and/or relations between the one or more sizes), or the like. Meanwhile, the reflectivity relationship may comprise an absolute difference between the first reflectivity and the reflectivities of the at least two additional portions, a scaled difference (e.g., twice, thrice, etc.) between the first reflectivity and the reflectivities of the at least two additional portions, or the like. Additionally or alternatively, the reflectivity relationship may comprise an absolute difference between the second reflectivity and the third reflectivity, a scaled difference (e.g., twice, thrice, etc.) between the second reflectivity and the third reflectivity, or the like.

In one example, the object may be classified as a vehicle when the first portion is between the at least two additional portions. In addition, the object may be classified as a vehicle when the at least two additional portions are located at similar distances from either side of the first portion consistent with expected locations of taillamps (or headlamps).

Additionally or alternatively, at step 709, the at least one processor determines a reflectivity fingerprint of the particular object based on a reflectivity relationship between the first portion, the second portion, and the third portion. As explained above, the reflectivity fingerprint may include the reflectivities of the first portion, the second portion, and the third portion and may further include a spatial relationship between the first portion, the second portion, and the third portion and/or sizes of the first portion, the second portion, and the third portion. In such embodiments, the at least one processor may classify the particular object based on the determined reflectivity fingerprint of the particular object.

Similarly, the at least one processor may use a fingerprint including reflectivity in addition to ambient light level for identification of vehicles. For example, the first portion (corresponding to a license plate) may have high reflectivity while the second and third portions (corresponding to taillamps or headlamps) may have a high ambient light level. In another example, the first portion (corresponding to a license plate) may have high reflectivity as well as a low ambient light level while the second and third portions (corresponding to taillamps or headlamps) may have lower reflectivity and a high ambient light level. These examples may be more accurate and/or efficient for identifying vehicles when taillamps or headlamps are illuminated while using only reflectivity may be more efficient for identifying vehicles when taillamps or headlamps are off. Method 700 may include further steps. For example, method 700 may include determining a distance to the particular object and classifying the particular object based on the determined distance and the spatial relationship between the first portion and the at least two additional portions. For example, the object may be classified as a vehicle if the distance to the particular object is above one threshold and/or below another threshold. In certain aspects, the classification based on the spatial relationship and the reflectivity relationship may depend on the distance to the particular object. For example, a particular spatial relationship and reflectivity relationship may be classified as a vehicle only when the distance to the object is above one threshold and/or below another threshold.

In another example, method 700 may include determining an angle of at least one surface associated with the particular object and classifying the particular object further based on the determined angle and the reflectivity relationship between the first portion and the at least two additional portions. For example, the object may be classified as a vehicle if the angle is above one threshold and/or below another threshold. In certain aspects, the classification based on the spatial relationship and the reflectivity relationship may depend on the angle. For example, a particular spatial relationship and reflectivity relationship may be classified as a vehicle only when the angle is above one threshold and/or below another threshold. The one or more surface angles may be associated to the first, second or third portions of the particular object, or to any other part thereof. The one or more surface angles may optionally be determined on a pixel-by-pixel basis by the LIDAR system.

In a third example, method 700 may include determining confidence levels for the detected/determined reflectivity of the first portion and/or for at least one of the at least two additional portions and classifying the particular object further based on the one or more determined confidence levels and the reflectivity relationship between the first portion and the at least two additional portions. For example, the object may be classified as a vehicle if one or more of the confidence levels are above one threshold and/or below another threshold. In certain aspects, the classification based on the spatial relationship and the reflectivity relationship may depend on one or more of the confidence levels. For example, a particular spatial relationship and reflectivity relationship may be classified as a vehicle only when one or more of the confidence levels are above one threshold and/or below another threshold.

Optionally, method 700 may include determining a confidence level for the determined reflectivity fingerprint and considering the determined confidence when classifying the particular object. For example, the object may be classified only when the confidence level exceeds a threshold. Additionally or alternatively, the at least one processor may identify multiple possible classifications based on the determined reflectivity fingerprint and select from the possible classifications based on confidence levels associated with the possible classifications.

In yet another example, method 700 may include determining distances from the LIDAR system to the first portion and the at least two additional portions of the particular object and accounting for determined distances when classifying the particular object. For example, the at least one processor may consider an absolute difference between the determined distances, a scaled difference (e.g., twice, thrice, etc.) between the determined distances, or the like. In certain aspects, the classification based on the spatial relationship and the reflectivity relationship may depend on the determined distances. For example, a particular spatial relationship and reflectivity relationship may be classified as a vehicle only when the determined distances are above one threshold, below another threshold, and/or differ by no more or by no less than a threshold (e.g., no more than 20 cm, no more than 3 times, no less than 50 m, no less than 2 times, etc.).

Optionally, step 709 may include classifying the object additionally or alternatively based on its relationship with other objects (or at least other detections) in the FOV. For example, if the particular object is located 15 m above the ground (or a road), it may not be classified as a terrestrial vehicle. In another example, if the particular object is located between lane markings, the object may be classified as a car.

In embodiments using a variable-power LIDAR, upon classifying the particular object as a vehicle, the at least one processor may direct more light in a subsequent scanning cycle towards the particular object. The at least one processor may direct more light only towards a region of the field of view including the particular object or may direct more light toward the field of view in general.

Optionally, method 700 may further include classifying at least one additional object as being an object other than a vehicle, based on a determined reflectivity fingerprint of the at least one additional object. For example, the at least one additional object may be classified as a street sign, a lamppost, a stoplight, a road marking, or the like, depending on a reflectivity fingerprint (described above) of the at least one additional object. It is noted that the reflectivity fingerprints of other types of object may include more than three portions whose reflectivity (and possibly additional parameter) match to a predefined pattern.

Similarly, method 700 may further include classifying a plurality of objects within the field of view and distinguishing between the plurality of objects based on a unique (or at least quasi-unique) reflectivity fingerprint associated with each of the plurality of objects. For example, the at least one processor may distinguish between a street sign, a lamppost, a stoplight, a road marking, or the like, depending on reflectivity fingerprints associated therewith. Classifying objects other than vehicles based on associated reflectivity fingerprints may be implemented in addition to or instead of the classification of other objects in the scene as vehicles.

As discussed above, in addition to classification, reflectivity may be incorporated into a point cloud map constructed based on LIDAR data. The generation of a point cloud in which different reflectivity values (optionally adjusted for distance) may be implemented as part of method 700 or independently. Accordingly, method 700 may further include enabling construction of a 3D map of an environment around the vehicle, the 3D map including data representative of a reflectivity of objects in the field of view. For example, the point cloud map of FIG. 1C may incorporate reflectivity data in addition to (or in lieu of) determined distances.

In some embodiments, the vehicle on which the LIDAR system is installed (also referred to below as "the host vehicle." to avoid confusion with the vehicle detected and classified by the LIDAR system) may be at least partially autonomous. Accordingly, method 700 may include causing a change in an operation of the host vehicle based on a type of the particular object. For example, if the particular object is classified as a vehicle, the at least one processor may cause the host vehicle to slow down (by decelerating and/or by braking) and/or change lanes to avoid a collision with the particular object. In another example, if the particular object is classified as a stop sign, the at least one processor may cause the host vehicle to stop at the stop sign. In yet another example, if the particular object is a road marking, the at least one processor may cause a steering adjustment of the vehicle to keep the vehicle within the road marking.

Figure 8:
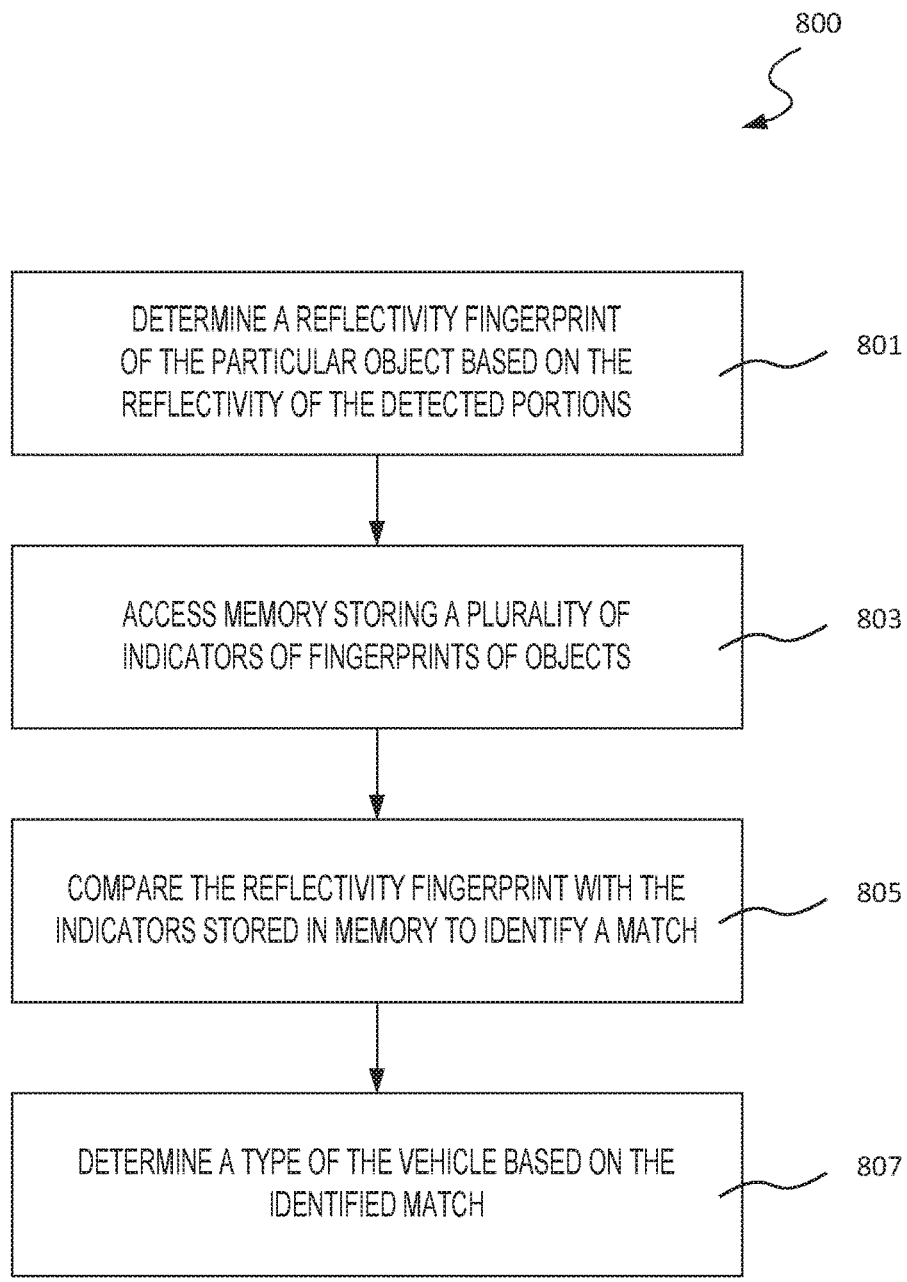
FIG. 8 depicts an exemplary method for classifying vehicles based on a reflectivity fingerprint consistent with some embodiments of the present disclosure.

FIG. 8 depicts an example method 800 for classifying vehicles based on a reflectivity fingerprint. Method 800 may be executed by at least one processor, such as a processor of a LIDAR system (e.g., at least one processor 118 of processing unit 108 in the example of FIG. 1A, two processors 118 of processing unit 108 of FIG. 2A, any one or more of processing units 108 of FIGS. 5A-5C, or the like). In some embodiments, method 800 may be executed separately from method 700. It is noted that method 800 may be implemented by any type of LIDAR system, and not necessarily by LIDAR system 100. For example, method 800 may be executed by a scanning or a non-scanning LIDAR system, by a pulsed or continuous-wave LIDAR system, or the like.

In other embodiments, method 800 may be executed in combination with method 700. For example, one or more of steps 801 through 807 may be executed after step 709 of method 700. In another example, one or more of steps 801 through 807 may be executed in lieu of the execution of steps 705 through 709, and vice versa.

At step 801, the at least one processor determines a reflectivity fingerprint of a particular object based on the reflectivity of the detected portions. As explained above, the reflectivity fingerprint may include the reflectivities of the detected portions and may further include a spatial relationship between the detected portions and/or sizes of the detected portions.

At step 803, the at least one processor accesses memory that stores a plurality of indicators of fingerprints of various objects. For example, a database of reflectivity fingerprints with associated classifications may be accesses. The database may store entire fingerprints or may store one or more unique features (i.e., indicators) of the fingerprints. For example, the database may store indicators indicative of spatial relationship between locations associated with different reflectivities (e.g., a point with high reflectivity positioned substantially in the middle between two points with lower reflectivity, where the reflectivity of the two points is substantially the same, and all three points are separated by areas lacking a detection).

At step 805, the at least one processor compares the reflectivity fingerprint of the particular object with the indicators of fingerprints of various objects stored in memory to identify a match. In some embodiments, a match may comprise a reflectivity fingerprint that maps onto a stored fingerprint (or indicators of the reflectivity fingerprint that map onto stored indicators). In other embodiments, a match may comprise a reflectivity fingerprint that partially maps onto a stored fingerprint (or indicators of the reflectivity fingerprint that partially map onto stored indicators). In such embodiments, the partial mapping may be considered a match only if above a certain threshold (e.g., at least 80% of the indicators match, at least 90% of the fingerprints match, etc.).

At step 807, the at least one processor determines a type of the vehicle based on the identified match. For example, the at least one processor may determine that the vehicle is a minivan, a sport utility vehicle (SUV), a sedan, a semi-truck, or the like. In some embodiments, the at least one processor may determine the type based on a single identified match. In other embodiments, the at least one processor may identify multiple possible matches based on the reflectivity fingerprint and select from the possible matches based on confidence levels associated with the possible matches.

Optionally, method 800 may further include classifying or determining the type of at least one additional object other than a vehicle, based on a determined reflectivity fingerprint of the at least one additional object. For example, the at least one additional object may be classified as a street sign, a lamppost, a stoplight, a road marking, or the like, depending on a reflectivity fingerprint (described above) of the at least one additional object. It is noted that the reflectivity fingerprints of other types of object may include more than three portions whose reflectivity (and/or additional parameters) match one or more predefined patterns.

Figure 9:
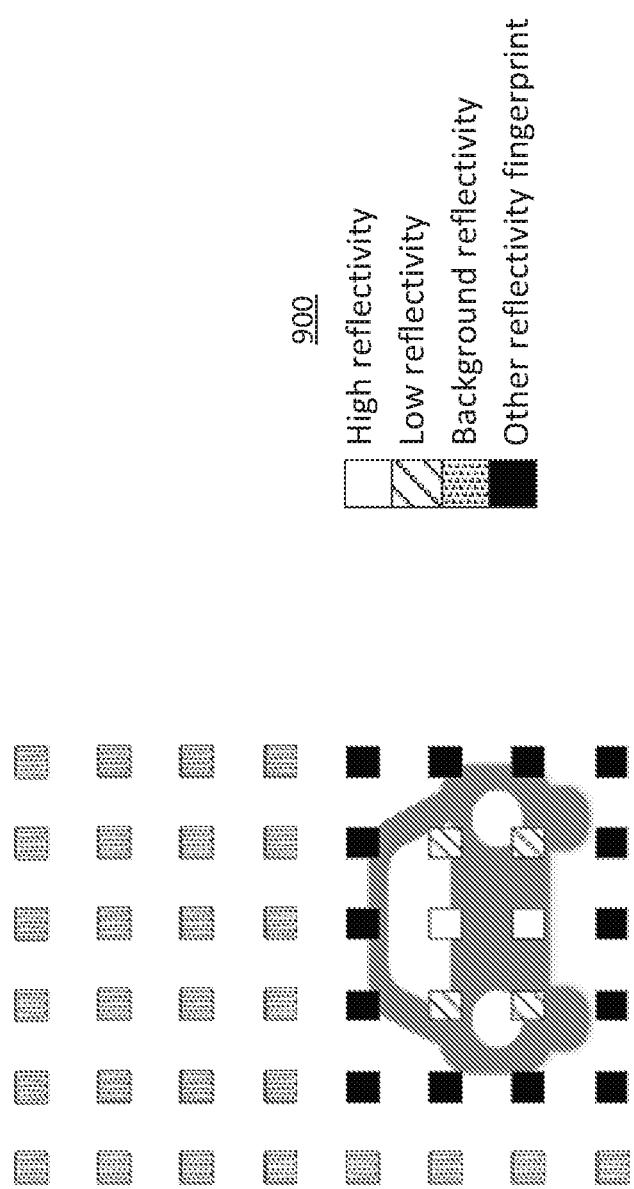
FIG. 9 illustrates an example of identification performed using a reflectivity fingerprint consistent with some embodiments of the present disclosure.

FIG. 9 depicts an example of identification performed using a reflectivity fingerprint. For example, the identification depicted in FIG. 9 may be determined by executing method 700, method 800, or any combination thereof. In the example of FIG. 9, two portions of low reflectivity are located on either side of a portion with high reflectivity. Accordingly, the processor may classify the object as a vehicle (e.g., by determining that the high reflectivity portion is a license plate and the two portions are headlamps). Other portions of the vehicle may also have their reflectivity measured and encapsulated into the reflectivity fingerprint of the vehicle. As exemplified in FIG. 9, each of the portions of the particular object of methods 700 and/or 800 may include more than one pixel and/or more than one point-cloud point.

Although the above examples are described with respect to the use of reflectivity fingerprints, the same embodiments may be employed with respect to other data from the LIDAR system. For example, noise levels, ambient light levels, confidence levels, determined velocity (or other changes in positions and/or size of detected objects), changes in signals or other variables (such as those listed above) across frames, or any combination thereof may be used as fingerprints. In such embodiments, this other data may also be incorporated into a point cloud map with distance information from the LIDAR system. It is noted that methods 700 and 800 may be adapted for utilization of fingerprints based on any combination of one or more of: noise levels, ambient light levels, confidence levels, determined velocity (or other changes in positions and/or size of detected objects), changes in signals or other variables (such as those listed above) across frames, either in addition to or in lieu of reflectivity, mutatis mutatis mutandis.

In one example, the processor may determine the least one detection-quality value during the same scanning cycle in which the detection information was collected by the detector. In such an example, the processor may output a point cloud model which includes detection-quality value for most or all of the PC points, before a following scanning cycle is finished.

The detection-quality value assigned to each out of one or more points of the PC may be indicative of a likelihood that the point cloud model corresponds to a real-world object located at the respective location identified by the PC point, and is not an erroneous detection. The detection-quality value may be particularly useful when the detected signals did not result from reflection of an object in the respective location inside the FOV (e.g., resulted from emission from the object received by the detector). The detection-quality value is also referred to as "confidence level," "detection likelihood," "detection probability," and "assurance level."

In different examples, the confidence level may be provided in many different types of data. e.g., high/low; high/medium/low, percent, integer, fraction, and so on. In embodiments where a few discreet levels of confidence are used, different thresholds may be defined between the high and low conference of detection.

The processor (e.g., processor 118) may determine the detection-quality value based on various parameters, either deriving from the detection signal from the respective direction associated with the respective PC point, from a detection signal of another direction in the FOV, from system operational parameters (also referred to as "system configuration," such as illumination settings/parameters, detectors settings/parameters, etc.), and so on. For example, the processor may be collectively configured to estimate a noise level parameter associated with the direction associated with the detection-quality value and to determine the detection-quality value therefrom. The noise level parameters may be, for example, a signal-to-noise ratio (SNR), an ambient light signal level (e.g., photons/picosecond), system noise level (e.g., amplification noise), and so on.

The determination of the noise level and/or using the noise level parameter for the determination of the detection-quality value may be performed in response to the location of the respective point cloud data point (in the environment and/or in the FOV and/or in the point cloud). For example, if a high-energy signal is detected from a far location, the likelihood of the signal being noise may be relatively low (e.g., assuming that noise sources are relatively uniformly located in different distances), and thus the signal is more likely a reflection signal from a highly reflective object.

System configuration may include a number of repetitions, a number of pulses in a train, laser power, etc. For example, if a given illumination energy toward a direction (e.g., a pixel) is projected in a single burst, in several pulses or as a continuous wave, the noise behavior (and therefore the likelihood of false detection for that pixel) may change. For example, the detection-quality value may be determined based on one or more statistical analyses of reflections of different pulses to the same pixel.

Optionally, the processor may process the PC in view of the one or more detection-quality values determined for different points in the point cloud. For example, the at least one processor may use the determined detection-quality values for detection of objects in the scene, for classification of objects in the scene, for scene understanding, for estimating a state of the LIDAR system, for estimating an environmental condition for the LIDAR system, and so on. It should be noted that while the present disclosure refers mainly to point-cloud as the output 3D model of the LIDAR, other types of 3D models, such as depth maps and polygon meshes, may also be used.

It is noted that confidence value may be provided by the LIDAR system to any other system for additional processing. For example, confidence values may be provided together with PC, optionally as part of the PC and/or associated with different PC points. In certain aspects, processed confidence values may also be provided together with object detection/classification information. The inclusion of confidence values may facilitate provisioning of more complex object information than extant systems (e.g., indicating that an object is detected at a given location, 99.8% likely a vehicle, 99.2% likely a car, 80% a car facing at direction 314°±3°).

Detecting Angles of Objects

In addition to determining distances based on light reflected from objects in the scene, LIDAR systems disclosed herein may further determine one or more surface angles of objects based on reflected light. In particular, various types of temporal distortions (e.g., "stretching") of reflected light pulses may be processed to obtain one or more surface angles. The determined angles may be used for navigation (e.g., adjustments based on a detected angle of a road), for object identification or classification (e.g., using a "surface angle fingerprint"), and for various other types of decision making by the LIDAR system or its host (e.g., understanding of its surrounding, planning wave propagation in the space around it, etc.).

Embodiments of the present disclosure may further provide angle information regarding one or more detected objects. For example, one or more surface angles of the identified object may be calculated. In addition to or in lieu of deriving surface angle from differences in distances to different pixels, embodiments of the present disclosure may also allow for determining a surface angle based on reflections signals of a single pixel. The latter determination may be performed, for example, based on a duration (or "temporal stretch") of a return pulse, indicating one surface angle at the point of reflection. If the system constructs a point cloud map, a second surface angle at the point of reflection may be determined based on the map, or in other ways such as (but not limited to) the ones discussed below. Additionally or alternatively, the latter determination may be performed based on differences in return time to different quadrants of one or more sensors. The different quadrants may be smaller than a SiPM (e.g., the quadrants do not belong to different pixels) but having locations sufficiently distinct to enable calculation of two surface angles at the point of reflection.

Figure 10:
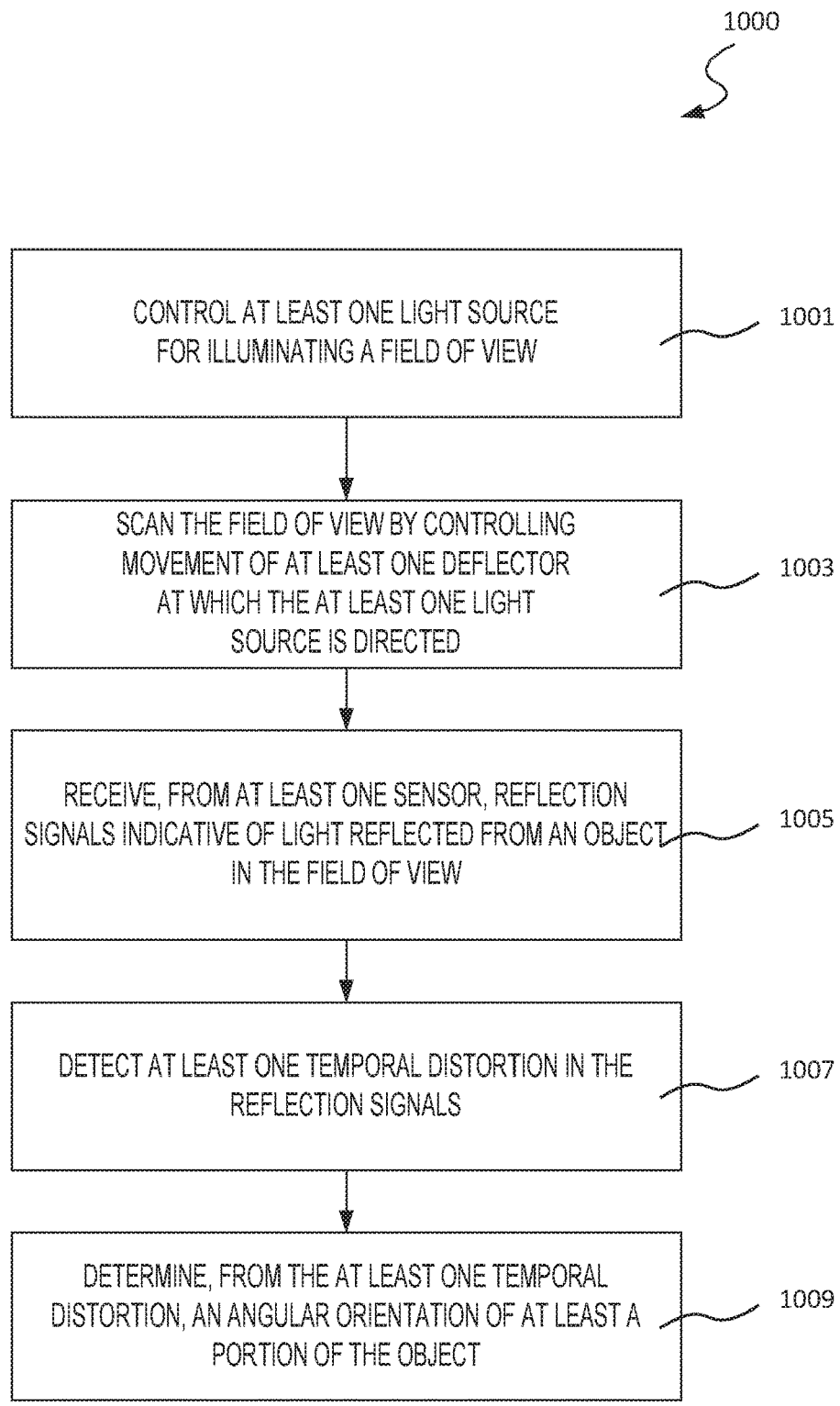
FIG. 10 depicts an exemplary method for detecting an angular orientation of an object consistent with some embodiments of the present disclosure.

FIG. 10 depicts an example method 1000 for detecting an angular orientation of an object. Method 1000 may be executed by at least one processor, such as a processor of a LIDAR system (e.g., at least one processor 118 of processing unit 108 in the example of FIG. 1A, two processors 118 of processing unit 108 of FIG. 2A, any one or more of processing units 108 of FIGS. 5A-5C, or the like). It is noted that method 1000 may be implemented by any type of LIDAR system, and not necessarily by LIDAR system 100. For example, method 1000 may be executed by a scanning or a non-scanning LIDAR system, by a pulsed or continuous-wave LIDAR system, or the like.

At step 1001, the at least one processor controls at least one light source for illuminating a field of view. For example, the at least one processor may activate the light source for deflection by a deflector of the light across the field of view.

In another example, the at least one processor may control the at least one light source in a manner enabling light flux of light projected from the at least one light source to vary during scanning of the field of view. In certain aspects, the at least one processor may vary the timing of pulses from the at least one light source. Alternatively or concurrently, the at least one processor may vary the length of pulses from the at least one light source. By way of further example, the at least one processor may alternatively or concurrently vary a size (e.g., length or width or otherwise alter a cross-sectional area) of pulses from the at least one light source. In a yet further example, the at least one processor may alternatively or concurrently vary the amplitude and/or frequency of pulses from the at least one light source. In certain aspects, the at least one processor may vary the light flux during a single scan and/or across a plurality of scans. Additionally or alternatively, the at least one processor may vary the light flux across a plurality of regions in the field of view (e.g., during a scan and/or across a plurality of scans).

In other embodiments, method 1000 may be performed without varying the light flux of the at least one light source. For example, method 1000 may be performed with a LIDAR system that is fixed-power rather than variable-power.

At step 1003, the at least one processor scans a field of view by controlling movement of at least one deflector at which the at least one light source is directed. For example, the at least one processor may control movement of light deflector 114 of FIG. 1A, light deflectors 114A and 114B of FIG. 2A, light deflectors 216 of FIG. 2B, light deflector 216 of FIG. 2C, or the like. In some embodiments, step 1003 may be omitted from method 1000. For example, method 1000 may be performed with a LIDAR system that is stationary rather than scanning.

In some embodiments, method 1000 may further include controlling the at least one light deflector such that during a scanning cycle of the field of view, the at least one light deflector instantaneously assumes a plurality of instantaneous positions. In one example, the at least one processor may coordinate the at least one light deflector and the at least one light source such that when the at least one light deflector assumes a particular instantaneous position, a portion of a light beam is deflected by the at least one light deflector from the at least one light source towards an object in the field of view, and reflections of the portion of the light beam from the object are deflected by the at least one light deflector toward at least one sensor. In another example, the at least one light source may comprise a plurality of lights sources aimed at the at least one light deflector, and the at least one processor may control the at least one light deflector such that when the at least one light deflector assumes a particular instantaneous position, light from the plurality of light sources is projected towards a plurality of independent regions in the field of view.

Optionally, the at least one processor may further control the at least one light source in a manner enabling modulating the projected light and distinguishing between light reflected from objects in the field of view and light emitted by objects in the field of view. For example, the at least one processor may pulse the at least one light source such that the gap between pulses is sufficiently long to receive light emitted by objects in the field of view rather than light reflected from objects in the field of view.

It is noted that steps 1001 and 1003 are optional, and may alternatively be executed by another system than the system which utilizes the detection results for determining of angular orientations. For example, steps 1001 and/or 1003 may be executed by a LIDAR sensing system (e.g., located at the front of a vehicle) that may process the sensor detection to provide a 3D model of the surrounding, and steps 1005, 1007, and 1009 may be executed by a LIDAR system that may process these inputs to determine angular orientations for surfaces of objects in the FOV, such as a host system of the vehicle. It is noted that the system which executes steps 1005, 1007, and 1009 may also utilize other sensor inputs (e.g., camera, radar, etc.) to analyze the environment of the vehicle in addition to the LIDAR detection results. In embodiments where steps 1001 and 1003 are executed by another system, method 1000 may alternatively begin with receiving detection results from a LIDAR sensing system including temporal distortion information associated with different locations in the environment of the LIDAR sensing system.

At step 1005, the at least one processor receives from at least one sensor, reflections signals indicative of light reflected from an object in the field of view. For example, the at least one processor may receive the signals from sensor 116 of FIG. 1A or FIG. 2A, sensors 116 of FIG. 2B, sensor 116 of FIG. 2C, or the like. In some embodiments, the signals may comprise raw signal data from the at least one sensor.

In other embodiments, one or more processors (e.g., the at least one processor and/or one or more other processors) may first perform one or more operations on the raw signal data. For example, as discussed above, the one or more operations may include correction and/or normalization based on a detected distance for each signal. In another example, the one or more operations may include correction and/or normalization for noise (e.g., based on an expected level of noise and/or based on an expected signal level). In yet another example, the one or more operations may include application of one or more filters such as a low pass filter, a bandpass filter, and/or a high pass filter.

Optionally, the at least one processor may additionally process the reflections signals to determine a single detection location and associate the angular orientation (determined in step 1009) with the single detection location. For example, if the angular orientation is calculated for a portion of the road, the at least one processor may determine a location for the portion of the road and associate the angular orientation therewith. In another example, if the angular orientation is calculated for another vehicle, the at least one processor may determine a location for the other vehicle (or part of the other vehicle) and associate the angular orientation with the determined location. Such an association may allow the at least one processor also to calculate a point cloud map including angular orientations associated with one or more points on the map. Accordingly, method 1100 may further include constructing (or at least enabling construction of) a 3D map of the field of view, the 3D map including data indicative of surface angular orientations of objects in the field of view. The angular orientations determined by the processor may correspond to planar surfaces which are either tangent to a respective surface of the object, an average of a portion of the surface, or another estimation of the surface of the object.

In certain aspects, the at least one processor may use additional data to determine the single detection location. For example, the at least one processor may use data from other pulses, determine a peak of a returning pulse, etc. Additionally or alternatively, the received reflection signals that are associated with the single detection location may be detected by a single pixel in the at least one sensor. For example, the at least one processor may use the reflections signals detected by the single pixel and reflections signals detected by adjacent pixels to determine two angles defining a normal of a surface of the object. In certain aspects, the single pixel may correspond to a plurality of detection elements grouped into a plurality of non-overlapping regions, and the at least one processor may determine the temporal distortion by comparing information obtained from reflection signals associated with the plurality of non-overlapping regions. It is noted that while these non-overlapping regions may be completely non-overlapping (i.e., mutually exclusive), in some implementations some overlap may be permitted.

Optionally, the reflection signals received from the at least one sensor may include at least three measurements indicative of time-of-flight of the light reflected from the object. In such embodiments, the at least one processor may determine, based on differences in reception times of the at least three measurements, two angles defining a normal vector of a surface of the at least the portion of the object. In certain aspects, the two angles may include a tilt angle and a roll angle of the surface of the at least the portion of the object. The determination of surface orientation parameters based on the difference in reception timings of at least three measurements is discussed below in greater detail, e.g., with respect to FIG. 12B.

At step 1007, the at least one processor detects at least one temporal distortion in the reflections signals. As used herein, a "temporal distortion" may refer to a stretching of the return pulse in time (e.g., as compared to an illumination pulse). This temporal distortion may be caused by light returning from more distant parts of the surface later than from nearer parts (the difference in distances being, for example, a result of the surface inclination with respect to an optical axis of the LIDAR system). Additionally or alternatively, "temporal distortion" may refer to a difference in return time to different quadrants of the at least one sensor.

At step 1009, the at least one processor determines from the at least one temporal distortion an angular orientation of at least a portion of the object. In some embodiments, the at least the portion of the object may correspond to a two-dimensional surface. For example, the at least the portion of the object may comprise a bumper of another vehicle, a windshield of another vehicle, a region of a road, a wall of a building, or the like. In some embodiments, the at least one processor may determine angular orientation of the object on a pixel by pixel basis.

Optionally, the at least one detected temporal distortion may be associated with a plurality of reflections from the object. For example, a shape of a first temporal distortion associated with a first angular orientation may differ from a shape of a second temporal distortion associated with a second angular orientation.

In embodiments where the object is an opposing vehicle, the angular orientation may be a slope of a portion of the opposing vehicle. In embodiments where the object is a road, the angular orientation may be a slope of a portion of the road.

Method 1000 may further include additional steps. For example, method 1000 may include causing a change in an operational state of the vehicle based on the detected angular orientation of the portion of the road. For example, if road has inclining angle, the at least one processor may cause the vehicle to accelerate and/or to downshift. In another example, if road has declining angle, the at least one processor may cause the vehicle to decelerate, brake, and/or to downshift.

In another example, method 1000 may further include accessing memory that stores a plurality of distortion patterns, each of the plurality of distortion patterns corresponding to a unique angular orientation, and determining the angular orientation by matching a stored distortion pattern with the at least one detected temporal distortion. For example, the at least one processor may determine a match similar to determining a match as described with respect to step 805 of method 800. Accordingly, method 1000 may include angular orientation determination based on a "distortion fingerprint," similar to object classification based on a "reflectivity fingerprint," as described above. The plurality of distortion patterns may be stored in any form of analog or digital memory storage, or a combination of both. Comparison of reflection signals to distortion patterns stored in the form of matched filter, for example, is discussed below in greater detail with respect to FIG. 14.

In yet another example, method 1000 may further include determining differing angular orientations of a plurality of objects identified in an environment of the vehicle. For example, the at least one processor may determine an angular orientation of at least part of another vehicle and an angular orientation of at least part of a road.

In a similar example, method 1000 may further include determining differing angular orientations associated with differing surfaces of the object and identifying the object based on the determined angular orientations. For example, the at least one processor may identify the object by matching stored angular orientations with the determined angular orientations. In certain aspects, the at least one processor may determine a match similar to determining a match as described with respect to step 805 of method 800. Accordingly, method 1000 may include object identification based on an "angular orientation fingerprint," similar to object classification based on a "reflectivity fingerprint," as described above.

Additionally or alternatively, any of the fingerprints described herein, such as the "angular orientation fingerprint," "reflectivity fingerprint," or the like may be run through one or more neural networks to determine a best match or a list of most likely matches (optionally with a confidence level associated with each match in the list). The neural network(s) may be trained using a training set of LIDAR measurement results and/or may continue to increase in accuracy during operation, e.g., by adjusting to minimize one or more loss functions.

In embodiments where two angles are determined for differing surfaces, the at least one processor may classify the object at least in part based on surface angular orientations of two surfaces of the object. Moreover, in embodiments where the vehicle is at least partially autonomous, the at least one processor may cause a change in an operation of the vehicle based on surface angular orientation of the surface of the object. For example, if the object is a barrier and angles toward the vehicle, the at least one processor may cause the vehicle to steer away from the barrier. In another example, if the object is a road marking and angles away from the vehicle, the at least one processor may cause the vehicle to steer towards the marking. Optionally, the processor may cause a change in an operation of the vehicle based on a change in the surface angular orientations of one or more surfaces in the scene. For example, changes in the surface orientations of a remote car detectable only in very few pixels may indicate that a car is turning and may further indicate its direction in turn. Based on such information, the at least one processor may decide to cause an acceleration, deceleration, and/or turning of the host vehicle.

Optionally, the at least one processor may change an operational parameter of the at least one light source based on the determined angular orientation of the at least a portion of the object. For example, the at least one processor may cause increased light flux to be directed to the at least a portion, e.g., in a next scan cycle. Additionally or alternatively, the at least one processor may change an operational parameter of the at least one sensor based on the determined angular orientation of the at least a portion of the object. For example, the at least one processor may cause the at least one sensor to increase or decrease a detection threshold for a region of the field of view including the at least a portion.

Figure 14:
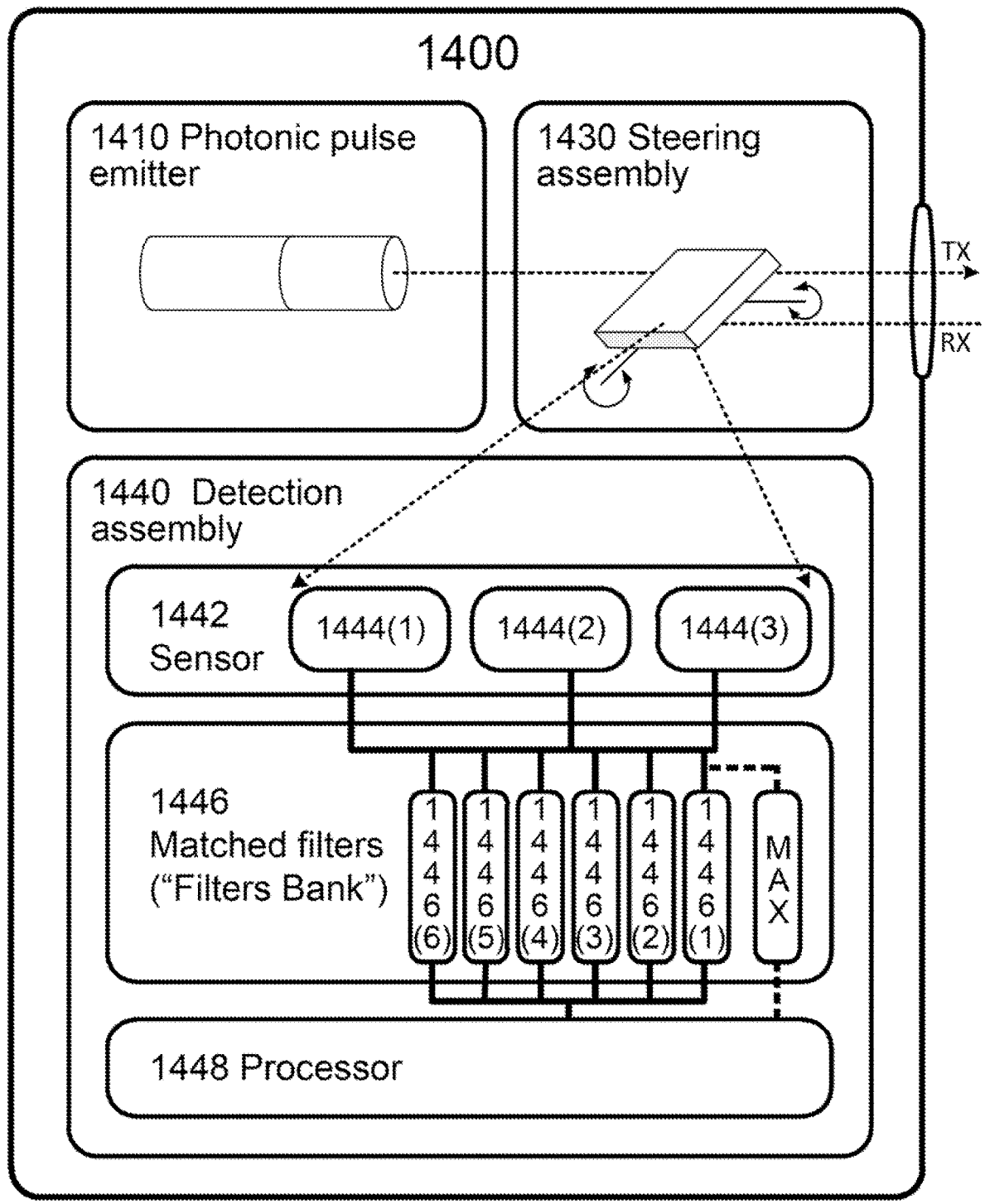
FIG. 14 illustrates an example of a LIDAR system having a plurality of filters consistent with some embodiments of the present disclosure.

In another example, method 1000 may further include using a plurality of matched filters, each matched filter operable to correlate (a) one or more temporal sequences of detected reflection levels and (b) a return-signal hypothesis (also termed a "duration hypothesis") to provide a correlation output. An example of a LIDAR system having a plurality of filters is depicted in FIG. 14. Moreover, an example of correlating reflection levels and return-signal hypotheses is depicted in FIG. 16. Optionally, the at least one processor may detect the at least one temporal distortion in the reflections signals by correlating a temporal sequence of detected reflection levels with a plurality of return-signal hypotheses using the plurality of matched filters and selecting a closest match. Similarly, the at least one processor may detect the at least one temporal distortion in the reflections signals by correlating a temporal sequence of detected reflection levels with a plurality of return-signal hypotheses using one or more neural networks trained to select a closest match (or to output a list of matches optionally including a confidence level for each match).

In embodiments where the object is a road, the at least one processor may process a matching of the temporal sequence of detected reflection levels and a shortest return-signal hypothesis and determine a presence of a road sign marking on a portion of the road. In such embodiments, the portion of the road may be associated with a single pixel, and the at least one processor may determine two different distances for the single pixel. For example, the at least one processor may determine a first distance to the portion of the road and a second distance to the road sign marking on the portion of the road. For example, if a reflectivity of the road marking is higher than that of the road, then the at least one processor may determine the distance to the road marking with higher accuracy that that determined for the portion of the road (e.g., the at least one processor may determine a distance of 50 meters to the portion of the road and determine a distance of 50.2 to the road marking). Further details regarding the detection of lane marking and other road sign marking are provided below.

In embodiments where method 1000 includes enabling construction of a 3D map of the field of view, method 1000 may further include outputting a point cloud (or other 3D model) including different surface angles associated with different points of the model. Accordingly, method 1000 may output the point cloud model in addition to or in lieu of one or more determined angular orientations. In the point cloud, each PC point (out of some or all of the points of the PC) may include information regarding surface angular orientation associated with that specific PC point. Optionally, the surface angular orientation associated with each PC point may be determined by analyzing only the light arriving from the direction of the PC point, without any additional detection information and/or position of neighboring PC points.

It is noted that adjusting the detection of the LIDAR system to account for temporal distortions of the reflected signals (such as stretching of the reflected signal over time) may be used for other determinations in addition to—or instead of—detection of angular orientations. For example, in noisy conditions, correlations between the emitted illumination pulse and the reflected signal may be determined in order to detect parts of the detection signals resulting from actual reflection of the light pulse off an object in the scene rather than from noise, ambient light, etc. However, if the reflected signal is stretched (e.g., slanting of the incidence surface, atmospheric conditions, etc.), a correlation intended to improve detection of actual reflection may—in such cases—hinder detection of the reflected signal. Utilization of a filters bank (e.g., as discussed below with respect to FIG. 14), correlating for a plurality of duration hypotheses, or otherwise accounting for such spreading may improve detection results—especially for remote and/or low-reflectivity targets. In addition to—or in lieu of—processing temporal distortions for determining inclination angles of surfaces, temporal distortions may be processed by the LIDAR system in order to assess atmospheric conditions in the propagation path of light to and from an object in the scene. Such atmospheric conditions (also referred to as "volumetric conditions") may be detected by the LIDAR system based on the signal temporal distortion they cause may include, among others: fog, smoke, hot air, air turbulences, and the like. If an angular orientation of an object in the scene is known in advance (e.g., a wall of a building known based on a preexisting map), the temporal distortions may be divided by the LIDAR system between the different causes—in this example, orientation of surface and volumetric conditions.

Figure 11:
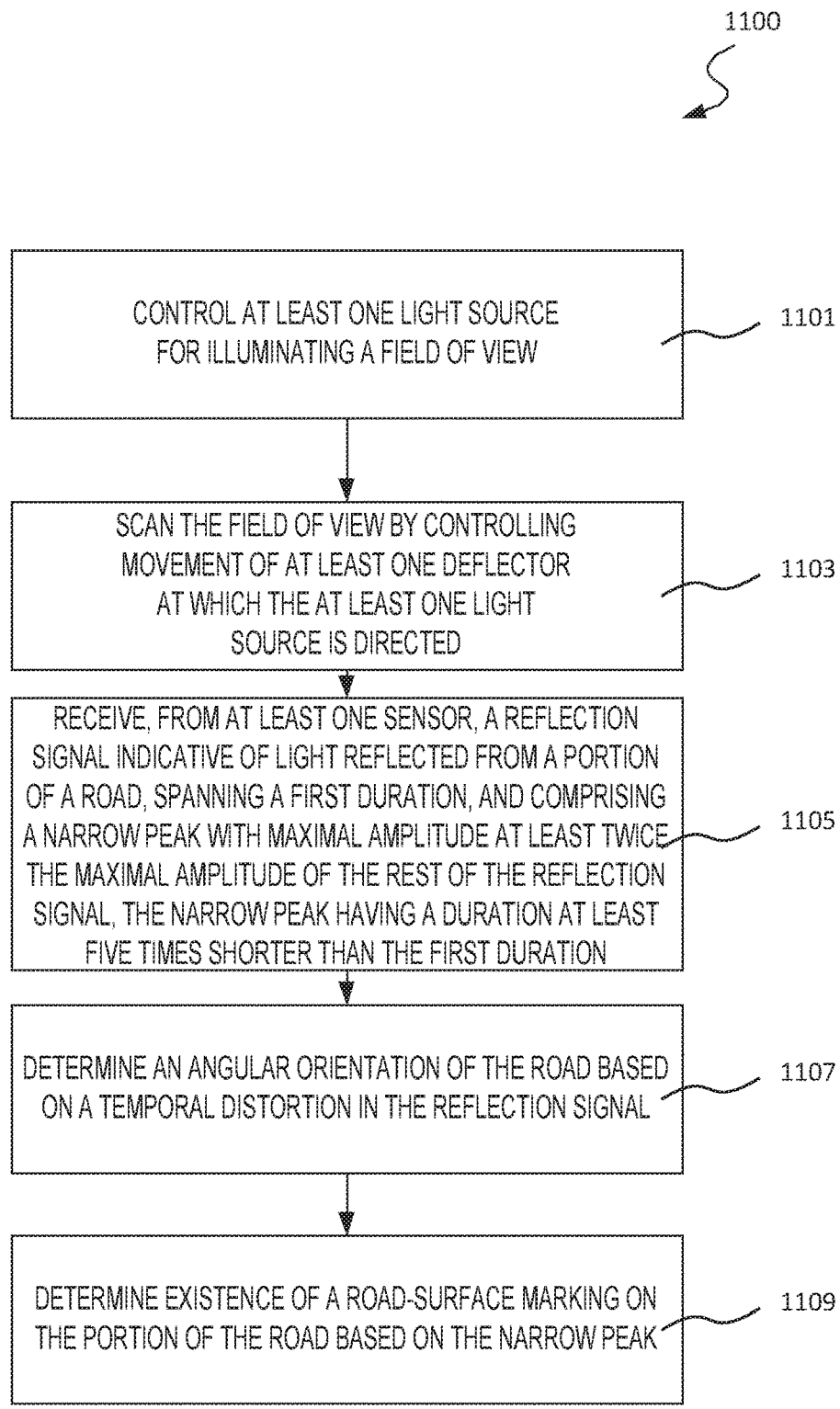
FIG. 11 depicts an exemplary method for detecting road-surface markings on roads consistent with some embodiments of the present disclosure.

FIG. 11 depicts an example method 1100 for detecting road-surface markings on roads. Method 1100 may be executed by at least one processor, such as a processor of a LIDAR system (e.g., at least one processor 118 of processing unit 108 in the example of FIG. 1A, two processors 118 of processing unit 108 of FIG. 2A, any one or more of processing units 108 of FIGS. 5A-5C, or the like). It is noted that method 1100 may be implemented by any type of LIDAR system, and not necessarily by LIDAR system 100. For example, method 1100 may be executed by a scanning or a non-scanning LIDAR system, by a pulsed or continuous-wave LIDAR system, or the like.

At step 1101, the at least one processor controls at least one light source for illuminating a field of view. For example, the at least one processor may activate the light source for deflection by a deflector of the light across the field of view.

In another example, the at least one processor may control the at least one light source in a manner enabling light flux of light projected from the at least one light source to vary during scanning of the field of view. In certain aspects, the at least one processor may vary the timing of pulses from the at least one light source. Alternatively or concurrently, the at least one processor may vary the length of pulses from the at least one light source. By way of further example, the at least one processor may alternatively or concurrently vary a size (e.g., length or width or otherwise alter a cross-sectional area) of pulses from the at least one light source. In a yet further example, the at least one processor may alternatively or concurrently vary the amplitude and/or frequency of pulses from the at least one light source. In certain aspects, the at least one processor may vary the light flux during a single scan and/or across a plurality of scans. Additionally or alternatively, the at least one processor may vary the light flux across a plurality of regions in the field of view (e.g., during a scan and/or across a plurality of scans).

In other embodiments, method 1100 may be performed without varying the light flux of the at least one light source. For example, method 1100 may be performed with a LIDAR system that is fixed-power rather than variable-power.

At step 1103, the at least one processor scans a field of view by controlling movement of at least one deflector at which the at least one light source is directed. For example, the at least one processor may control movement of light deflector 114 of FIG. 1A, light deflectors 114A and 114B of FIG. 2A, light deflectors 216 of FIG. 2B, light deflector 216 of FIG. 2C, or the like. In some embodiments, step 1003 may be omitted from method 1000. For example, method 1000 may be performed with a LIDAR system that is stationary rather than scanning.

In some embodiments, method 1100 may further include controlling the at least one light deflector such that during a scanning cycle of the field of view, the at least one light deflector instantaneously assumes a plurality of instantaneous positions. In one example, the at least one processor may coordinate the at least one light deflector and the at least one light source such that when the at least one light deflector assumes a particular instantaneous position, a portion of a light beam is deflected by the at least one light deflector from the at least one light source towards an object in the field of view, and reflections of the portion of the light beam from the object are deflected by the at least one light deflector toward at least one sensor. In another example, the at least one light source may comprise a plurality of lights sources aimed at the at least one light deflector, and the at least one processor may control the at least one light deflector such that when the at least one light deflector assumes a particular instantaneous position, light from the plurality of light sources is projected towards a plurality of independent regions in the field of view.

In some embodiments, the at least one processor may further control the at least one light source in a manner enabling modulating the projected light and to distinguish between light reflected from objects in the field of view and light emitted by objects in the field of view. For example, the at least one processor may pulse the at least one light source such that the gap between pulses is sufficiently long to receive light emitted by objects in the field of view rather than light reflected from objects in the field of view.

Figure 15:
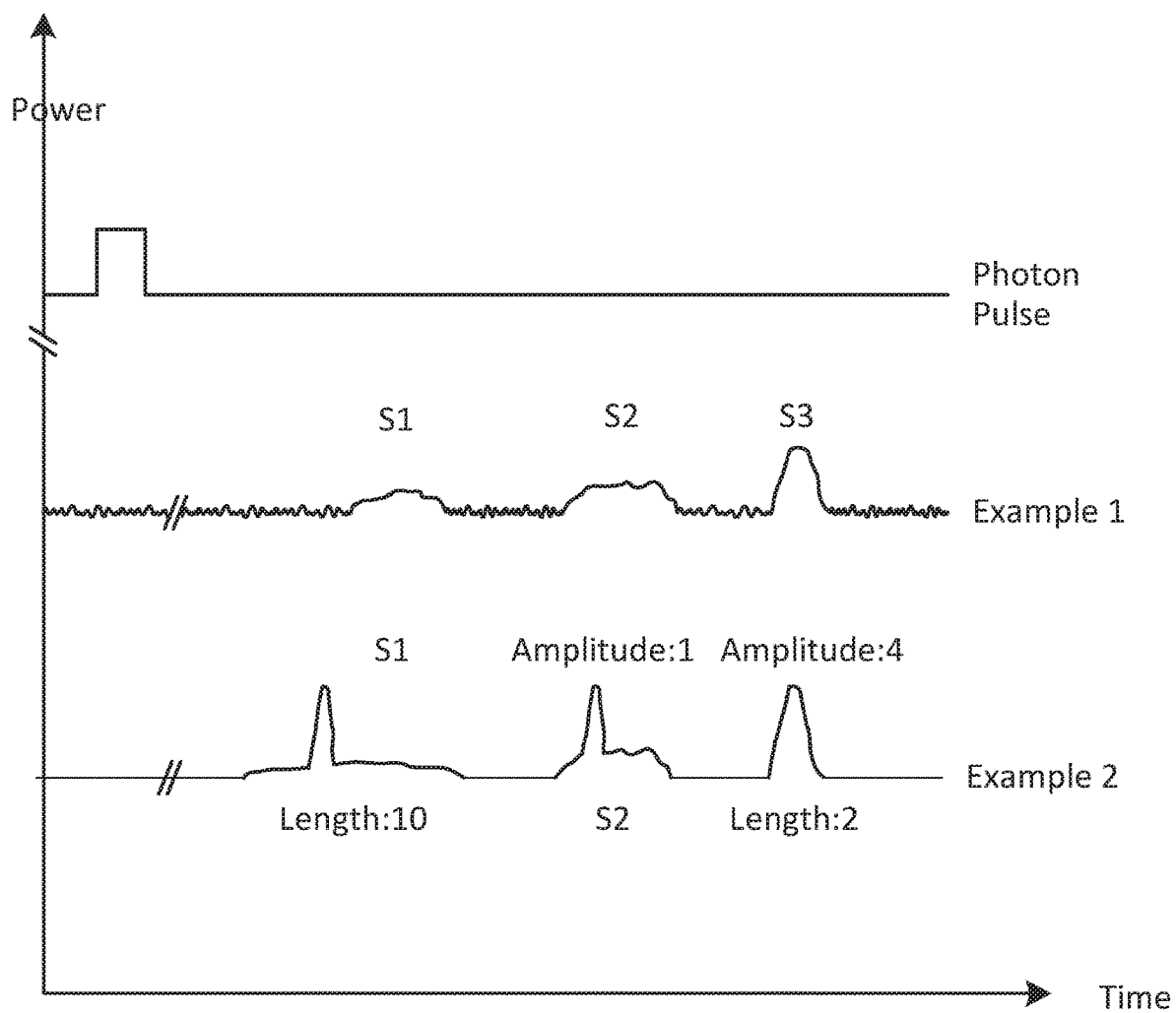
FIG. 15 illustrates an example of a reflection signal spanning a first duration and having a narrow peak consistent with some embodiments of the present disclosure.

At step 1105, the at least one processor receive from at least one sensor a reflection signal indicative of light reflected from a portion of a road, wherein the reflection signal spans a first duration (e.g., above a threshold) and comprising a narrow peak having a maximal amplitude which is at least twice the maximal amplitude of the rest of the reflection signal, wherein the narrow peak spans a second duration which is at least 5 times shorter than the first duration. An example of such a reflection signal is depicted in FIG. 15. The spanning (or stretching) of the reflection signal for a relatively long spans results from the road being viewed at relatively acute angle. The peak has much higher amplitude that the rest of the signal because the road marking which cause the peak reflection is much more reflective than the road. The peak is much shorter in time because it is narrow with respect to the road area covered in the respective pixel.

Figure 12A:
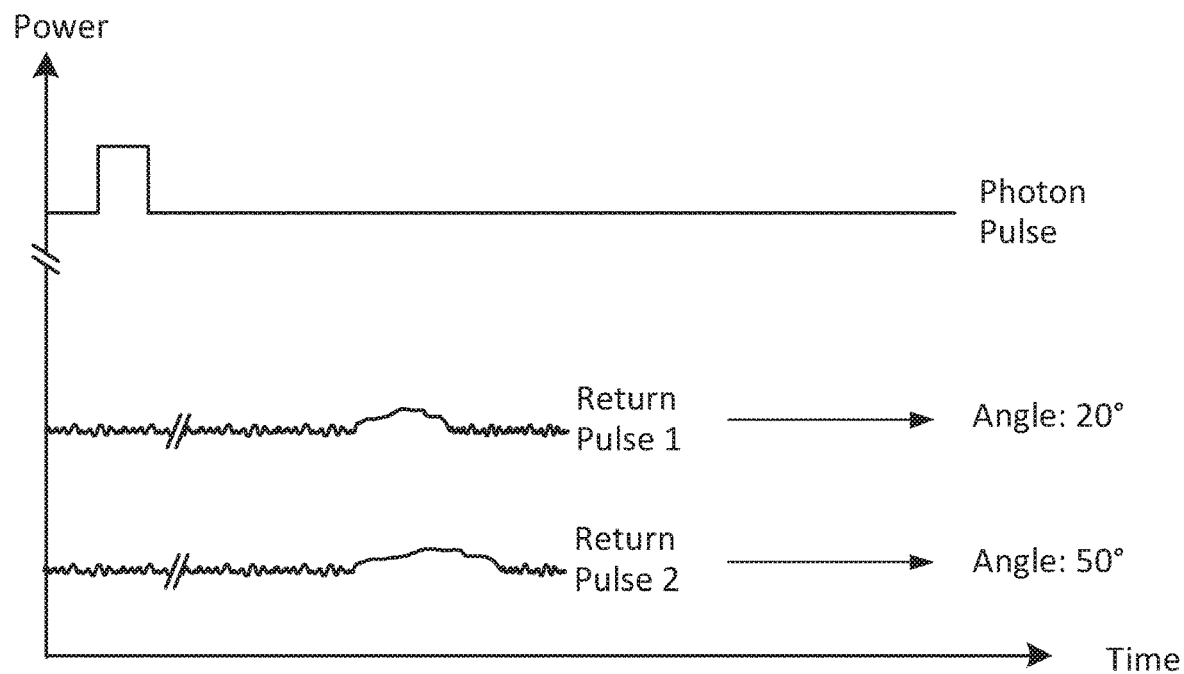
FIG. 12A illustrates an example of determining a surface angle based on stretching of a returning pulse in time consistent with some embodiments of the present disclosure.

At step 1107, the at least one processor determines an angular orientation of the road based on a temporal distortion in the reflection signal. For example, the at least one processor may compare the first duration to the original pulse width and determine the angular orientation based on the comparison. An example of this determination is depicted in FIG. 12A. Referring to the example of FIG. 14, this comparison may be made by matched filters of filters bank 1446 (e.g., filters 1446(1) through 1446(6)).

In some embodiments, step 1107 may further include correlating the temporal reflection data to each reference reflection pattern out of a plurality of reference reflection patterns (also termed "return-signal hypotheses" or "duration hypotheses") of different durations, the plurality of reference reflection patterns including a first reference reflection pattern of a first duration and a second reference reflection pattern of a second duration, longer than the first duration. Accordingly, step 1107 may be performed similarly to the optional correlation of method 1000 (described in paragraph [0240] above). An example of such correlation is depicted in FIG. 16.

At step 1109, the at least one processor determines existence of a road-surface marking on the portion of the road based on the narrow peak. For example, the at least one processor may determine that a lane marking and/or a reflector is located at a position from which the narrow peak originated. Such a determination may be possible because, even though a ground-pixel-size for the road may be rather large, the width of the road-surface marking may be relatively constant and partial to the larger pixel, meaning the reflection for the road-surface marking may not stretch over time as other parts of the pixel may. Accordingly, a difference in reflectivity between the road and the road-surface marking may be relatively large.

In some embodiments, an estimate of the distance for the road may be skewed if the reflective pulse for the road is skewed on account of the high reflectivity of the road-surface marking. In such embodiments, the at least one processor may correct distance estimates for the road using the road-surface marking, e.g., by using a more accurate (i.e., not skewed) distance estimate for the road-surface marking.

Method 1100 may further include additional steps. For example, method 1100 may include determining a first distance to the portion of the road and determining a second distance, different than the first distance, for the road sign marking on the portion of the road.

FIG. 12A illustrates an example of determining a surface angle based on stretching of a returning pulse in time. As illustrated in FIG. 12A, the width of a return pulse (whether absolutely or relative to the respective illumination pulse issued by the LIDAR system) may be used to determine a surface angle of an object from which the returning pulse originated. In the example of FIG. 12A, the top return pulse may result in a surface angle of 20° while the bottom return pulse, which is longer, may result in a surface angle of 50°. One of ordinary skill in the art would understand that FIG. 12A is not to scale and is exemplary and explanatory only rather than depicting a specific relation between pulse width and surface angle.

Figure 12B:
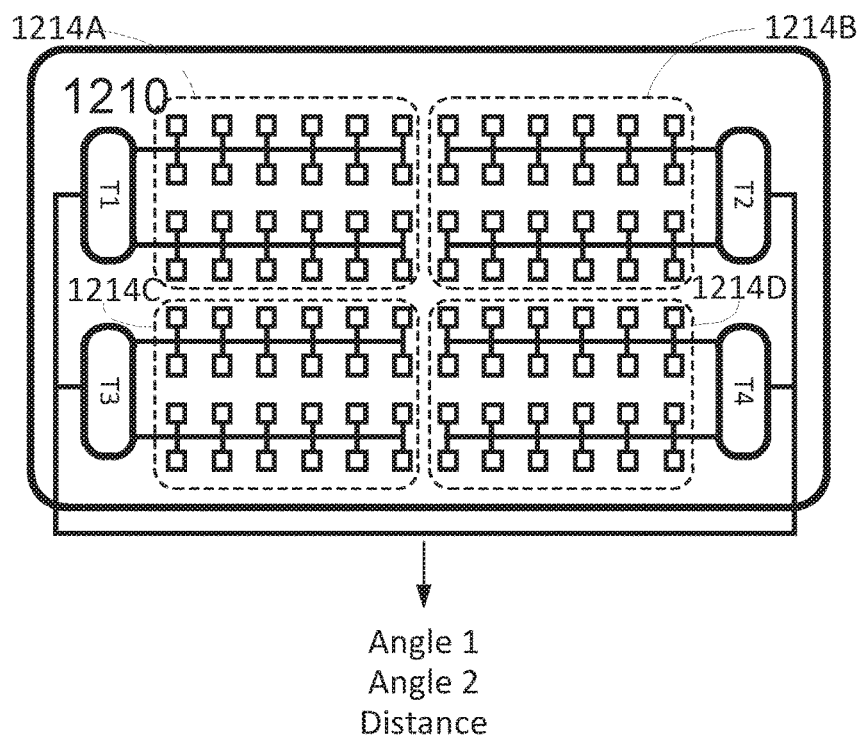
FIG. 12B illustrates an example of determining surface angles based on differences in return time to different quadrants of the sensors consistent with some embodiments of the present disclosure.

FIG. 12B illustrates an example of determining surface angles based on differences in return time to different quadrants of the sensors. In the example of FIG. 12B, pixel 1210 is divided into four quadrants. e.g., quadrants 1214A, 1214B, 1214C, and 1214D. Based on differing return times to different quadrants (e.g., return times T1, T2, T3, and T4), the processor may determine one or more surface angles for a surface of the object which is represented in three or more of the quadrants. The one or more surface angles may be associated by the processor to the point-cloud point including location information determined based on reflection information detected in two or more of these quadrants.

Figure 13A:
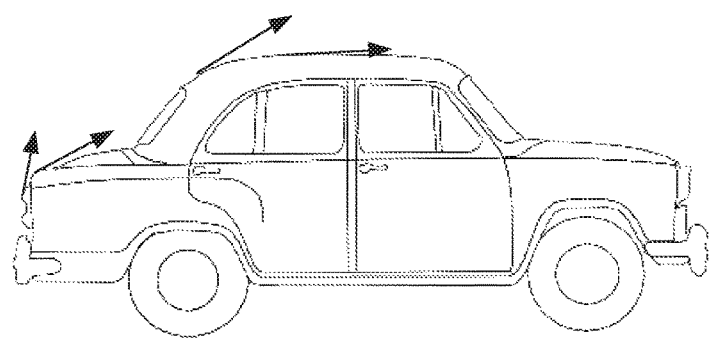
FIG. 13A illustrates an example of angular orientations being slopes of a portion of a vehicle consistent with some embodiments of the present disclosure.
Figure 13B:
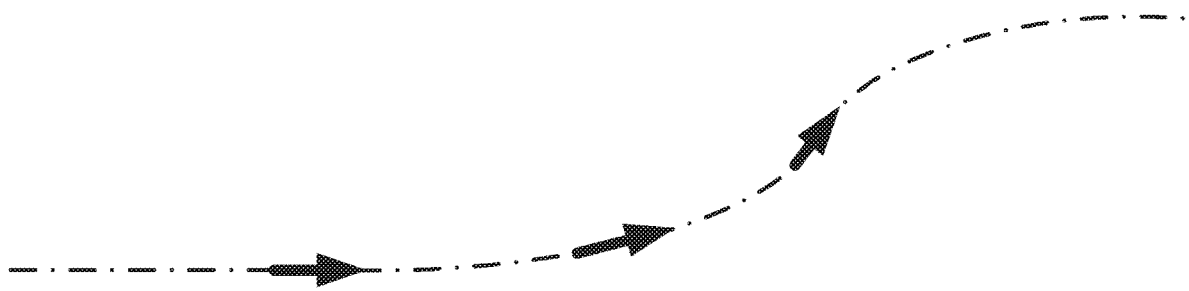
FIG. 13B illustrates an example of angular orientations being slopes of a portion of a road consistent with some embodiments of the present disclosure.

FIG. 13A illustrates an example of angular orientations being slopes of a portion of a vehicle. Similarly, FIG. 13B illustrates an example of angular orientations being slopes of a portion of a road. Referring to the representation of the one or more surface angles determined by the LIDAR system, it is noted that different methods of representation may be used. For example, angular orientation information may be stored as angle information (with respect to the optical axis of the LIDAR system, with respect to an accepted reference coordinate systems such as GPS system, or with respect to other reference axes) indicative of the orientation of the surface, of a tangent to the surface, or a normal to the surface; as a vector information (e.g., conforming with any one of the aforementioned coordinate systems); or the like.

FIG. 14 illustrates an example of a LIDAR system 1400 having a plurality of filters 1446. In the example of FIG. 14, system 1400 includes an emitter 1410 (e.g., similar to emitter 112 of FIG. 2A). System 1400 further includes a deflector 1430 (e.g., similar to deflector 216 of FIG. 2C), and a plurality of sensors 1442 (e.g., similar to sensors 116 of FIG. 2B). In the example of FIG. 14, the output of all the sensors 1442 are processed by the same group of matched filters (e.g. sequentially). In an alternative embodiment (not shown), the outputs of each sensor 1442 (denoted 1444(1), 1444(2), and 1444(3)) may be processed by an independent group of matched filters (denoted 1446(1) through 1446(6)). A combination of those two embodiments may also be used (e.g., each group of matched filters 14460 may process the outputs of a subgroup of pixels). The number of matched filters 14460 used for processing the sensor detection signal of each of sensors 1442 may differ. In FIG. 14, a group of 6 matched filters is illustrated, but other numbers of matched filters may be implemented. Optionally, LIDAR system 1400 may be an embodiment of LIDAR system 100, and any aspect of LIDAR system 100 discussed in the present document may apply, mutatis mutandis, to LIDAR system 1400. Matching filters (such as those of FIG. 14) may also improve detection of the LIDAR system (e.g., providing better SNR, etc.).

Referring to the example of detecting line marking using temporal analysis of the reflected signals and with respect to the example of FIG. 14, an optional "MAX" filter may be added to filter bank 1446. The "MAX" filter may select the matched filter with the highest outcome of the correlation to reference pulses of varying durations. Accordingly, by selecting the max-peak time, the "MAX" filter may detect the location of the lane marking, which may otherwise be undetected on account of the narrowness of the peak. In some embodiments, a confidence score may be added to the output of the "MAX" filter such that a lane marking is only detected when the confidence score exceeds a threshold.

An example of the operation of the filters of FIG. 14 is depicted in FIG. 16, described below. In particular, each filter may correlate the reflected signals with a return-signal hypothesis and then output the correlation.

FIG. 15 illustrates an example of a reflection signal spanning a first duration and having a narrow peak. As depicted in Example 1 of FIG. 15, peak S3 may be taller and narrower than the remainder (e.g., S1 and S2) of the reflection signal. Accordingly, in some embodiments, S3 may be detected as a lane marking. As depicted in Example 2, of FIG. 15, one or more thresholds may be implemented for detecting a lane marking. In Example 2, peak S3 is five times shorter than the first pulse in the reflection signal and is four times as tall as the maximum height of the remainder of the reflection signal. Other thresholds, such as at least four times shorter than the shorter pulse in the remainder of the reflection signal, at least twice as tall as the maximum height of the remainder of the reflection signal, etc.

FIG. 16 illustrates an example of correlating temporal sequences of detected reflection levels and a return-signal hypothesis to provide a correlation output. Although the example of FIG. 16 is depicted as using LIDAR system 1400 of FIG. 14, any other LIDAR system may be used. For example, an embodiment of LIDAR system 100 may be used.

As can be seen in the example of FIG. 16, the signals returning from target 1 and target 3 (denoted "S1" and "S3") respectively are significantly more spread in time than the signal returning from target 2 (denoted "S2"). Therefore, the energy of signals S1 and S3 is spread over longer duration, which reduces their SNR.

As further illustrated in the example of FIG. 16, the detected signal (denoted "DS") includes some noise is correlated with two return-signal hypotheses: hypothesis H1, in which the reflected signal is about the same duration as the original signal (the "photonic inspection pulse"), and hypothesis H2, in which the reflected signal is temporally longer (e.g., "stretched") with respect to the original signal. Moreover, expected power in hypothesis H2 is lower than that of hypothesis H1, at least in part due to the stretching (e.g., because the same energy is spread over a longer time).

The correlation results in the example of FIG. 16 are convolutions of the detected signal with the respective duration hypothesis (denoted C1, C2). However, other mathematical operations (such as summing, subtracting, multiplying, or inputting into one or more functions) may be applied additionally or alternatively. In the example of FIG. 16, the reflection from the object further from the LIDAR (i.e., target 2) results in a peak in convolution C1 (of the detected signal with hypothesis H1) higher than the peak in the same temporal location of the convolution of the detected signal with convolution H2. Meanwhile, in the temporal locations corresponding to photons reflected back from targets 1 and 3, convolution C2 yields higher peaks than the corresponding times of convolution C1. Accordingly, as shown in the example of FIG. 16, correlations of the return signal may be used to identify temporal distortions by amplifying the distortions. Moreover, objects (such as lane markings) may be detected and/or identified based on outputs of the correlations. For example, particular outputs (e.g., above certain thresholds, matching certain fingerprints, etc.) may be associated with an identification or classification that may be applied to the object.

Classifying Objects with Additional Measurements

In addition to (or in lieu of) determining surface angles and reflectivities based on reflected pulses, LIDAR systems disclosed herein may further determine additional measurements, such as object surface composition (e.g., whether metallic, whether including one or more acrylics, etc.) or ambient illumination (e.g., pulses received that are not reflected pulses). In addition, difference between measurements from one frame to another may be used in navigation and object classification. Moreover, any measured value may be assigned a calculated confidence value, as discussed in greater detail below.

As discussed previously, systems of the present disclosure may provide more detailed feedback than extant systems. For example, LIDAR systems of the present disclosure may output reflectivity (discussed above), surface angles (discussed above), confidence levels (discussed below), ambient light level, properties of detected objects (e.g., whether the object is metal), or the like. In addition, LIDAR systems of the present disclosure may allow for determination of changes in any of the outputs as compared with one or more previous frames (e.g., changes in reflectivity, changes in confidence levels, changes in ambient light, or the like). In some embodiments, this additional information may be used directly to detect objects and determine properties of detected objects. Additionally or alternatively, this additional information may be used to construct and/or analyze point cloud maps (an example of which is described above with respect to FIG. 1C).

In some embodiments, objects detected by a LIDAR system may be classified based on confidence levels associated with one or more measurements (e.g., reflectivities, surface angles, surface composition, or the like). By identifying objects using confidence levels, objects may be classified with greater accuracy than extant LIDAR identification techniques. In addition, systems of the present disclosure may control the LIDAR to direct more light flux towards objects with less confident classifications than objects with more confident classifications, ensuring that power is more efficiently distributed.

Embodiments of the present disclosure that incorporate confidence levels may be particularly advantageous for noisy LIDAR systems and/or environments. Nonetheless, some advantages may be inherent on account of inherent noisiness in the physics and statistics of reflections of few-photons LIDARs.

In embodiments where a point-cloud map is generated, the systems and methods may also rank the different points of the model using confidence levels. In one example, the systems and methods may incorporate the confidence levels for the order of processing the model (e.g., creating anchors in the model based on high confidence (e.g., above a threshold) points, apportioning computational resources to points or areas of high confidence (e.g., above a threshold), etc.).

Figure 17:
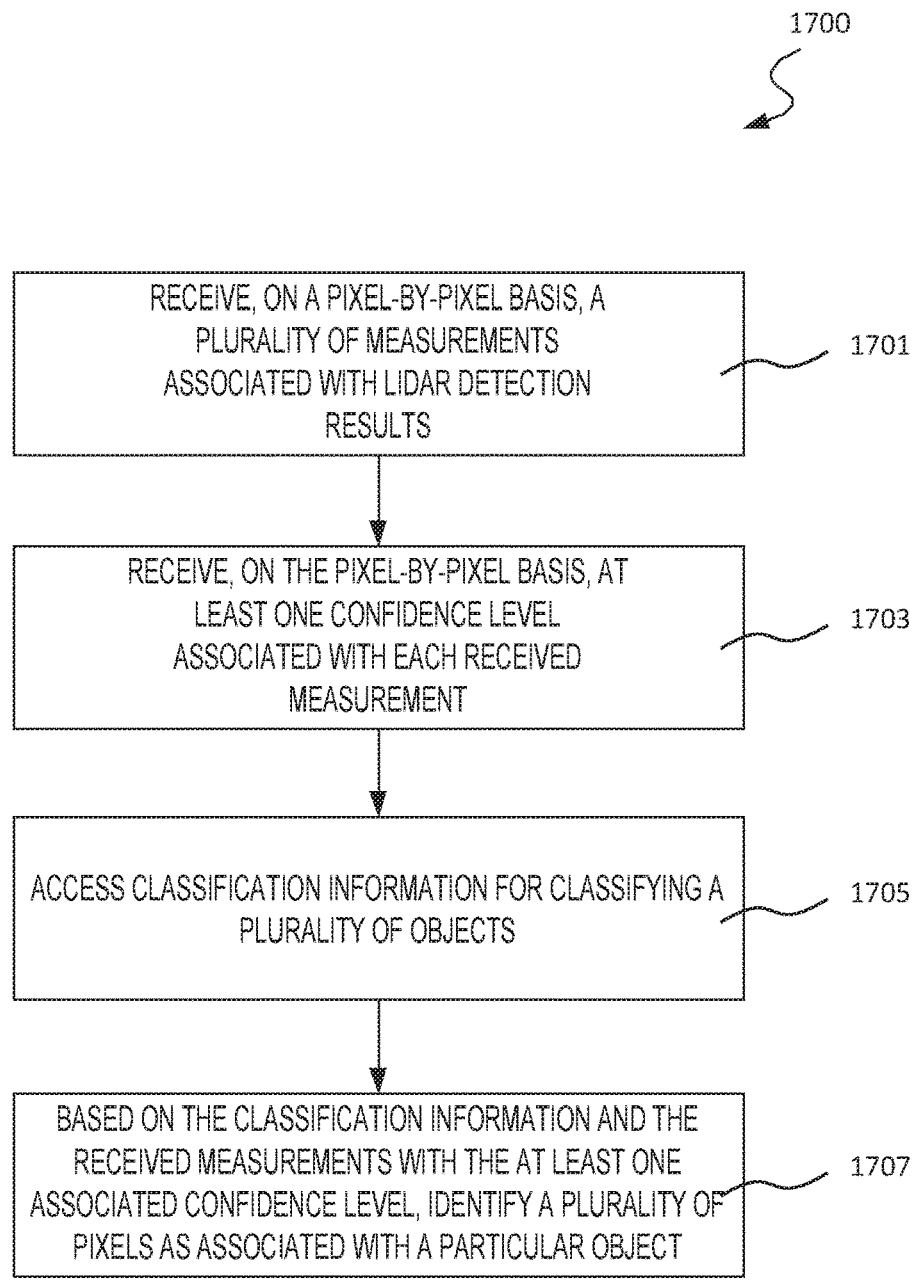
FIG. 17 depicts an exemplary method for classifying objects in surroundings of a vehicle consistent with some embodiments of the present disclosure.

FIG. 17 depicts an example method 1700 for classifying objects in surroundings of a vehicle. Method 1700 may be executed by at least one processor, such as a processor of a LIDAR system (e.g., at least one processor 118 of processing unit 108 in the example of FIG. 1A, two processors 118 of processing unit 108 of FIG. 2A, any one or more of processing units 108 of FIGS. 5A-5C, or the like). It is noted that method 1700 may be implemented by any type of LIDAR system, and not necessarily by LIDAR system 100. For example, method 1700 may be executed by a scanning or a non-scanning LIDAR system, by a pulsed or continuous-wave LIDAR system, or the like.

At step 1701, the at least one processor receives on a pixel-by-pixel basis, a plurality of measurements associated with LIDAR detection results, the measurements including at least one of: a presence indication, a surface angle, object surface physical composition, and a reflectivity level. For example, a "presence indication" may include any indication of the presence of an object (e.g., the presence of non-zero reflection) or distance information to a detected object as measured by the LIDAR. A "surface physical composition" may include one or more indicators of the material composition of an object in the field of view. For example, whether the object is metallic, which metals are included in a metallic alloy, which type (water-based or oil-based) of paint is on an object, or the like may be determined using, e.g., the polarity of the detections. The terms "surface angle" and "reflectivity level" are used consistently with the foregoing description. In addition to—or in lieu of—surface physical composition, physical characteristics of deeper layers of the object may also be determined, e.g. transparency levels, crystal characteristics, etc.

At step 1703, the at least one processor receives on the pixel-by-pixel basis, at least one confidence level associated with each received measurement. The confidence level may include the confidence of detection (e.g., the confidence that an object is present, the confidence of the detected signal itself, or the like), the confidence of a surface angle (e.g., the confidence that the angle is correct, the confidence in the calculated angle in view of the level of reflected data received, or the like), etc.

In some embodiments, the received measurements may include more than one result per pixel and/or have pixels with missing information. Additionally or alternatively, the confidence level of the received measurements may be associated with points of a point-cloud maps rather than pixels. For example, several pixels may be associated with a single point (thus resulting in one confidence level for multiple pixels).

At step 1705, the at least one processor accesses classification information for classifying a plurality of objects. For example, the classification information may be stored on one or more memories. In one example, the classification information may comprise one or more fingerprints based on the one or more measurements and/or confidence levels.

At step 1707, based on the classification information and the received measurements with the at least one associated confidence level, the at least one processor may identify a plurality of pixels as being associated with a particular object. As explained above, the at least one processor may identify the particular object using matching with the accessed classification information (e.g., similar to the matching of step 805 of method 800, described above). Additionally or alternatively, steps 1705 and 1707 may be performed with one or more neural networks such that the at least one processor may use the one or more neural networks to determine the best match (or a list of matches optionally including a confidence level for each match).

As used herein. "classifying" or "identifying" broadly refers to determining an existence of the particular object (e.g., an object may exist in a certain direction with respect to the LIDAR system and/or to another reference location and/or an object may exist in a certain spatial volume). Additionally or alternatively, the "classifying" or "identifying" may refer to determining a distance between the object and another location (e.g., a location of the LIDAR system, a location on earth, or a location of another object). Additionally or alternatively, "classifying" or "identifying" broadly may refer to determining a type of object such as car, plant, tree, road; recognizing a specific object (e.g., the Washington Monument); determining a license plate number; determining a composition of an object (e.g., solid, liquid, transparent, semitransparent); determining a kinematic parameter of an object (e.g., whether it is moving, its velocity, its movement direction, expansion of the object); or the like. Additionally or alternatively, "classifying" or "identifying" may include generating a point cloud map in which every point of one or more points of the point cloud map correspond to a location in the object or a location on a face thereof. In one example, the data resolution associated with the point cloud map representation of the field of view may be associated with 0.1°×0.1° or 0.3°×0.3° of the field of view.

As used herein, a "particular object" may refer to a single object (such as a stop sign), a complex object formed of multiple sub-objects (such as a car, formed of a bumper, license plate, headlights, windshield, etc.), or an identifiable portion of an object (such as a road marking on a road or a license plate on a car, etc.). Although described above with respect to object classification, method 1700 may additionally or alternatively be used in clustering, determining boundaries of an object (e.g., as depicted in the example of FIG. 22), or the like.

Figure 18:
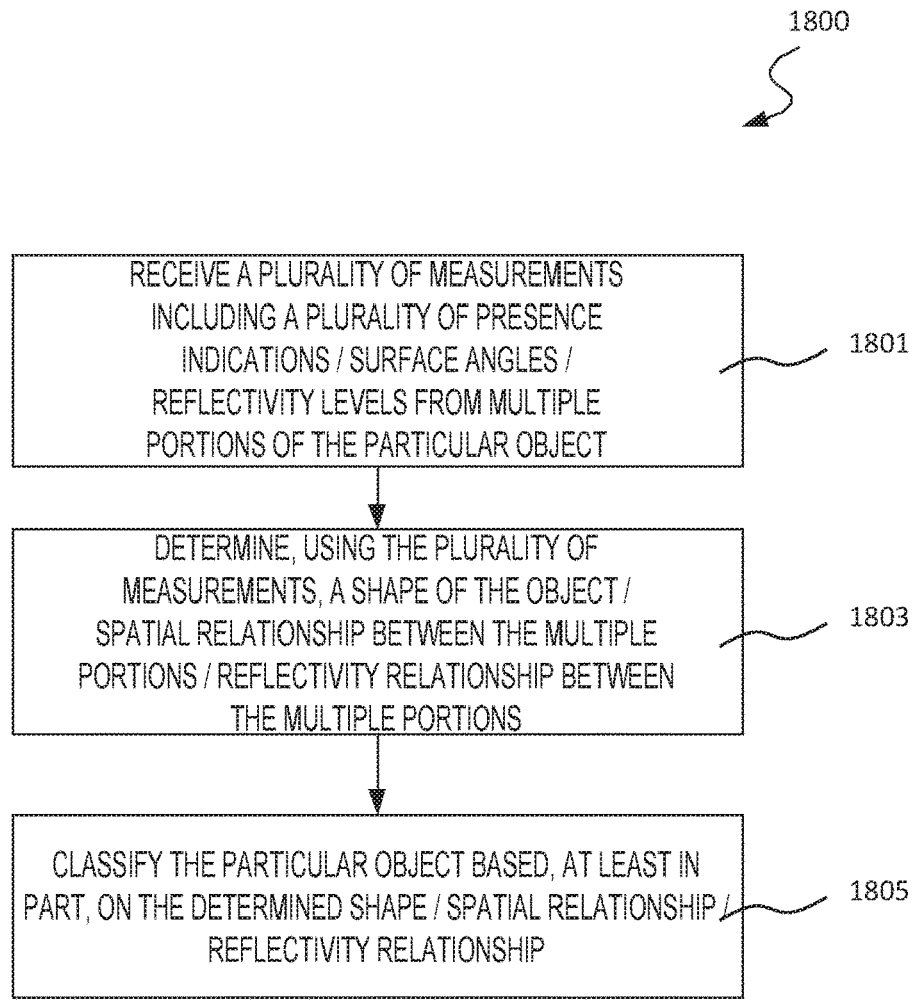
FIG. 18 depicts another exemplary method for classifying objects in surroundings of a vehicle consistent with some embodiments of the present disclosure.

FIG. 18 depicts another example method 1800 for classifying objects in surroundings of a vehicle. Method 1800 may be executed by at least one processor, such as a processor of a LIDAR system (e.g., at least one processor 118 of processing unit 108 in the example of FIG. 1A, two processors 118 of processing unit 108 of FIG. 2A, any one or more of processing units 108 of FIGS. 5A-5C, or the like). In some embodiments, method 1800 may be executed separately from method 1700. It is noted that method 1800 may be implemented by any type of LIDAR system, and not necessarily by LIDAR system 100. For example, method 1800 may be executed by a scanning or a non-scanning LIDAR system, by a pulsed or continuous-wave LIDAR system, or the like.

In other embodiments, method 1800 may be executed in combination with method 1700. For example, one or more of steps 1801 through 1805 may be executed after step 1705 or step 1707 of method 1700.

At step 1801, the at least one processor receives a plurality of measurements including a plurality of presence indications from multiple portions of the particular object. Additionally or alternatively, the at least one processor may receive a plurality of measurements including a plurality of surface angles from multiple portions of the particular object. Additionally or alternatively, the at least one processor may receive a plurality of measurements including a plurality of reflectivity levels from multiple portions of the particular object.

At step 1803, the at least one processor determines, using the plurality of presence indications and at least one confidence level associated with the plurality of presence indications, a shape of the object. For example, the at least one processor may determine the boundary (and hence the shape) of an object based on an outline of presence indications with high (e.g., above a threshold) confidence levels. Additionally or alternatively, the at least one processor may determine, using the plurality of surface angles and at least one confidence level associated with the plurality of surface angles, a spatial relationship between the multiple portions of the particular object. For example, the at least one processor may estimate one or more contours of the object (optionally mapping such contours using a point-cloud map) based on surface angles with high (e.g., above a threshold) confidence levels. Additionally or alternatively, the at least one processor may determine, using the differing reflectivity levels, a reflectivity relationship between the multiple portions of the particular object. For example, the at least one processor may determine a reflectivity fingerprint using method 700, method 800, or a combination thereof.

At step 1805, the at least one processor classifies the particular object based at least in part on the shape of the particular object, classifies the particular object based at least in part on the determined spatial relationship, and/or classifies the particular object based at least in part on the determined reflectivity relationship. For example, step 1805 may be performed similarly to step 1707 of method 1700, described above.

Figure 19:
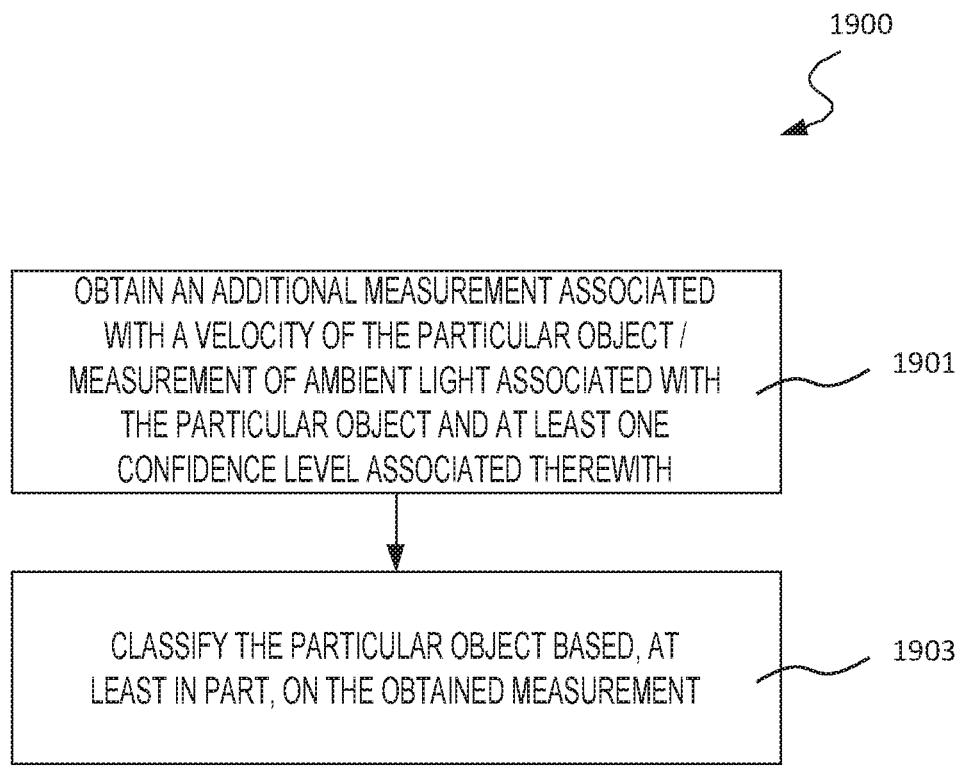
FIG. 19 depicts yet another exemplary method for classifying objects in surroundings of a vehicle consistent with some embodiments of the present disclosure.

FIG. 19 depicts yet another example method 1900 for classifying objects in surroundings of a vehicle. Method 1900 may be executed by at least one processor, such as a processor of a LIDAR system (e.g., at least one processor 118 of processing unit 108 in the example of FIG. 1A, two processors 118 of processing unit 108 of FIG. 2A, any one or more of processing units 108 of FIGS. 5A-5C, or the like). In some embodiments, method 1900 may be executed separately from method 1700 and from method 1800. It is noted that method 1900 may be implemented by any type of LIDAR system, and not necessarily by LIDAR system 100. For example, method 1900 may be executed by a scanning or a non-scanning LIDAR system, by a pulsed or continuous-wave LIDAR system, or the like.

In other embodiments, method 1900 may be executed in combination with method 1700 and/or method 1800. For example, one or more of steps 1901 and 1903 may be executed after step 1705 or step 1707 of method 1700 or after step 1803 or step 1805 of method 1800.

At step 1901, the at least one processor obtains an additional measurement associated with a velocity of the particular object. Additionally or alternatively, the at least one processor may obtain an additional measurement of ambient light and at least one confidence level associated with the ambient light associated with the particular object.

At step 1903, the at least one processor classifies the particular object based at least in part on the obtained measurement associated with a velocity of the particular object and/or classifies the particular object based at least in part on the obtained measurement of ambient light associated with the particular object. For example, step 1903 may be performed similarly to step 1707 of method 1700, described above.

Step 1707 of method 1700, step 1805 of method 1800, and step 1903 of method 1900 may be combined in any appropriate manner. For example, the at least one processor may undertake the classification based on received measurements with the at least one associated confidence level in combination with any derived measurements, such as a shape of the particular object, a spatial relationship of the particular object, a reflectivity relationship of the particular object, a velocity of the particular object, ambient light associated with the particular object, or the like. Accordingly, the at least one processor may use a plurality of cascading classifiers on the received measurements, confidence levels, and/or derived measurements to perform the classification. Additionally or alternatively, the at least one processor may determine matches between the received measurements, confidence levels, and/or derived measurements and one or more known fingerprints (e.g., stored in a classification database).

Any of methods 1700, 1800, or 1900 may further include receiving a plurality of measurements including at least one presence indication, at least one surface angle, and at least one reflectivity level from multiple portions of the particular object and classifying the particular object based on the plurality of measurements. Accordingly, as explained above, a plurality of received measurements may be used in combination with confidence levels (and/or with one or more derived measurements) to perform the classification.

In some embodiments, any of methods 1700, 1800, or 1900 may further include determining a type of the particular object as at least one of: a vehicle, a car, a truck, a bus, a pedestrian, a building obstacle, a cyclist, a motorcycle, a traffic sign, a building, a tunnel, a bridge, a tree, an animal, and a hill.

In any of the embodiments described above, any of methods 1700, 1800, or 1900 may further include causing a change in an operational state of the vehicle based on a relative location and the determined type of the classified particular object. For example, if the object is classified as a rock or other hazard ahead of the vehicle, the at least one processor may cause the vehicle to shift around the hazard. In another example, if the object is classified as another vehicle ahead of the vehicle, the at least one processor may cause the vehicle to decelerate or brake.

Additionally or alternatively, any of methods 1700, 1800, or 1900 may further include causing a change of an operational parameter of a light source associated with the LIDAR based on the determined type of the particular object. For example, the at least one processor may cause increased light flux to be directed to the particular object, e.g., in a next scan cycle, when classified as another vehicle. In another example, the at least one processor may cause decreased light flux to be directed to the particular object, e.g., in a next scan cycle, when classified as a pedestrian. Additionally or alternatively, any of methods 1700, 1800, or 1900 may further include causing a change of an operational parameter of a sensor associated with the LIDAR based on the determined type of the particular object. For example, the at least one processor may cause the sensor to increase a detection threshold for a region of the field of view including the particular object classified as a street lamp. In another example, the at least one processor may cause the sensor to decrease a detection threshold for a region of the field of view including the particular object classified as a road.

Figure 20:
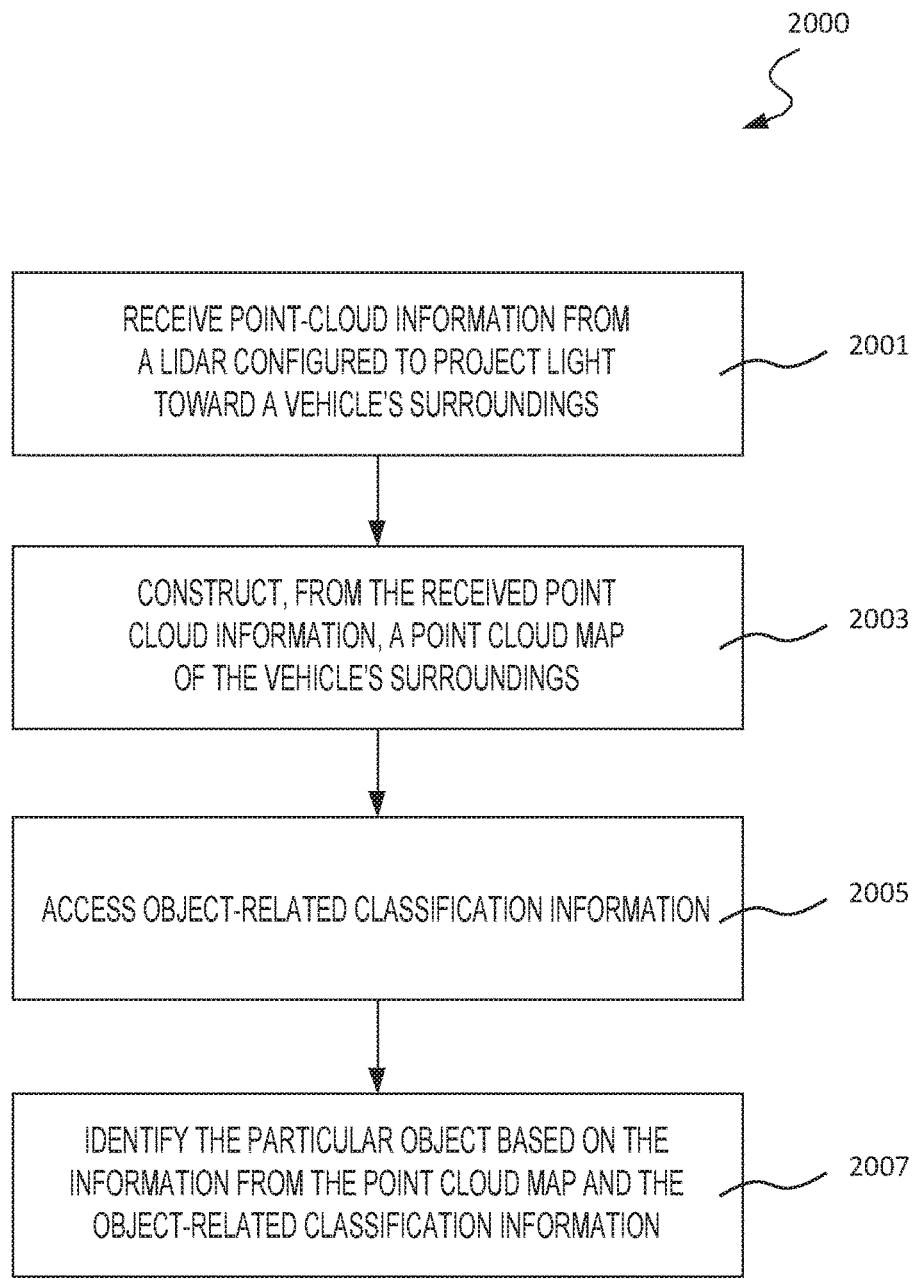
FIG. 20 depicts an exemplary method for identifying objects in surroundings of a vehicle consistent with some embodiments of the present disclosure.

FIG. 20 depicts an example method 2000 for classifying objects in surroundings of a vehicle. Method 2000 may be executed by at least one processor, such as a processor of a LIDAR system (e.g., at least one processor 118 of processing unit 108 in the example of FIG. 1A, two processors 118 of processing unit 108 of FIG. 2A, any one or more of processing units 108 of FIGS. 5A-5C, or the like). It is noted that method 2000 may be implemented by any type of LIDAR system, and not necessarily by LIDAR system 100. For example, method 2000 may be executed by a scanning or a non-scanning LIDAR system, by a pulsed or continuous-wave LIDAR system, or the like.

At step 2001, the at least one processor receives point-cloud information originating from a LIDAR system configured to project light toward the vehicle's surroundings. The point-cloud information may be associated with a plurality of data points, and each data point may include indications of a three-dimensional location and angular information with respect to a reference plane.

As discussed above, the point-cloud information may include a point-cloud map (or a subset thereof) although the information may be received by the at least one processor before or after being used to construct a point-cloud map. For any point-cloud map described herein, each point may be associated with location information of different data points, which may be given in different forms, e.g. (X,Y,Z); (R,θ,ϕ); (R, pixel identification); etc.

In some embodiments, the received point cloud information may further include a confidence level for each of the measurements.

At step 2003, the at least one processor constructs, from the received point cloud information, a point cloud map of the vehicle's surroundings, wherein the point cloud map is indicative of a shape of a particular object in the vehicle's surroundings and of angular orientations of at least two surfaces of the particular object. In some embodiments, the point cloud map may be further indicative of a reflectivity level of different portions of the particular object. Additionally or alternatively, each pixel data point in the point cloud map may include angular information with respect to a reference plane. In one example, the reference plane may include a road surface or the plane of the field of view. In some embodiments, each data point in the point cloud map may include measurements of at least two of a presence indication, a surface angle, a reflectivity level, velocity, and ambient light.

At step 2005, the at least one processor accesses object-related classification information. For example, the classification information may be stored on one or more memories.

At step 2007, the at least one processor identifies the particular object based on the information from the point cloud map and the object-related classification information. For example, step 2105 may be performed similar to step 1707 of method 1700, step 1805 of method 1800, step 1903 of method 1900, or any combination thereof.

In some embodiments, step 2007 may include classifying a plurality of pixels as being associated with the particular object. Additionally of alternatively, identifying the particular object may include determining a type of the particular object.

Method 2000 may further include additional steps. For example, method 2000 may further include determining a match by identifying a most likely three-dimensional representation in the classification information that corresponds to the information in the point cloud map. In one example, determining a match may be performed by one or more classifiers (either individual or cascading). Additionally or alternatively, determining a match may be performed similar to determining a match as described with respect to step 805 of method 800. Accordingly, method 2000 may include object identification based on a fingerprint of composite measurements included in a point cloud map similar to object classification based on an "angular orientation fingerprint" and/or a "reflectivity fingerprint." as described above.

In another example, method 2000 may further include determining that the identified particular object is an object of interest and forwarding the LIDAR an indication of a region of interest that includes the identified particular object. An object of interest may include an object that affects navigation of the vehicle, such as a road marking, another vehicle, a road sign, a road hazard, or the like. Objects not of interest may include lamp posts, storefront signs, or the like. The region of interest may be forwarded to the LIDAR so that, for example, the LIDAR may cause a change of an operational parameter of a light source associated with the LIDAR for the region of interest based on the identification of the particular object, cause a change of an operational parameter of a sensor associated with the LIDAR for the region of interest based on the identification of the particular object, or any combination thereof.

Additionally or alternatively, when a certainty level (e.g., associated with the identification) is under a threshold, method 2000 may include request additional information from the LIDAR. For example, the at least one processor may request previously recorded information of the last frame to improve the identification, request a change in an operational parameter (e.g., associated with a light source, associated with a sensor) in the next frame, or a combination thereof.

Accordingly, method 2000 depicts an example of using a "point cloud fingerprint" that combines distance information with one or more parameters to identify and classify objects. A "point cloud fingerprint" may refer to a subset of points in a point cloud map along with any associated parameters (such as reflectivity, surface angle(s), etc.). The "point cloud fingerprint" of method 2000 may be matched similar to other fingerprints disclosed herein (such as a "reflectivity fingerprint" or a "surface angle fingerprint").

Figure 21:
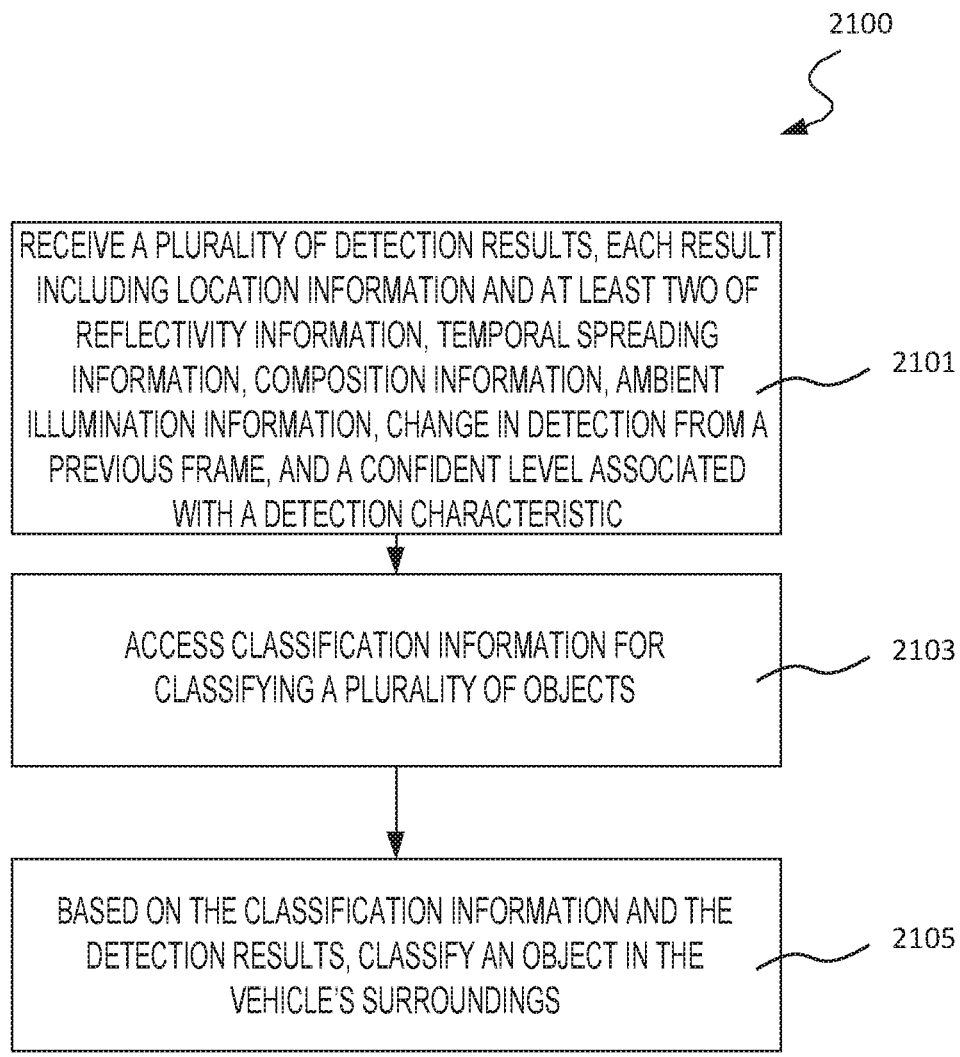
FIG. 21 depicts a fourth exemplary method for classifying objects in surroundings of a vehicle consistent with some embodiments of the present disclosure.

FIG. 21 depicts an example method 2100 for classifying objects in surroundings of a vehicle. Method 2100 may be executed by at least one processor, such as a processor of a LIDAR system (e.g., at least one processor 118 of processing unit 108 in the example of FIG. 1A, two processors 118 of processing unit 108 of FIG. 2A, any one or more of processing units 108 of FIGS. 5A-5C, or the like). It is noted that method 2100 may be implemented by any type of LIDAR system, and not necessarily by LIDAR system 100. For example, method 2100 may be executed by a scanning or a non-scanning LIDAR system, by a pulsed or continuous-wave LIDAR system, or the like.

At step 2101, the at least one processor receives a plurality of detection results associated with LIDAR detection results, each detection result including location information, and further information indicative of at least two of the following detection characteristics: object surface reflectivity; object surface orientation; temporal distortion of a signal reflected from the object (e.g., spreading of the signal); object surface physical composition; ambient illumination measured at a LIDAR dead time; difference in detection information from a previous frame; and confidence level associated with another detection characteristic provided for the detection results (e.g., confidence level associated with object surface physical composition).

In some embodiments, the detection results may include additional information. For example, each detection result may include location information, and further information indicative of at least three of the following detection characteristics: object surface reflectivity; object surface orientation; temporal distortion of a signal reflected from the object (e.g., spreading of the signal); object surface physical composition; ambient illumination measured at a LIDAR dead time; difference in detection information from a previous frame; and one or more confidence levels, each associated with another detection characteristic provided for the detection results (e.g., confidence level associated with object surface physical composition, confidence level associated with the presence of the point cloud, confidence level associated with the angular surface orientation).

At step 2103, the at least one processor accesses classification information for classifying a plurality of objects. For example, the classification information may be stored on one or more memories. In one example, the classification information may comprise a database of known fingerprints (such as reflectivity fingerprints, surface angle fingerprints, point cloud fingerprints, or the like).

At step 2105, based on the classification information and detections results, the at least one processor classifies an object in the vehicle's surroundings. For example, step 2105 may be performed similar to step 1707 of method 1700, step 1805 of method 1800, step 1903 of method 1900, or any combination thereof. In one example, the at least one processor may classify a first object as a car based on the classification information and on a plurality of first detections results; classify a second object as a road based on the classification information and on a plurality of second detections results; and classify a third object as a person based on the classification information and on a plurality of third detections results.

FIG. 22 depicts an example of identification performed using confidence levels. For example, the identification depicted in FIG. 22 may be determined by executing method 1700, method 1800, method 1900, method 2000, method 2100, or any combination thereof. In the example of FIG. 22, two portions of high confidence are located on either side of a portion with low confidence. The processor may identify the object accordingly (e.g., as a vehicle). The processor may further use related confidence scores to determine the boundaries of the identified object.

Accordingly, the example of FIG. 22 depicts how confidence levels may be used for clustering of detection points into objects and for classification and/or other decision regarding such complex objects. In the example of FIG. 22, the processor may connect the two high-confidence separated points even though there is a low confidence point between them. Other objects may be clustered and connected similar to the example of FIG. 22.

Although the above examples are described with respect to the use of confidence levels, the same embodiments may be employed with respect to other data from the LIDAR system. For example, noise levels, ambient light levels, confidence levels, determined velocity (or other changes in positions and/or size of detected objects), changes in signals or other variables (such as those listed above) across frames, or any combination thereof may be used as fingerprints. In such embodiments, as discussed above, this other data may also be incorporated into a point cloud map with distance information from the LIDAR system.

In another example, systems of the present disclosure may perform object identification and/or classification using at least two measurements, at least three measurements, or at least four measurements of: a presence indication, a surface angle, object surface physical composition, and a reflectivity level. Any of the above combinations may additionally incorporate changes in any of the measurements as compared with one or more previous frames (e.g., changes in reflectivity, changes in confidence levels, changes in ambient light, or the like).

Embodiments described above (e.g., embodiments utilizing one or more measurements, confidence levels, derived measurements, etc.) may be applied to (and improve) other computer vision processes. For example, detection/clustering (e.g., object level from point cloud points) determining bounding boxes of objects, classification of objects/object type, tracking of objects (e.g., between frames), determining object characteristics (e.g., size, direction, velocity, reflectivity, etc.), and the like may all have increased accuracy (and/or efficiency, depending on the implementation) by incorporated additional data such as other measurements and/or confidence levels, as described above.

In some embodiments, confidence levels (also referred to as "detection-quality values") associated with different detections may be used as part of the considerations of whether or not to include such detections in the point cloud (or other three-dimensional model). The confidence values may be used together with other parameters pertaining to the same detection and/or other parameters pertaining to other detections. For example, the processor may be configured to selectively generate point-cloud point based on information of reflected light information of a detection only if the detection information of the detection complies with decision criteria based on a confidence level associated with the point and optionally with at least one additional condition. The at least one additional condition may relate to any of the other one or more types of information determined for the point (e.g., reflectivity, surface angle, ambient light level, noise level, material properties, etc.). The at least one option may also relate to spatial relationships to other detection locations. For example, the at least one processor may decide that, even though points are generally added to the point cloud model having confidence values above 50%, a higher confidence value (e.g., 75% or more) may be required for detections isolated from other detections (e.g., detections whose distance to the other nearest detection is at least a predetermined distance R, such as 2 meters). In another example, detections with relatively low confidence value may nevertheless be included in the point cloud if other parameters of the detection meet some decision criteria. For example, a detection with a relatively low confidence value but having similar characteristics to neighboring detections (e.g., also metallic and having a similar surface angle) may be included in the point cloud despite its relatively low confidence value.

Referring to the previous examples, in any of the previous examples, the processing of the point cloud may optionally further include using the one or more confidence values associated with a point cloud point (or a pixel) to determine whether to use a specific point cloud point or not and/or how to use the point. Moreover, the processing of the sensor data to generate the point cloud may include determining whether or not to even include such point-cloud points from the beginning, e.g., based on the at least one confidence value and optionally on additional information (such as the spatial relationships with other points). The generation of the point cloud may be executed by the same processor (or subprocessing module) utilizing the point cloud for the detection of objects, but different processors (or processing modules) may additionally or alternatively be used for those different tasks. Any combination of one or more of the aforementioned parameters may be used in the decision of whether or not to include a detection in the point cloud, even without basing the decision on a confidence value associated with the detection (if any). For example, the at least one processor may be configured to selectively generate point-cloud point based on information about reflected light information of a detection but only if the detection information complies with decision criteria based on any one or more of the following: reflectivity, surface angle, ambient light level, noise level, material properties, spatial relationships to other detection locations, parameters of such other detections, any one or more confidence values associated with the detection and/or with neighboring detection, operational settings of the LIDAR during the detection, and so on. The utilization of such parameters when generating the point cloud may save computational resources and time during object detection, identification, and classification.

Although the above examples are described with respect to the use of confidence data for classification, confidence data may also be used in other processes, such as clustering, boundary determination, and the like. For example, points with similar (e.g., within 2%, within 5%, etc.) confidence levels may be grouped together the processor. This clustering may allow for the processor to direct more light flux towards clusters with lower confidence levels rather than towards clusters with higher confidence levels, ensuring that power is more efficiently distributed. In another example, a group of points with similar (e.g., within 2%, within 5%, etc.) confidence levels may form an outline that the processor may determine to be the boundary of an object. The processor may determine the boundary even when points within the boundary have confidence levels that differ significantly from the confidence levels on the boundary.

In any embodiments described above, thresholds may be set at the level of the processor (e.g., after receipt of measurements from one or more sensors) and/or at the level of the sensor(s) (e.g., by configuring the sensor such that measurements below one threshold and/or above another threshold are not detected).

Optionally, a processor of a LIDAR based system (e.g., processor 118 or the like) may utilize different representations of locations of point-cloud points (or, more generally, locations in space determined by processing of the reflection signals of the LIDAR system) in order to detect objects in the FOV of the LIDAR and/or to assess different characteristics of such objects. In particular, the processor may utilize different coordinate systems for different types of computations. The points of the point cloud may be indicated in different coordinates systems, such as Cartesian (x,y,z), spherical (r,θ,φ), cylindrical (ρ,θ,z), system specific (e.g. (Pixel-ID, Distance)), and so on. The error in location for each point of the point cloud may differ in different coordinates. For example, considering a given location whose position is provided in spherical coordinates, the error in angles (θ and/or φ) may depend on the accuracy of positioning of the at least one deflector (or at least the accuracy of determining the position of the deflector), while the error in distance (R) may depend on the duration of the illumination pulse, on the accuracy of the time-of-flight analysis, and like factors. Likewise, different system considerations may affect errors in other axes of other coordinate systems (e.g. x, y, z, ρ).

In one example, a processor of a LIDAR based system (e.g., processor 118 or the like) may be configured to utilize Cartesian coordinates for the detection locations to determine presence of objects in different locations, for determining of bounding boxes of objects, etc. The utilization of the Cartesian coordinates may be used, for example, in order to easily sum (or otherwise combine) information from different locations which are substantially located one above the other (e.g., differing only in their z coordinate value).

In another example, a processor of a LIDAR based system (e.g., processor 118 or the like) may be configured to utilize cylindrical coordinates for the detection locations to determine presence of objects in different locations, for determining of bounding boxes of objects, etc. The utilization of the cylindrical coordinates may be used, for example, in order to easily sum (or otherwise combine) information from different locations which are substantially located one above the other (e.g., differing only in their z coordinate value).

In a third example, a processor of a LIDAR based system (e.g., processor 118 or the like) may be configured to utilize Cartesian coordinates for the detection locations to compute an angle of a surface of an object in the FOV based on the location of several points of the point cloud. The computation may include determining for each point a z-axis error from a hypothetical plane, and finding a plane which minimizes the collective z-axis errors of all data points (e.g., least means square).

In a fourth example, a processor of a LIDAR based system (e.g., processor 118 or the like) may be configured to utilize cylindrical coordinates for the detection locations to compute an angle of a surface of an object in the FOV based on the location of several points of the point cloud. The computation may include determining for each point z-axis distances (or "z-axis errors") from different hypothetical planes, and finding a plane which minimizes the collective z-axis distances of all data points (e.g., least squares, maximum likelihood estimation, or the like). The angle of the selected plane may be selected as the best matching angle for a surface of the object.

In a fifth example, a processor of a LIDAR based system (e.g., processor 118 or the like) may be configured to utilize spherical coordinates for the detection locations to compute an angle of a surface of an object in the FOV based on the location of several points of the point cloud. The computation may include determining for each point R-direction distances (or "R-direction errors") from different hypothetical planes (e.g., the distance along the line connecting the point to the origin of axes), and finding a plane which minimizes the collective R-direction distances of all data points (e.g., least squares, maximum likelihood estimation, or the like). The angle of the selected plane may be selected as the best matching angle for a surface of the object.

With regards to the minimization of the collective errors, the estimator function may be a weighted estimation function which in addition to being a function of the error (e.g., squared error, etc.) may also be weighted for any one or more of the following examples: distance from the origin of axis (R) or from another predetermined location, for a projection of that distance on a plane (e.g. p) or from another predetermined location; for a projection of that distance on a plane; for an angle of the point (e.g. φ, θ), etc. Any form of a weighted function may be implemented by one of ordinary skill in the art.

Movement Based Classification in LIDAR

Figure 23A:
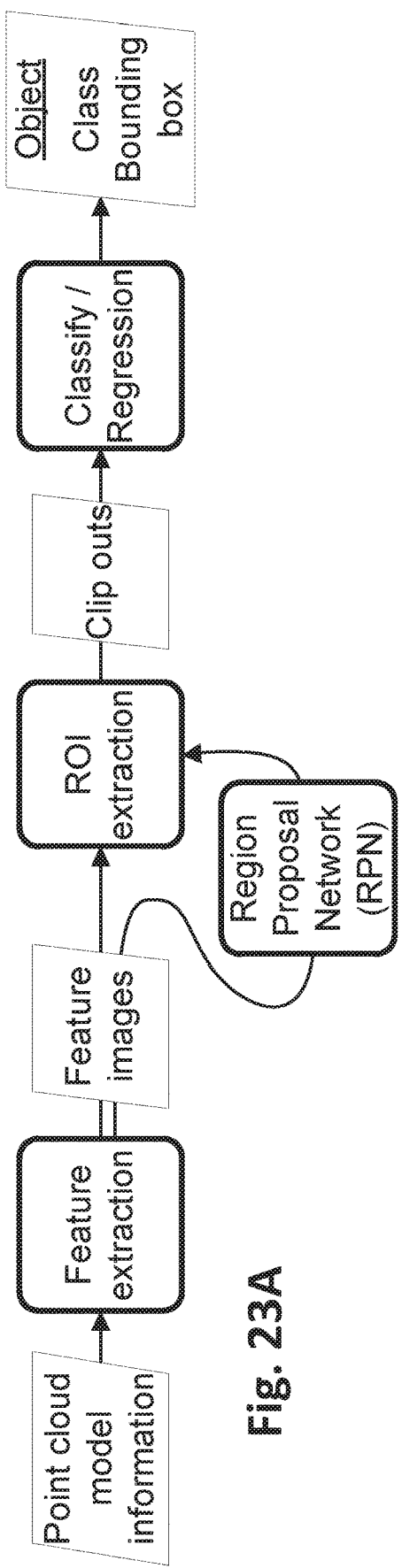
FIG. 23A is a block diagram of an exemplary system for processing cloud point information to identify objects in a scene consistent with some embodiments of the present disclosure.

FIG. 23A is a block diagram of a system for processing cloud point information to identify objects in a scene, in accordance with examples of the presently disclosed subject matter. It is noted that any of the components of the systems disclosure in this application may be implemented in hardware, software, firmware, or any combination of the above. Any component may be implemented on a single processor or on more than one processor, and different components may be implemented on a common processor (or processors). In addition to components of the system (illustrated in rounded rectangles), the system also illustrated data flow in the system (illustrated within parallelograms). Optionally, LIDAR system 100 may serve as the LIDAR system of FIG. 23A. The systems disclosed throughout the present disclosure may be used to process information generated by a LIDAR (or a plurality of LIDARs), based on detection information by light sensitive sensors of the LIDAR. In such case, the processor(s) on which the system components are implemented may be part of the Lidar (e.g. included in the same casing as the sensors), or external thereto (e.g. processor(s) located on a vehicle—e.g. car or any type of autonomous vehicle—on which the respective LIDAR(s) is installed).

The system receives point cloud (PC) model information as an input. The point cloud model includes information for a plurality of 3D location points (a point whose location corresponds to a location in a three dimensional space). The point cloud may include different types of information for each point (e.g. location, intensity, reflectivity, proximity to other points of the point cloud, etc.). Optionally, other types of input may also be provided to the system, in addition to or in lieu of the PC information. It is noted that other types of 3D models may be used instead of (or in addition to) PC models, such as polygon mesh and range maps. While the discussion below refers to point cloud models as a primary implementations—for reasons of brevity and clarity of the disclosure—it is noted that any of the systems, methods, and computer code programs discussed below may be implemented for any other type of 3D model, mutatis mutandis.

The PC information may be provided to a feature extraction module (denoted "feature extraction" in the drawings), which may process the PC information to provide a plurality of feature images. Each of the feature images may include data which emphasize or provide information regarding different aspects of the point cloud and/or of objects in the scene whose detection is represented in the point cloud (e.g., cars, trees, people, and roads). Optionally, the feature images may be of the same resolution of the point cloud model (i.e., having the same number of data points, optionally arranged into similar sized 2D arrays). The feature image may be stored in any kind of data structure (e.g., raster, vector, 2D array, ID array). Optionally, the feature extraction module may be implemented using a neural network (e.g., a convolutional neural network (CNN)). Nevertheless, other data processing techniques may be used instead. The feature images outputted by the feature extraction module may be further processed by a Region Proposal processing module (e.g., a Region Proposal Neural Network), which processes them to provide identified region(s) of interest. The output region of interests may be regions of the point cloud model (or any image derived therefrom) which the RPN determined may include an object (i.e., the corresponding scene segment—whether 2D or 3D—is likely to include an object, such as a car or a person).

The feature images and the identified region region(s) of interest may be used by a Region-of-Interest (ROI) extraction module to extract from the feature images information from the identified region(s) of interest. For example, the feature extraction module may output 100 feature images, each including, e.g., 200×50 pixels, of which the ROI extraction module may extract one or more series of, e.g., 100 (or less) 8×8 pixel patches—each series corresponding to a single object (or image information suspected as an object). Optionally, the ROI extraction module may be implemented using a neural network (e.g., a CNN). Nevertheless, other data processing techniques may be used instead. The information extracted by the ROI extraction module may be provided to a classification module (which may optionally also serve as a regression module), which may process this information to determine a classification for the suspected object (e.g., "car," "headlight," "person," "tree," "road," "false detection," "error," "unknown"). Optionally, the classification module (or another module of the system) may process the same information to provide a bounding box for the suspected object (e.g., coordinates of a cuboid or another polyhedron which contains the object). It is noted that the classification and/or bounding box may be provided to an object which combines several suspected objects. For example, the detection information may only include detection of headlights of a car, but the bounding box may include the entire car, and be classified as a "car."

Figure 23B:
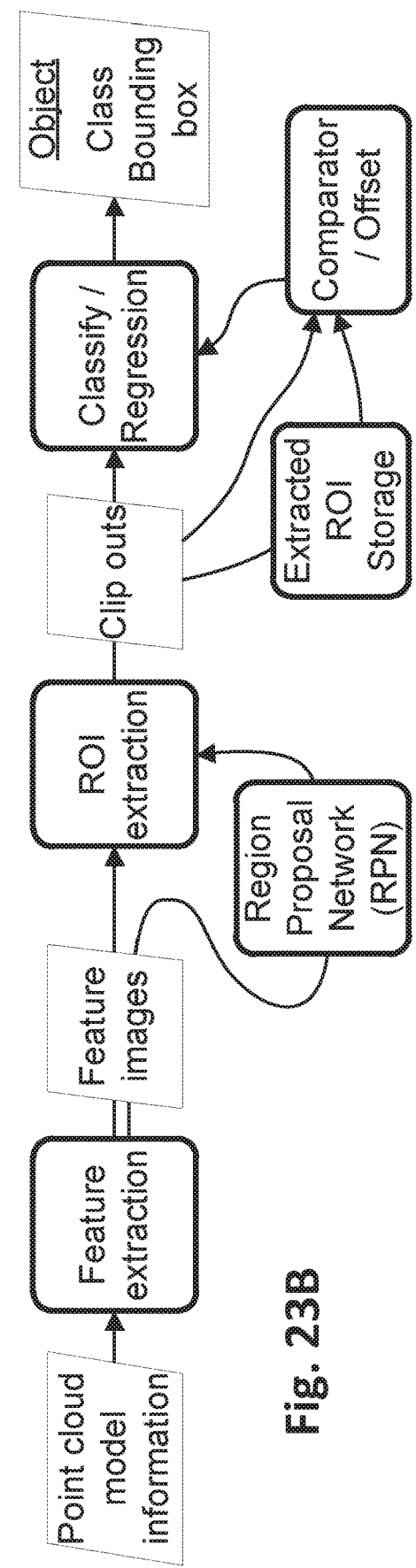
FIG. 23B is a block diagram of another exemplary system for processing cloud point information to identify objects in a scene consistent with some embodiments of the present disclosure.

FIG. 23B is a block diagram of system 4100 for processing cloud point information to identify objects in a scene, in accordance with examples of the presently disclosed subject matter. In addition to components of the system (illustrated in rounded rectangles), FIG. 23B also illustrates data flow in the system (illustrated within parallelograms). Optionally, LIDAR system 100, the host LIDAR system, or combination of these two systems may serve as the LIDAR system 4100. On top of the components and the processing discussed with respect to the system of FIG. 23A, system 4100 may use information deriving from two or more point cloud models, which may be generated from detection information collected in different times (non-overlapping or partly overlapping). For example, the LIDAR may generate 25 "frames" per second (for each one of these "frames" a PC is generated), and LIDAR system 4100 may use PC of two or more different frames (consecutive or not) for detecting and/or classifying an object(s) in the scene observed by the Lidar. As discussed below, the detection and/or classification of the object(s) may be based on differences between representation of the object(s) in the two models, on movement of the object(s) between the two models, or in any other way.

In addition to the components discussed with respect to the LIDAR system of FIG. 23A, LIDAR system 4100 may also include a storage unit for storing extracted ROI information (denoted "Extracted ROT Storage"), so that extracted ROI information of different models may be used for the classification of objects. LIDAR system 4100 may include at least one component (denoted in the example of FIG. 23B as "Comparator/Offset" module), which may processor ROI extracts (also referred to as "clip outs") extracted ("clipped") from two or more different models to provide information, which may than be fed to the classification module, for detections and/or classification of one or more objects in the scene. The aforementioned "comparator" module may apply different types of processing/analysis to: (a) first object detection derived from the first 3D model and/or (b) second object detection in the second 3D model.

For example, the "comparator" module may: (a) determine differences between representation of the object(s) in the two models; (b) determine offset between locations of the object (or of an identifiable part thereof) in the two representations; (c) determine translation parameters of the object (or of an identifiable part thereof) in the two representations (e.g. rotation angles, expansion); (d) determine speed of the object (velocity and/or direction). Optionally, the "comparator" module may be implemented using a neural network (e.g., a CNN). Nevertheless, other data processing techniques may be used instead.

FIG. 24 is a flowchart illustrating computer-implemented method 4500 for object classification, in accordance with examples of the presently disclosed subject matter. Method 4500 may include, executing on at least one processor, any combination of two or more of the following steps:

a. Step 4502: processing first LIDAR detection information to provide a first 3D model;
b. Step 4504: processing second LIDAR detection information, obtained after the first LIDAR detection information, to provide a second 3D model;
c. Step 4506: identify a first object detection in the first 3D model (step 4506 can be executed before, concurrently with, or partly concurrently with step 4504);
d. Step 4508: identify a second object detection in the second 3D model (step 4508 can be executed before, concurrently with, or partly concurrently with step 4506); and
e. Step 4510: based on the first object detection and the second object detection, determine a classification for an object detected by the LIDAR.

Optionally, system 4100 may be able to determine the presence of objects that cannot be detected (at least with a required confidence level) by other LIDAR systems, such as the LIDAR of FIG. 23A. Optionally, system 4100 may be able to classify objects which cannot be classified (at least with a required confidence level) by other LIDAR systems, such as the LIDAR of FIG. 23A. For example, LIDAR reflections from a relatively remote cyclist may only provide three or four points in the point cloud, which may be insufficient to identify that this is a cyclist (and not a person, a runner, or a tree). However, using information from two or more different PC models, obtained in different times, system 4100 may be able to determine, based on the velocity and direction of the object, that a proper classification of that object is as a "cyclist." The term "object" is known in the art of computer vision and should be construed to include any potentially moving entity within a field of view (FOV) of the LIDAR.

Method 4500 and/or system 4100 may implement any one or more of the following: (a) the use of movement classification and regression of every region proposal to use movement features as well; (b) association based on CNN feature outputs; (c) after association, combining features from previous and current frames; (d) concatenating region offset in XY plane to CNN output features; (e) classification and regression based on combined features; and (f) adding a term to the loss function such that the same object in different frames is in similar feature space. Optionally, system 4100 may implement any variation and/or aspect of the embodiments discussed with respect to method 4500. Similarly, method 4500 may implement any variation and/or aspect of the embodiments discussed with respect to system 4100.

Referring to the LIDAR systems of FIGS. 23A and 23B, it is noted that such a system may be integrated into the LIDAR (or one of the LIDARs) providing detection information to the system. Alternatively, such a system may also be integrated into a host (e.g. a vehicle) on which the LIDAR is installed. Optionally, such a system may be remote from the LIDAR (e.g., on a remote computer or server).

Referring to method 4500, method 4500 may optionally include processing the first object detection information and/or the second object detection information for assessing a speed of the corresponding object based on a smear and/or blurring resulting from movement of the object during the capturing of the corresponding LIDAR detection information.

The classification of the object in step 4510 may be further based on the smear and/or blurring. Alternatively, classification of an object based on blurring and/or smearing detected in object detection information from a single frame of the LIDAR may also be implemented, mutatis mutandis. The LIDAR providing detection information to the LIDAR system of FIGS. 23A and/or 23B may analyze a changing scene to determine/detect scene elements. When used in conjunction with an optional host (such as a vehicle platform and/or a drone platform), the LIDAR may provide a detected scene output. The optional host device may utilize a detected scene output or signal from the scanning device to automatically steer or operate or control the host device. Furthermore, the LIDAR may receive information from the host device and update its operational parameters accordingly. The LIDAR systems of FIGS. 23A and 23B may be scanning or non-scanning LIDARs. Optionally, LIDAR system 4100 may include at least one processor executing any one or more of the methods discussed above. Likewise, the movement-based (or, more generally, changed-based) classification discussed with respect to LIDAR system 4100 and method 4500 may be implemented in any one of the systems and methods discussed above.

Detecting Object Surface Composition in LIDAR

Certain materials—like metal, glass, and retro-reflectors—have high degree of specular reflection and maintain polarization of the light. Other materials, in comparison, do not maintain polarization. Therefore, LIDAR systems of the present disclosure may use polarization of reflected light to identify and/or classify objects in its field of view. For example, for vehicles, polarization of illumination may be preserved on the vehicle's metal body, glass surfaces, etc. Road signs may also be identified by the polarization characteristics of the retro reflectors they include.

A LIDAR system (such as LIDAR system 100, or any type of LIDAR system, whether scanning or not scanning) may have a light sensor configured to determine polarization characteristics of reflected light signals arriving from the field of view. Optionally, one or more of the at least one light source of the LIDAR system may project, onto the FOV, polarized light. The at least one sensor may provide to the processor, not only the detections signals by which ranges of objects can be determined (e.g., time of flight information), but also information about polarization of light arriving from different parts of the FOV (e.g., from each pixel, or instantaneous FOV). The processor may be configured to process the information of the polarization associated with one or more detection signals (e.g., of one or more pixels)—optionally together with detection information and/or other information, to provide any one or more of the following: (a) identification of one or more objects in the FOV; (b) classification of one or more objects in the FOV (e.g., car, person, moving, still); and (c) additional data pertaining to one or more objects in the FOV (e.g., dimensions, orientation, speed). The processor may apply any type of algorithm and/or hardware to achieve the above products, such as Computer Vision (CV), Machine Learning (ML), Convolutional Neural Network (CNN), Deep Learning (DL), Look-Up Table (LUT), or the like.

The utilization of polarity by the LIDAR system may be implemented in many ways. The following are but a few examples:

a. The at least one light source may project light having a known state of polarization (SOP). The received light may be split (e.g., using one or more beam splitters) into two orthogonal SOPs (e.g., two linear orthogonal polarizations), directed into two groups of detectors (or two groups of detectors arrays), each group including at least one detector (or detector array). The relative difference between the received signals from the same target may be related to the optical target properties such that metal (or other specular objects) may result a large relative difference between the signals of the two detectors, while for scattering objects (e.g., stone walls, clothing, trees, etc.) the relative difference may be small.

b. The at least one light sources may project light having a known SOP. Received light may be directed into a single group of one or more detectors (or at least one detector array) through a polarization modulator (e.g., a photo-elastic modulator), where one light pulse may be related to one SOP of the modulator, and a second light pulse may be related to the second orthogonal SOP of the modulator.

c. The LIDAR system may use two sets of light sources (each including one or more light sources) having orthogonal SOPs and activate them in alternating times to the same target (in the same direction). Received light from the target may be directed into a single group of one or more detectors (or at least one detector array) with a polarizer in front of it. The signals from the alternating light signals with alternating orthogonal polarizations may be compared for the detection, classification and/or analysis of the object.

d. A group of at least one light source may project light with alternating orthogonal SOP (using, for example, a photo-elastic modulator). Received light from the target may be directed into one group of one or more detectors (or detector arrays) with a polarizer in front. The signals from the alternating orthogonal polarizations may be compared, and the results may be used by the processor for the detection, classification and/or analysis of the object.

MEMS Housing with Integrated Circuitry

In some embodiments, as noted previously, LIDAR system 100 may be incorporated onto a vehicle. Example embodiments of such incorporation are included in PCT Application No. PCT/IB2017/001320, filed Sep. 20, 2017, which is incorporated herein by reference in its entirety. Due to engine operation and motion over roads and other surfaces, a certain amount of vibration may result, and this vibration may interfere with operation of LIDAR system 100. For example, vibrations may be transferred to any of the components of LIDAR system 100 (e.g., light source and/or the light deflector) and may affect their performance and/or the overall performance of the system. Vibrations in a LIDAR system may also result from other causes (e.g., from a carrying platform other than a car, from wind, waves).

In addition to—or alternatively to—vibrations, LIDAR systems may also suffer from uncertainties in positioning of one or more deflectors (e.g., mirrors) or other components. For example, when using a piezo-electrically actuated MEMS mirror, the piezo-electric actuation may include a certain amount of hysteresis, which means that a certain control voltage may not necessarily result in desired positioning of the mirror due to ambiguity in mirror position compared to controlling voltage. Accordingly, a position feedback mechanism may be implemented in a LIDAR system in order to counter such effects (e.g., vibrations or other inaccuracies). Sensors of the position feedback mechanism may be used to obtain data indicative of position, orientation, velocity or acceleration of the at least one light deflector (and/or of another component of the LIDAR system). These determined data regarding the state of the light deflector (or other components) may be determined regardless of the reasons for diversions (e.g., vibrations, hysteresis, temperature effects) and/or may be used in the feedback control of the light deflector to improve detection accuracy and operability of the LIDAR system (e.g., in the examples provided below).

Figure 25A:
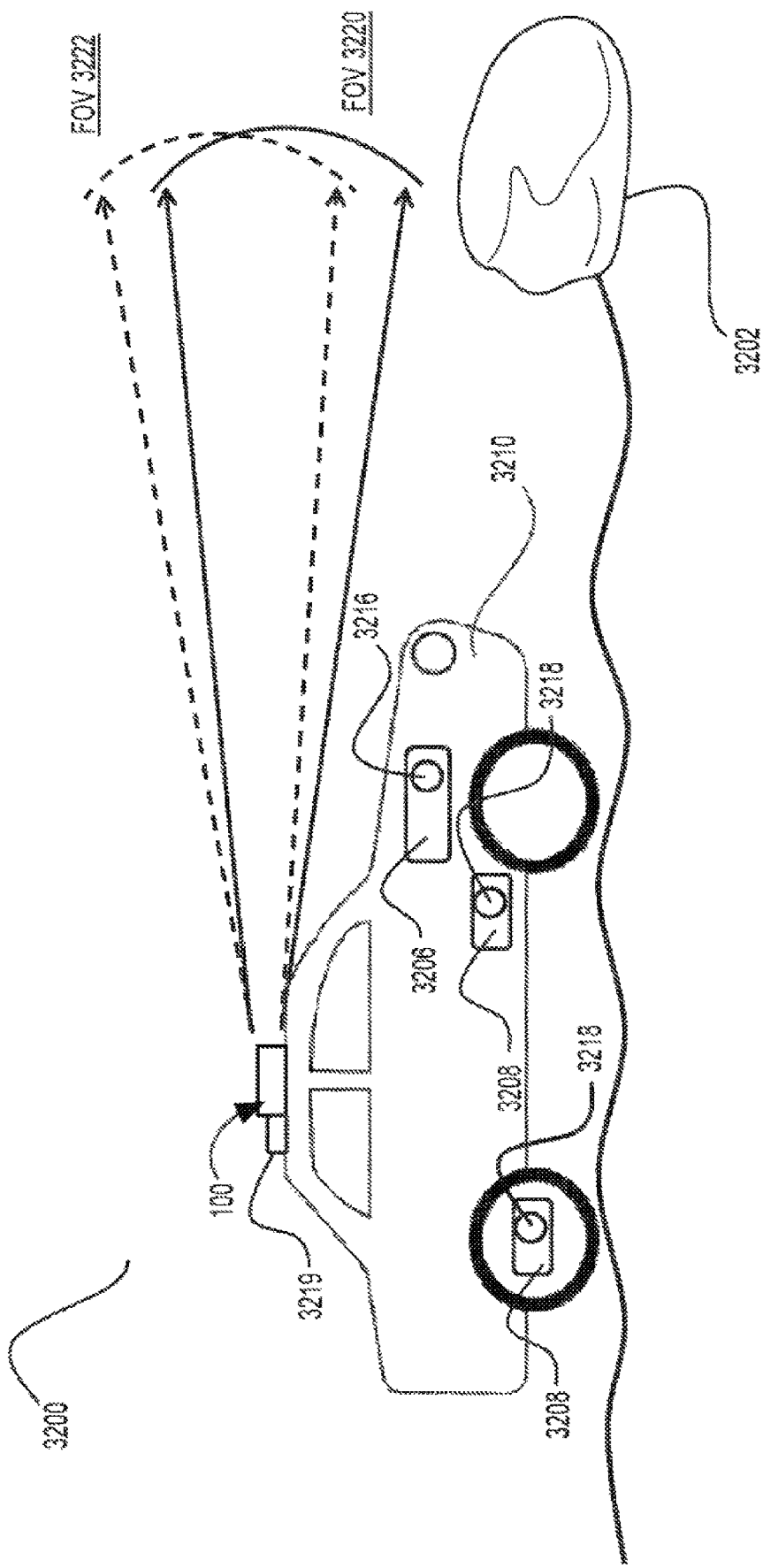
FIG. 25A depicts an exemplary vehicle having a LIDAR system with a vibration suppression system consistent with some embodiments of the present disclosure.
Figure 25B:
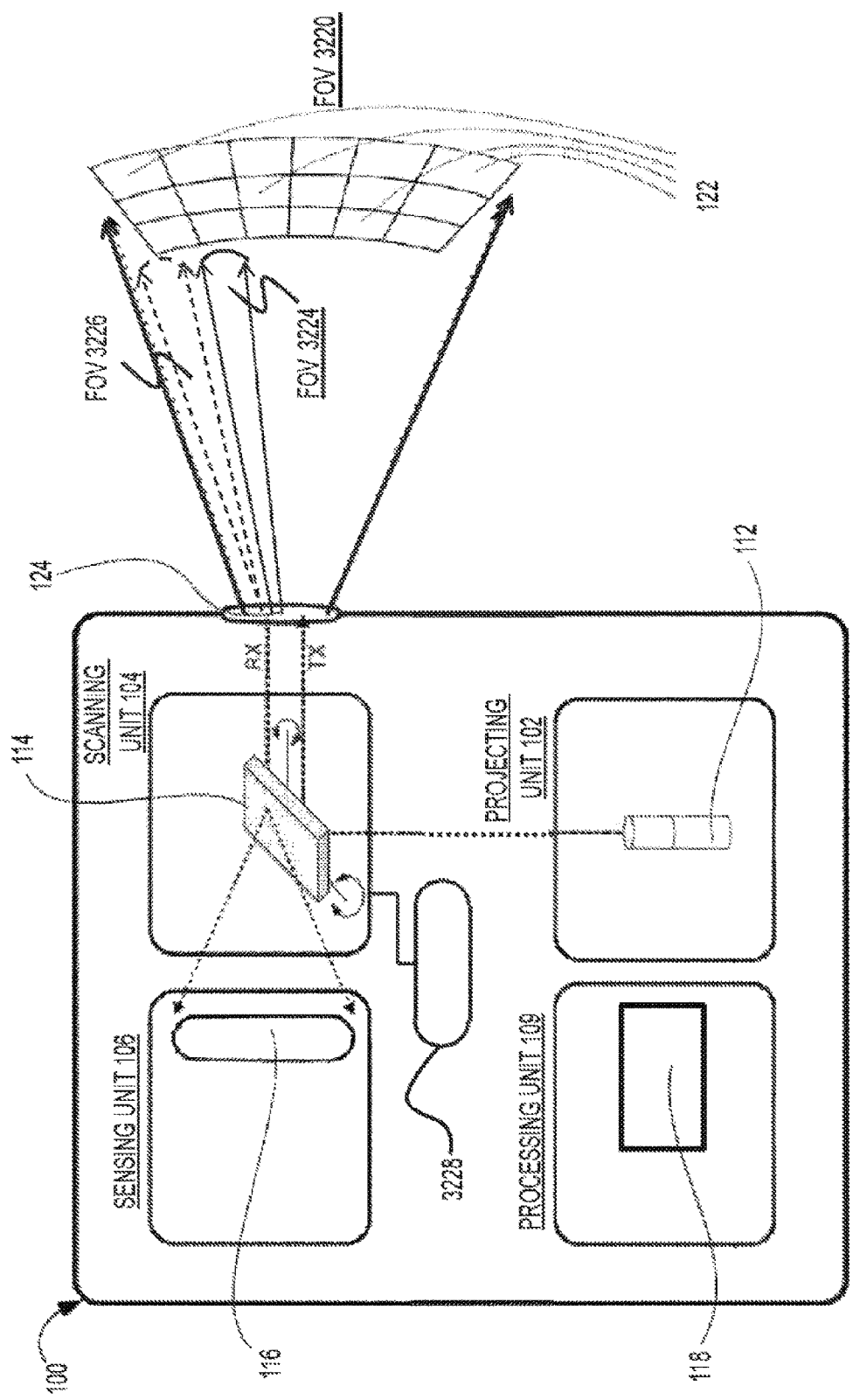
FIG. 25B depicts an exemplary LIDAR system with a vibration suppression system consistent with some embodiments of the present disclosure.
Figure 25C:
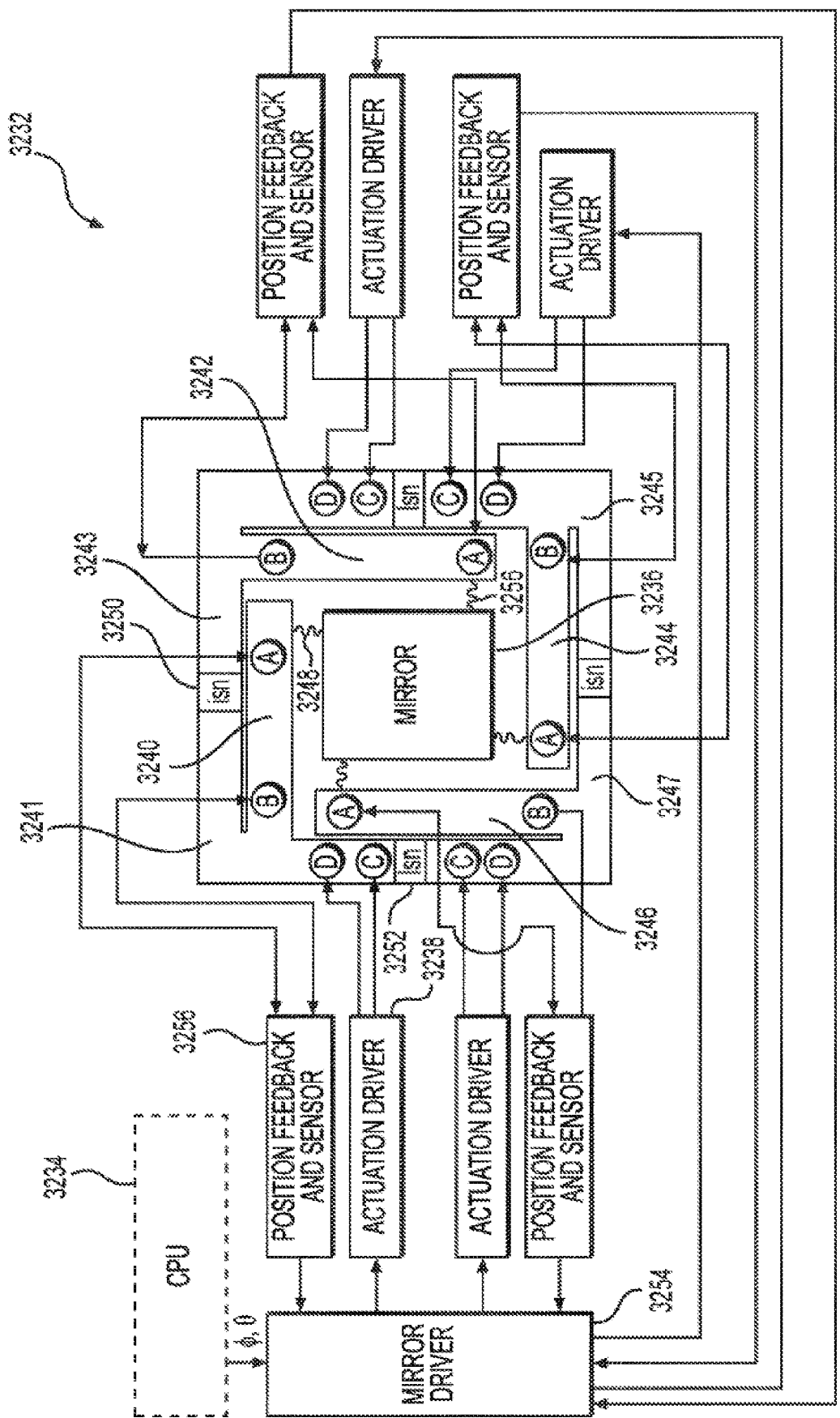
FIG. 25C depicts exemplary feedback sensors used in a vibration suppression system consistent with some embodiments of the present disclosure.

As exemplified in FIGS. 25A and 25B, LIDAR system 100 may incorporate system 3200 (e.g., a vibration suppression system). In some cases, LIDAR system 100 may determine the presence of vibration (and/or other inaccuracies) and may take one or more actions to reduce or eliminate the effects of such vibration/inaccuracy. LIDAR system 100 may determine the presence of vibrations/inaccuracies using any suitable technique, e.g., using one or more sensors and/or one or more feedback mechanisms (e.g., as discussed below in greater detail).

In some cases, vibration/location inaccuracy may be detected based on feedback received from deflector 114. For example, the vibration suppression system of LIDAR system 100 may respond to feedback determined based on mirror position data associated with deflector 114 (e.g., using mirror position feedback sensors illustrated in FIG. 25C to detect movements of deflector 114 resulting from vibration). In a LIDAR system configured to suppress the effects of vibration or uncertainties in light-deflector position, system 3200 may include at least one processor configured to control at least one light source in a manner enabling light flux of light from the at least one light source to vary over scans of a field of view; control positioning of at least one light deflector to deflect light from the at least one light source in order to scan the field of view; and obtain data indicative of vibrations of a vehicle on which the LIDAR system is deployed. Based on the obtained data indicative of sensed vibration, the at least one processor may determine to the positioning of the at least one light deflector in order to compensate for the vibrations of the vehicle.

The at least one processor may also implement the determined adjustments to the positioning of the at least one light deflector to suppress on the at least one light deflector, at least part of an influence of the vibrations of the vehicle on the scanning of the field of view. LIDAR system 100 may include (and/or may receive information from) any type of sensor capable of measuring at least one characteristic of vibration or an effect of vibration, including, for example, force, acceleration, torque, strain, stress, voltage, optical deflections, etc. Such sensors 3216, 3218, and/or 3219 may be connected to one or more processors associated with LIDAR system 100, either directly or indirectly, via wired or wireless connections and may communicate to the one or more processors of the LIDAR system information indicative of the sensed vibration.

Processing unit 108 of LIDAR system 100 may cause deflector 114 to move in such a way that counteracts at least a portion of the movement/location inaccuracy imparted to deflector 114, light projecting unit 102, sensing unit 106, or any other component of LIDAR system 100 affecting light projection, collection, or detection. For example, in some embodiments, processing unit 108 including one or more processors 118 may monitor the position or orientation of deflector 114, compare the monitored position with an intended instantaneous position/orientation, and, if a difference is determined, may cause deflector 114 to move toward an intended instantaneous position/orientation. Using such a feedback approach, processor 118 may counteract effects of vibrations that tend to displace deflector 114 from its intended position or orientation. In some embodiments, processor 118 may be configured to cause vibration-reducing or cancelling movements to any movable component of LIDAR system 100 in order to mitigate the effects of sensed vibrations.

Figure 26A:
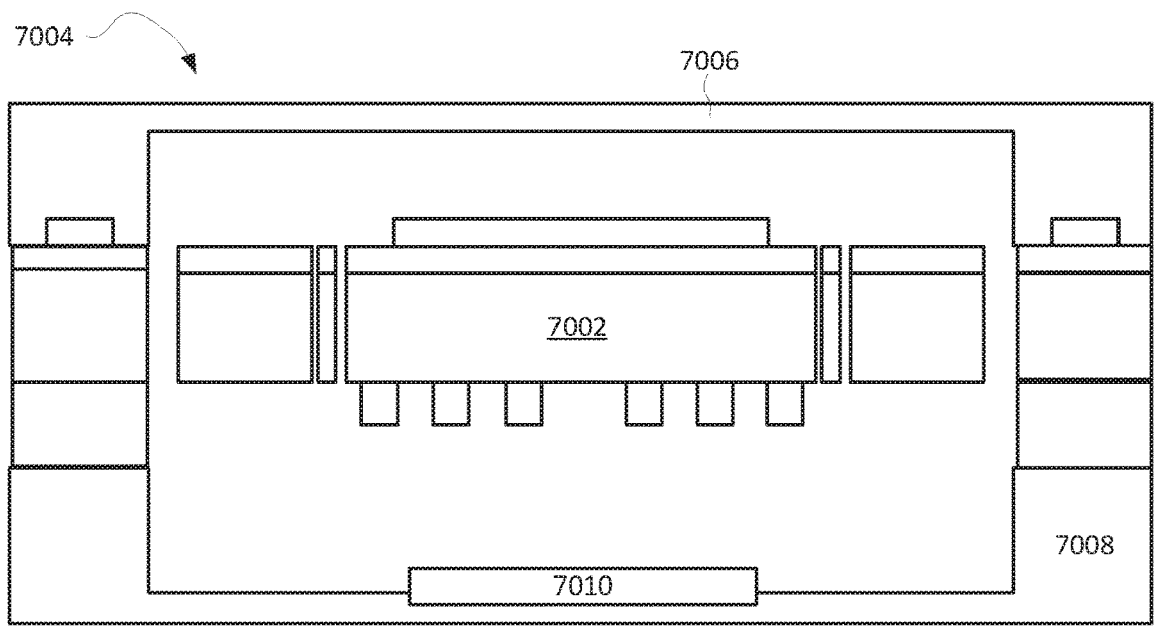
FIG. 26A is a cross-section illustrating an exemplary MEMS mirror enclosed within a housing consistent with some embodiments of the present disclosure.
Figure 26B:
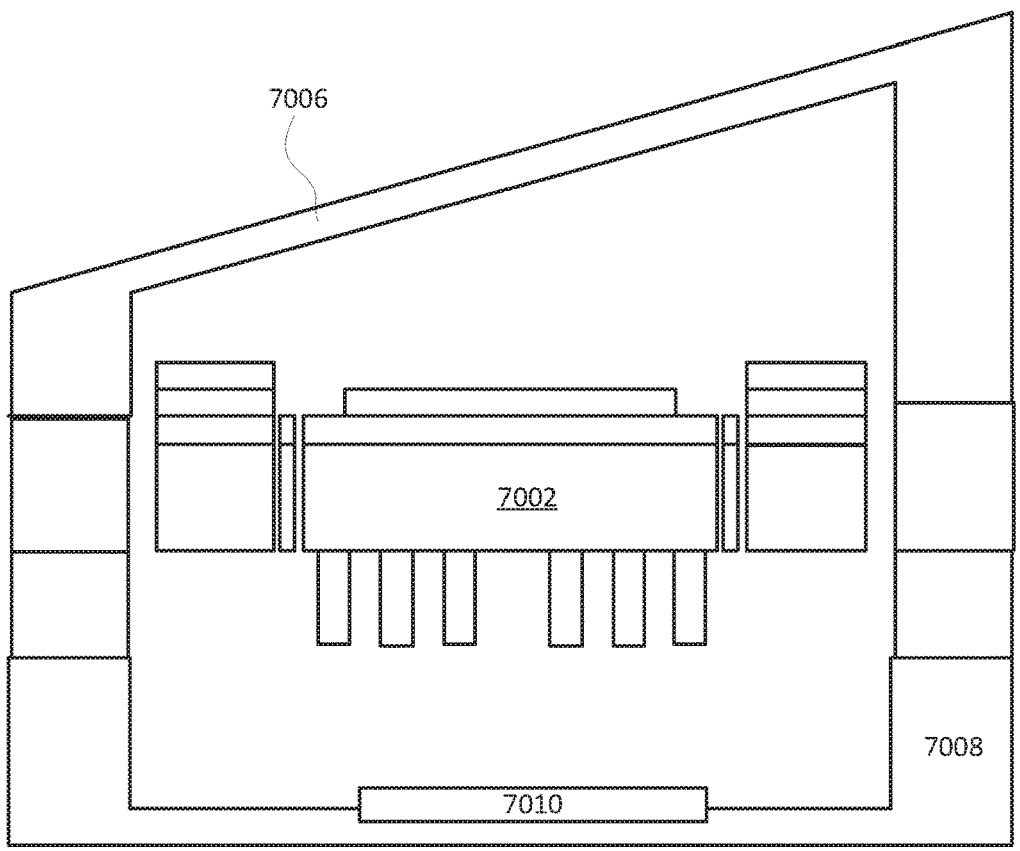
FIG. 26B is a cross-section illustrating another exemplary MEMS mirror enclosed within a housing consistent with some embodiments of the present disclosure.

FIGS. 26A and 26B are side-view cross-sections illustrating MEMS mirror 7002 enclosed within a housing 7004, in accordance with examples of the presently disclosed subject matter. Housing 7004 may include window 7006, having one or more transparent (or at least partly transparent) portions through which light can be transmitted to and from the mirror. The housing may enclose the MEMS mirror 9002.

Housing 7004 may be a sealed housing that may be manufactured using wafer level packaging or any other technology. Housing 7004 may include a base 7008 made at least partly from silicon or another wafer material. Base 7008 may optionally include some transparent or semi-transparent parts. Optionally, the MEMS mirror may not be parallel to a window of the LIDAR system during any stage of its movement, e.g., for preventing internal reflection by the MEMS mirror and the window, which may generate unwanted light artifacts. These light artifacts may be attenuated and even prevented by providing a window that is not parallel to the MEMS mirror or when the optical axis of the MEMS mirror and the optical axis of the window are not parallel to each other. When either one of the MEMS mirror and the window are curved or have multiple sections that are oriented to each other, it may be beneficial that no part of the MEMS mirror should be parallel to any part of the window. The angle between the window and the MEMS mirror may be set such that the window does not reflect light towards the MEMS mirror when the MEMS mirror is at an idle position or even when the MEMS mirror is moved by any of the actuators. The MEMS mirror assembly (comprised within housing 7004) may optionally include additional layers of the MEMS structure, e.g., as part of the MEMS mirror, as part of it supports, actuation module, etc.

Different parts of the housing may be formed by wafer level packaging. For example, window 7006 may be made from a glass wafer (or another type of transparent wafer) bonded to a wafer on which the MEMS mirror is implemented. Base 7008 may be made from the same wafer as the MEMS mirror or on another wafer bonded to the wafer on which the MEMS mirror is implemented. The wafer of base 7008 is also referred to as "the base wafer" for convenience. Optionally, the frame may be implemented on the same wafer as the MEMS mirror, on the base wafer, or on a combination of both. Optionally, an integrated circuit (IC) may form a bottom region of the housing (e.g., implemented on the base wafer).

An integrated circuitry (IC) implemented as part of housing 7004 (e.g., as part of the base wafer) may be used for different uses and may include one or more processors, one or more sensors, one or more light sources (e.g., LED), one or more power assembly modules, or the like. Optionally, one or more such components may also be connected to the IC after the manufacturing process of the base wafer (e.g., by gluing) and may cooperate with the IC to serve the same function. Optionally, one or more such components may also be implemented on the same wafer as the MEMS mirror, may be connected to the IC after the manufacturing process of the base wafer, and may cooperate with the IC to serve the same function. Some examples of types of modules which may be implemented using IC on the base wafer include: feedback sensors (e.g., detectors), sensing circuits, mirror drivers, and feedback circuits, mirror controller, or the like. The IC on the base wafer is collectively denoted 7010 in the illustrations, for the sake of simplicity of the diagram. Some non-limiting examples of the uses of IC 7010 are discussed below. It is noted that any variation of MEMS mirror (whether provided as an example above or not) may be implemented.

For example, IC 7010 may include a processor configured to determine an instantaneous angular position (e.g., using $\theta$, $\phi$ coordinates) of the MEMS mirror. The term "instantaneous angular position" refers to an instantaneous position of the at least one deflector which causes light to be deflected towards (and/or from) a given angular direction (e.g., indicated by $\theta$, $\phi$). Such a determination may be based on at least one of optical measurements, capacitance measurements, piezo resistance measurements, dielectric constant measurement, and piezo polarization measurements from one or more of the vibration sensors associated with the vehicle or LIDAR system 100 (e.g., sensors associated with light deflector 114). Vibrations and inaccuracies of the position of the MEMS mirror may be detected using one or more sensors which may include, for example, one or more accelerometers, strain gauges, or any other type of sensor suitable for sensing vibration or at least one characteristic of vibration.

All of these types of sensing and feedback may be implemented using IC 7010. IC 7010 may also include parts (or all of) a steering unit using for instantaneous directional control of the MEMS mirror. IC 7010 may also include an electrically controllable electromechanical driver (e.g., an actuation driver of the mirror). Such an actuation driver may cause movement or power to be relayed to an actuator/ cantilever/bender connected to the MEMS mirror. For example, IC 7010 may include a processor configured to control a position of the MEMS mirror based on received outputs of one or more sensors included in IC 7010 and/or connected to IC 7010. For example, IC 7010 may determine adjustments for countering observed vibrations, which may include computing appropriate axis ($\theta$, ($\phi$) parameter adjustments to move the MEMS mirror to an intended instantaneous position. In some cases, these adjustments may include moving the MEMS mirror in order to compensate for computed acceleration, torque, strain, etc. determined based on outputs from sensors associated with the vehicle itself. Optionally, one or more processors implemented in IC 7010 may cooperate with any other processor of the LIDAR system to achieve different goals. For example, a processor external to housing 7004 may provide to IC 7010 operational parameters, instructions, or the like.

The orientation of the MEMS mirror may be monitored by illuminating the backside of the MEMS mirror 7002. It may be beneficial to illuminate at least one area of the MEMS mirror and to sense reflected light in at least three locations. Optionally, LIDAR system 100 may include a dedicated light source for illuminating the back side of the MEMS mirror. The dedicated light source (e.g., LED) may be located behind the mirror (i.e., away from its main reflective sensor used for the deflection of light from the at least one light source 112), e.g., within housing 7004. Alternatively, LIDAR system 100 may include optics to direct light onto the back side of the mirror. In some examples, light directed at the back side of the MEMS mirror (e.g., light of the dedicated light source) may be confined to a backside area of the mirror and prevented from reaching the main reflective side of the MEMS mirror.

The processing of the signals of the back side sensors may be executed by processor 118 and/or by a dedicated circuitry integrated into IC 7010 positioned within housing 7004 of mirror 7002. The processing may include comparing the reflected signals to different back side sensors which may be located within housing 7004 (e.g., as part of IC 7010 or otherwise implemented on and/or connected to the base wafer), subtracting such signals, normalizing such signals, etc. The processing of such signals may be based on information collected during a calibration phase. In some embodiments, illuminating a backside of the MEMS mirror may be implemented when the back of the mirror is substantially uniformly reflective (e.g., a flat back, without reinforcement ribs). However, this is not necessarily the case, and the back of the mirror may be designed to reflect light in a patterned non-uniform way. The patterned reflection behavior of the back side of the mirror may be achieved in various ways, such as surface geometry (e.g., by including protrusions, intrusions), surface textures, differing materials (e.g., silicon, silicon oxide, metal), or the like. Optionally, the MEMS mirror may include a patterned back side, having a reflectivity pattern on at least a part of the back surface of the mirror configured to cast a patterned reflection of the back side illumination (e.g., from the aforementioned back side dedicated light source) onto the back side sensors implemented on the base wafer. The patterned back side may optionally include parts of optional reinforcing elements located at the back of the MEMS mirror. For example, the reinforcing elements may be used to create shadows onto the backside sensors at some angles (and/or to deflect the light to a different angle) such that movement of the mirror changes the reflection on the sensor from shadowed to bright. Optionally, the processing of the outputs of the backside sensors may account for a reflectivity pattern of the backside (e.g., resulting from the pattern of the reinforcement ribs).

In the examples of FIGS. 26A and 26B, a microelectromechanical (MEMS) mirror assembly is depicted, which includes:
 a. a window for receiving light manufactured on a first wafer;
 b. a microelectromechanical (MEMS) mirror for deflecting the light to provide a deflected light, the MEMS mirror manufactured on a second wafer on which the following components are manufactured: a frame; actuators; and interconnect elements that are mechanically connected between the actuators and the MEMS mirror, wherein the second wafer is different than the first wafer;
 c. a housing base manufactured on a third wafer, the housing base comprising an integrated circuitry (IC); and
 d. a housing, comprising at least the housing base and the window, wherein the MEMS mirror is enclosed in the housing.

Optionally, the IC may include at least one of: a sensor, a feedback sensor, a sensing circuit, a mirror driver, a feedback circuit, and a mirror controller. Optionally, each actuator may include a body and a piezoelectric element. Optionally, the third wafer may be different than the second wafer. Optionally, the housing may be a sealed housing. The MEMS mirror may move with respect to the support frame to which it is connected, and the movement may be induced by the actuators. The actuators may be controlled by the IC, by an external processor, or by a combination of both. Any two or more of the optional embodiments described above may be combined.

Embodiments of the present disclosure may also be implemented in a computer program for running on a computer system, at least including code portions for performing steps of a method according to disclosed embodiments when run on a programmable apparatus, such as a computer system or enabling a programmable apparatus to perform functions of a device or system according to the disclosed embodiments. Embodiments of the present disclosure may also be implemented in a computer program for running on a computer system, at least including code portions that make a computer execute the steps of a method according to the disclosed embodiments.

A computer program is a list of instructions such as a particular application program and/or an operating system. The computer program may for instance include one or more of: a subroutine, a function, a procedure, a method, an implementation, an executable application, an applet, a servlet, a source code, code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

Also, embodiments of the present disclosure are not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as "computer systems."

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosed embodiments.

It will be appreciated that the embodiments described above are cited by way of example, and various features thereof and combinations of these features can be varied and modified. For example, listed embodiments and examples, even when numbered, are not necessarily exclusive of each other. Wherever possible, listed embodiments and examples may be combined in any appropriate manner.

While various embodiments have been shown and described, it will be understood that there is no intent to limit the embodiments by such disclosure and examples, but rather, it is intended to cover all modifications and alternate constructions falling within the scope of the disclosed embodiments, as defined in the appended claims.

What is claimed is:

1. A light detection and ranging (LIDAR) system for use in a vehicle, the LIDAR system comprising:
    at least one processor configured to:
        control at least one light source for illuminating a field of view;
        scan a field of view by controlling movement of at least one deflector at which the at least one light source is directed;
        receive, from at least one sensor, reflection signals indicative of light reflected from an object in the field of view;
        detect at least one temporal distortion in the reflection signals, wherein the at least one temporal distortion includes a stretching of at least one of the reflection signals in time as compared to an illumination pulse or a difference in return times for the reflection signals to different quadrants of the at least one sensor; and
        determine, from the at least one temporal distortion, an angular orientation of at least a portion of the object.

2. The LIDAR system of claim 1, wherein the at least the portion of the object corresponds to a two-dimensional surface.

3. The LIDAR system of claim 1, wherein the detected at least one temporal distortion is associated with a plurality of reflections from the object.

4. The LIDAR system of claim 1, wherein a shape of a first temporal distortion associated with a first angular orientation differs from a shape of a second temporal distortion associated with a second angular orientation.

5. The LIDAR system of claim 1, wherein the object is an opposing vehicle and wherein the angular orientation is a slope of a portion of the opposing vehicle.

6. The LIDAR system of claim 1, wherein the object is a road and the angular orientation is a slope of a portion of the road.

7. The LIDAR system of claim 6, wherein the at least one processor is further configured to cause a change in an operational state of the vehicle based on the detected angular orientation of the portion of the road.

8. The LIDAR system of claim 1, wherein the at least one processor is further configured to access memory that stores a plurality of distortion patterns, each of the plurality of distortion patterns corresponds to a unique angular orientation and wherein the at least one processor is configured to determine the angular orientation by matching a stored distortion pattern with the at least one detected temporal distortion.

9. The LIDAR system of claim 1, wherein the at least one processor is further configured to determine differing angular orientations of a plurality of objects identified in an environment of the vehicle.

10. The LIDAR system of claim 1, wherein the at least one processor is further configured to determine differing angular orientations associated with differing surfaces of the object and to identify the object based on the determined angular orientations.

11. The LIDAR system of claim 1, wherein the at least one processor is further configured to determine angular orientation of the object on a pixel by pixel basis.

12. The LIDAR system of claim 1, wherein the at least one processor is further configured to use a plurality of matched filters, each matched filter is operable to correlate temporal sequences of detected reflection levels and a return-signal hypothesis to provide a correlation output.

13. The LIDAR system of claim 12, wherein the at least one processor is further configured to detect the at least one temporal distortion in the reflection signals by correlating a temporal sequence of detected reflection levels with a plurality of return-signal hypotheses using the plurality of matched filters and selecting a closest match.

14. The LIDAR system of claim 13, wherein the object is a road and the at least one processor is further configured to process a matching of the temporal sequence of detected reflection levels and a shortest return-signal hypothesis, and to determine a presence of a road sign marking on a portion of the road.

15. The LIDAR system of claim 14, wherein the portion of the road is associated with a single pixel and at least one processor is further configured to determine two different distances for the single pixel, a first distance to the portion of the road and a second distance to the road sign marking on the portion of the road.

16. A vehicle, comprising:
    a body; and
    at least one processor within the body and configured to:
        control activation of at least one light source for illuminating a field of view;
        scan a field of view by controlling movement of at least one deflector at which the at least one light source is directed;
        receive, from at least one sensor, reflection signals indicative of light reflected from an object in the field of view;
        detect at least one temporal distortion in the reflection signals, wherein the at least one temporal distortion includes a stretching of at least one of the reflection signals in time as compared to an illumination pulse or a difference in return times for the reflection signals to different quadrants of the at least one sensor; and
        determine, from the at least one temporal distortion, an angular orientation of at least a portion of the object.

17. The vehicle of claim 16, wherein the at least one processor is further configured to process the reflection signals to determine a single detection location, and to associate the angular orientation with the single detection location.

18. The vehicle of claim 17, wherein at least one processor is further configured to use additional data to determine the single detection location.

19. The vehicle of claim 17, wherein the received reflection signals that are associated with the single detection location are detected by a single pixel in the at least one sensor.

20. The vehicle of claim 19, wherein the at least one processor is further configured to use the reflection signals detected by the single pixel and reflection signals detected by adjacent pixels to determine two angles defining a normal of a surface of the object.

21. The vehicle of claim 19, wherein the single pixel corresponds to a plurality of detection elements grouped into a plurality of non-overlapping regions, and the at least one processor is further configured to determine the temporal distortion by comparing information obtained from reflection signals associated with the plurality of non-overlapping regions.

22. The vehicle of claim 16, wherein the reflection signals received from the at least one sensor includes at least three measurements indicative of time-of-flight of the light reflected from the object, and the at least one processor is further configured to determine, based on differences in reception times of the at least three measurements, two angles defining a normal vector of a surface of the at least the portion of the object.

23. The vehicle of claim 22, wherein the two angles includes a tilt angle and a roll angle of the surface of the at least the portion of the object.

24. The vehicle of claim 22, wherein the at least one processor is further to configured to enable construction of a 3D map of the field of view, the 3D map including data indicative of surface angular orientations of objects in the field of view.

25. The vehicle of claim 22, wherein the at least one processor is further to configured to classify the object at least in part based on surface angular orientations two surfaces of the object.

26. The vehicle of claim 22, wherein the vehicle is at least partially autonomous and the at least one processor is further configured to cause a change in an operation of the vehicle based on surface angular orientation surface of the object.

27. The vehicle of claim 16, wherein the at least one processor is further configured to change an operational parameter of the at least one light source based on the determined angular orientation of the at least a portion of the object.

28. The vehicle of claim 16, wherein the at least one processor is further configured to change an operational parameter of the at least one sensor based on the determined angular orientation of the at least a portion of the object.

29. A method for using light detection and ranging (LIDAR) to determine angular orientation of objects in a field of view, the method comprising:
controlling activation of at least one light source for illuminating a field of view;
scanning a field of view by controlling movement of at least one deflector at which the at least one light source is directed;
receiving, from at least one sensor, reflection signals indicative of light reflected from an object in the field of view;
detecting at least one temporal distortion in the reflection signals, wherein the at least one temporal distortion includes a stretching of at least one of the reflection signals in time as compared to an illumination pulse or a difference in return times for the reflection signals to different quadrants of the at least one sensor; and
determining, from the at least one temporal distortion, an angular orientation of at least a portion of the object.

30. A non-transitory computer-readable storage medium storing instructions that, when executed by at least one processor, cause the at least one processor to perform a method for using light detection and ranging (LIDAR) to determine angular orientation of objects in a field of view, the method comprising:
controlling activation of at least one light source for illuminating a field of view;
scanning a field of view by controlling movement of at least one deflector at which the at least one light source is directed;
receiving, from at least one sensor, reflection signals indicative of light reflected from an object in the field of view;
detecting at least one temporal distortion in the reflection signals, wherein the at least one temporal distortion includes a stretching of at least one of the reflection signals in time as compared to an illumination pulse or a difference in return times for the reflection signals to different quadrants of the at least one sensor; and
determining, from the at least one temporal distortion, an angular orientation of at least a portion of the object.

\* \* \* \* \*